(12) United States Patent
Blyth et al.

(10) Patent No.: US 11,752,742 B2
(45) Date of Patent: *Sep. 12, 2023

(54) MULTI-LAYER FILM AND RECLOSABLE FILM PACKAGE

(71) Applicant: Intercontinental Great Brands LLC, East Hanover, NJ (US)

(72) Inventors: Stuart Mackintosh Blyth, Birmingham (GB); Matthew James Down, Birmingham (GB); Christopher Holt, Birmingham (GB); Ying (Lora) Liang, East Hanover, NJ (US); Paul A. Zerfas, East Hanover, NJ (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,494

(22) Filed: Jul. 26, 2021

(65) Prior Publication Data
US 2022/0041357 A1 Feb. 10, 2022

Related U.S. Application Data

(62) Division of application No. 16/324,091, filed as application No. PCT/US2017/046759 on Aug. 14, 2017, now Pat. No. 11,123,963.

(Continued)

(51) Int. Cl.
*B32B 27/08* (2006.01)
*B65D 75/58* (2006.01)
(Continued)

(52) U.S. Cl.
CPC ............. *B32B 27/08* (2013.01); *B32B 3/266* (2013.01); *B32B 7/06* (2013.01); *B32B 7/12* (2013.01);
(Continued)

(58) Field of Classification Search
CPC .. B32B 3/266; B32B 7/06; B32B 7/12; B32B 27/32; B32B 27/34; B32B 27/36;
(Continued)

(56) References Cited

U.S. PATENT DOCUMENTS

| | | |
|---|---|---|
| 3,977,160 A | 8/1976 | Klug |
| 4,143,858 A | 3/1979 | Schmidt, III |

(Continued)

FOREIGN PATENT DOCUMENTS

| | | |
|---|---|---|
| AU | 2016220188 | 9/2017 |
| AU | 2017312553 | 3/2019 |

(Continued)

OTHER PUBLICATIONS

Examination report No. 1, dated Jul. 31, 2019 for Australian Application No. 2017312939 (4 pgs.).

(Continued)

*Primary Examiner* — Jes F Pascua
(74) *Attorney, Agent, or Firm* — FITCH, EVEN, TABIN & FLANNERY LLP

(57) ABSTRACT

A multi-layer film and a film package made from the film are described herein that provide resealing capabilities by utilizing a tacky layer within the multi-layer film. The multi-layer film can include an outer film portion including the embedded tacky layer and an inner film portion. An opening feature formed in the multi-layer film includes a flap configured to be manipulated by a user to create an opening through the multi-layer film. The inner film portion can include a release layer configured specifically to interact with the tacky layer to provide a desired separation peel force and resealing functionalities. The outer film portion can include an outer film layer disposed on an opposite side of the tacky layer from the release layer that is configured to permanently adhere to the tacky layer.

18 Claims, 35 Drawing Sheets

Related U.S. Application Data

(60) Provisional application No. 62/375,283, filed on Aug. 15, 2016.

(51) Int. Cl.

| | | |
|---|---|---|
| *B32B 7/06* | (2019.01) | |
| *B32B 7/12* | (2006.01) | |
| *B32B 27/32* | (2006.01) | |
| *B32B 27/34* | (2006.01) | |
| *B32B 3/26* | (2006.01) | |
| *B65D 65/40* | (2006.01) | |
| *B32B 27/36* | (2006.01) | |
| *B65D 75/26* | (2006.01) | |

(52) U.S. Cl.
CPC .............. *B32B 27/32* (2013.01); *B32B 27/34* (2013.01); *B32B 27/36* (2013.01); *B65D 65/40* (2013.01); *B65D 75/26* (2013.01); *B65D 75/5833* (2013.01); *B65D 75/5838* (2013.01); *B32B 2250/03* (2013.01); *B32B 2250/05* (2013.01); *B32B 2250/24* (2013.01); *B32B 2250/242* (2013.01); *B32B 2270/00* (2013.01); *B32B 2274/00* (2013.01); *B32B 2307/31* (2013.01); *B32B 2307/748* (2013.01); *B32B 2439/00* (2013.01); *B32B 2439/40* (2013.01); *B65D 2575/586* (2013.01)

(58) Field of Classification Search
CPC ............ B32B 2250/03; B32B 2250/24; B32B 2250/242; B32B 2270/00; B32B 2274/00; B32B 2307/31; B32B 2307/748; B32B 2439/00; B32B 2439/40; B65D 65/40; B65D 75/26; B65D 75/5833; B65D 75/5838; B65D 2575/586
USPC .......................................................... 383/203
See application file for complete search history.

(56) References Cited

U.S. PATENT DOCUMENTS

| | | | |
|---|---|---|---|
| 4,521,467 A | 6/1985 | Berger | |
| 4,549,063 A | 10/1985 | Ang | |
| 4,693,390 A | 9/1987 | Hekal | |
| 4,798,295 A | 1/1989 | Rausing | |
| 5,089,320 A | 2/1992 | Straus | |
| 5,308,887 A | 5/1994 | Ko | |
| 5,470,156 A | 11/1995 | May | |
| 5,582,342 A | 12/1996 | Jud | |
| 5,709,310 A | 1/1998 | Kretz | |
| 6,026,953 A | 2/2000 | Nakamura | |
| 6,056,141 A | 5/2000 | Navarini | |
| 6,228,450 B1 | 5/2001 | Pedrini | |
| 6,264,098 B1 | 7/2001 | Drummond | |
| 6,328,203 B1 | 12/2001 | Tedford, Jr. | |
| 6,428,867 B1 | 8/2002 | Scott | |
| 6,511,723 B1 | 1/2003 | Engelaere | |
| 6,777,050 B1 | 8/2004 | Engelaere | |
| 6,918,532 B2 | 7/2005 | Sierra-Gomez | |
| 7,165,888 B2 | 1/2007 | Rodick | |
| 7,371,008 B2 | 5/2008 | Bonenfant | |
| 7,416,768 B2 | 8/2008 | Knoerzer | |
| 7,717,620 B2 | 5/2010 | Hebert | |
| 7,744,517 B2 | 6/2010 | Bonenfant | |
| 7,871,696 B2 | 1/2011 | Kinigakis | |
| 7,927,679 B2 | 4/2011 | Cruz | |
| 8,091,323 B2 | 1/2012 | Paterson | |
| 8,114,451 B2 | 2/2012 | Sierra-Gomez | |
| 8,225,954 B1 | 7/2012 | Triquet | |
| 8,283,010 B2 | 10/2012 | Cruz | |
| 8,283,011 B2 | 10/2012 | Cruz | |
| 8,308,363 B2 | 11/2012 | Vogt | |
| 8,348,082 B2 | 1/2013 | Cain | |
| 8,440,293 B2 | 5/2013 | Yasuike | |
| 8,541,081 B1 | 9/2013 | Ranganathan | |
| 8,617,677 B2 | 12/2013 | Trouilhet | |
| 8,814,430 B2 | 8/2014 | Veternik | |
| 9,260,214 B2 | 2/2016 | Owensby | |
| 9,394,085 B2 | 7/2016 | Nakano | |
| 9,650,194 B2 | 5/2017 | Hetherton | |
| 9,663,282 B2 | 5/2017 | Vogt | |
| 9,850,056 B2 | 12/2017 | Shaw | |
| 9,944,446 B2 | 4/2018 | Huffer | |
| 11,123,963 B2 * | 9/2021 | Blyth | ........................ B32B 7/06 |
| 2003/0183637 A1 | 10/2003 | Zappa | |
| 2004/0118852 A1 | 6/2004 | Barmore | |
| 2005/0031233 A1 | 2/2005 | Varanese | |
| 2005/0247764 A1 | 11/2005 | Sierra-Gomez | |
| 2005/0276525 A1 | 12/2005 | Robert | |
| 2006/0018569 A1 | 1/2006 | Bonenfant | |
| 2006/0066096 A1 | 3/2006 | Kan | |
| 2006/0144911 A1 | 7/2006 | Sierra-Gomez | |
| 2007/0275133 A1 | 11/2007 | Sierra-Gomez | |
| 2008/0037911 A1 | 2/2008 | Cole | |
| 2008/0156861 A1 | 7/2008 | Sierra-Gomez | |
| 2008/0240627 A1 | 10/2008 | Cole | |
| 2008/0260305 A1 | 10/2008 | Shah | |
| 2009/0028472 A1 | 1/2009 | Andersson | |
| 2010/0018974 A1 | 1/2010 | Lyzenga | |
| 2010/0028588 A1 | 2/2010 | Kiuchi | |
| 2010/0113239 A1 | 5/2010 | Peterson | |
| 2010/0172604 A1 | 7/2010 | Andersson | |
| 2010/0278454 A1 | 11/2010 | Huffer | |
| 2012/0043330 A1 | 2/2012 | McLean | |
| 2012/0128835 A1 | 5/2012 | Lyzenga | |
| 2012/0177307 A1 * | 7/2012 | Duan | ...................... B32B 25/08 |
| | | | 383/211 |
| 2013/0056486 A1 | 3/2013 | Latta | |
| 2013/0112341 A1 | 5/2013 | Nagel | |
| 2013/0114918 A1 | 5/2013 | Lyzenga | |
| 2013/0177263 A1 | 7/2013 | Duan | |
| 2014/0079343 A1 | 3/2014 | Lyzenga | |
| 2014/0231434 A1 | 8/2014 | Dietrich | |
| 2014/0263330 A1 | 9/2014 | Thorstensen-Woll | |
| 2014/0314339 A1 | 10/2014 | Docherty | |
| 2016/0013714 A1 | 1/2016 | Young | |
| 2016/0016714 A1 | 1/2016 | Fenech, III | |
| 2016/0122109 A1 | 5/2016 | Clark | |
| 2016/0137377 A1 * | 5/2016 | Tracy | ................. B65D 75/5866 |
| | | | 383/207 |
| 2016/0229614 A1 | 8/2016 | Huffer | |
| 2019/0047266 A1 | 2/2019 | Blyth | |
| 2019/0168491 A1 | 6/2019 | Blyth | |
| 2019/0329954 A1 | 10/2019 | Blyth | |

FOREIGN PATENT DOCUMENTS

| | | |
|---|---|---|
| AU | 2017312939 | 3/2019 |
| AU | 2019283781 | 1/2020 |
| BR | 1120170160293 | 7/2017 |
| CA | 2437857 | 8/2002 |
| CA | 2974136 | 8/2016 |
| CA | 3030994 | 2/2018 |
| CA | 3030998 | 2/2018 |
| CN | 102770352 | 11/2012 |
| CN | 105026285 | 11/2015 |
| CN | 105189306 | 12/2015 |
| CN | 105492340 | 4/2016 |
| CN | 107206738 | 9/2017 |
| CN | 109641428 | 4/2019 |
| CN | 109890723 | 6/2019 |
| DE | 202011050984 | 1/2012 |
| EP | 1582341 | 10/2005 |
| EP | 1775122 | 4/2007 |
| EP | 1939107 | 7/2008 |
| JP | 2003175567 | 6/2003 |
| JP | 2004058568 | 2/2004 |
| JP | 2008502555 | 1/2008 |
| JP | 2009241477 | 10/2009 |
| JP | 2011513153 | 4/2011 |
| JP | 2011184083 | 9/2011 |
| JP | 2012035896 | 2/2012 |

(56) References Cited

FOREIGN PATENT DOCUMENTS

| JP | 2013526466 | 6/2013 | | |
|---|---|---|---|---|
| JP | 2013151329 | 8/2013 | | |
| JP | 2014213910 | 11/2014 | | |
| JP | 2017537973 | 12/2017 | | |
| JP | 2018504297 | 2/2018 | | |
| JP | 2019522600 | 8/2019 | | |
| JP | 2019522601 | 8/2019 | | |
| MX | 2017010055 | 10/2017 | | |
| MX | 2019001249 | 4/2019 | | |
| MX | 2019001518 | 5/2019 | | |
| RU | 2688856 | 5/2019 | | |
| WO | 9515992 | 6/1995 | | |
| WO | 02064694 | 8/2002 | | |
| WO | 2009014879 | 1/2009 | | |
| WO | WO-2010149996 A1 * | 12/2010 | ............ | B32B 15/08 |
| WO | 2011032064 | 3/2011 | | |
| WO | 2011146627 | 11/2011 | | |
| WO | 2011146658 | 11/2011 | | |
| WO | 2013023646 | 2/2013 | | |
| WO | 2014164416 | 10/2014 | | |
| WO | 2016133904 | 8/2016 | | |
| WO | 2018035039 | 2/2018 | | |
| WO | 2018035044 | 2/2018 | | |

OTHER PUBLICATIONS

Examination report No. 1, dated May 30, 2018 for Australian Application No. 2016220188 (3 pgs.).
Examination report No. 2, dated Nov. 20, 2019 for Australian Application No. 2017312939 (3 pgs.).
Examination report No. 2, dated Sep. 8, 2018 for Australian Application No. 2016220188 (3 pgs.).
Examination Report, European Patent Application No. 04405192.8, dated Aug. 11, 2004 (2 pgs.).
Examination Report, European Patent Application No. 07115629.3, dated Mar. 13, 2008 (2 pgs.).
Examination Report, European Patent Application No. 17757647.7, dated Feb. 27, 2020 (5 pgs.).
Examination Report, European Patent Application No. 17761361.9, dated Mar. 12, 2020 (7 pgs.).
Extended European Search Report and the European Search Opinion dated Jun. 30, 2009 for European Appliction No. 06018936.2 (7 pgs.).
International Preliminary Report on Patentability, dated Feb. 28, 2019 for International Application No. PCT/US2017/046759 (10 pgs.).
International Preliminary Report on Patentability, dated Aug. 31, 2017 for International Application No. PCT/US2016/018072 (15 pgs.).
International Search Report and Written Opinion of the International Search Authority, dated Jan. 17, 2018, for International Application No. PCT/US2017/046752 (15 pgs.).
International Search Report and Written Opinion of the International Searching Authority, dated Jul. 2, 2014 for International Application No. PCT/US2014/022380 (8 pgs.).
International Search Report and Written Opinion of the International Searching Authority, dated Nov. 20, 2017 for International Application No. PCT/US2017/046759 (13 pgs.).
International Search Report, dated Jun. 29, 2016 for International Application No. PCT/US2016/018072 (6 pgs.).
Notice of Reasons for Rejection, dated Jan. 6, 2020 for Japanese Application No. 2019-502191, with English translation (11 pgs.).
Notice of Reasons for Rejection, dated Mar. 27, 2019 for Japanese Application No. 2017-537973, with English translation (19 pgs.).
Notification of First Office Action dated Dec. 16, 2019 for Chinese Application No. 201780045214.2, with English translation (18 pgs.).
Notification of Reasons for Refusal, dated Jan. 6, 2020 for Japaense Patent Application No. 2019502189, with English translation (14 pgs.).
Notification of Reasons for Refusal, dated Jul. 2, 2018 for Japanese Application No. 2017-537973, with English translation (14 pgs.).
Notification of the First Office Action, dated Oct. 12, 2018 for Chinese Application No. 201680006451.3, with English translation (21 pgs.).
Notification of the Second Office Action, dated Jun. 5, 2019 for Chinese Application No. 201680006451.3, with English translation (7 pgs.).
Notification of the Third Office Action, dated Nov. 29, 2019 for Chinese Appiication No. 201680006451.3, with English translation (6 pgs.).
Requisition by the Examiner dated Dec. 17, 2019 for Canadian Application No. 3030994 (3 pgs.).
Requisition by the Examiner dated Dec. 9, 2019 for Canadian Application No. 3030998 (5 pgs.).
Requisition, dated Jul. 18, 2018 for Canadian Application No. 2974136 (4 pgs.).
Russian Office Action dated Nov. 20, 2018 for Russian Application No. 2017126278, with English translation (9 pgs.).
Russian Search Report, dated Nov. 15, 2018 for Russian Application No. 2017126278 (2 pgs.).
Written Opinion of the International Searching Authority, dated Aug. 25, 2016 for International Application No. PCT/US2016/018072 (12 pgs.).

* cited by examiner

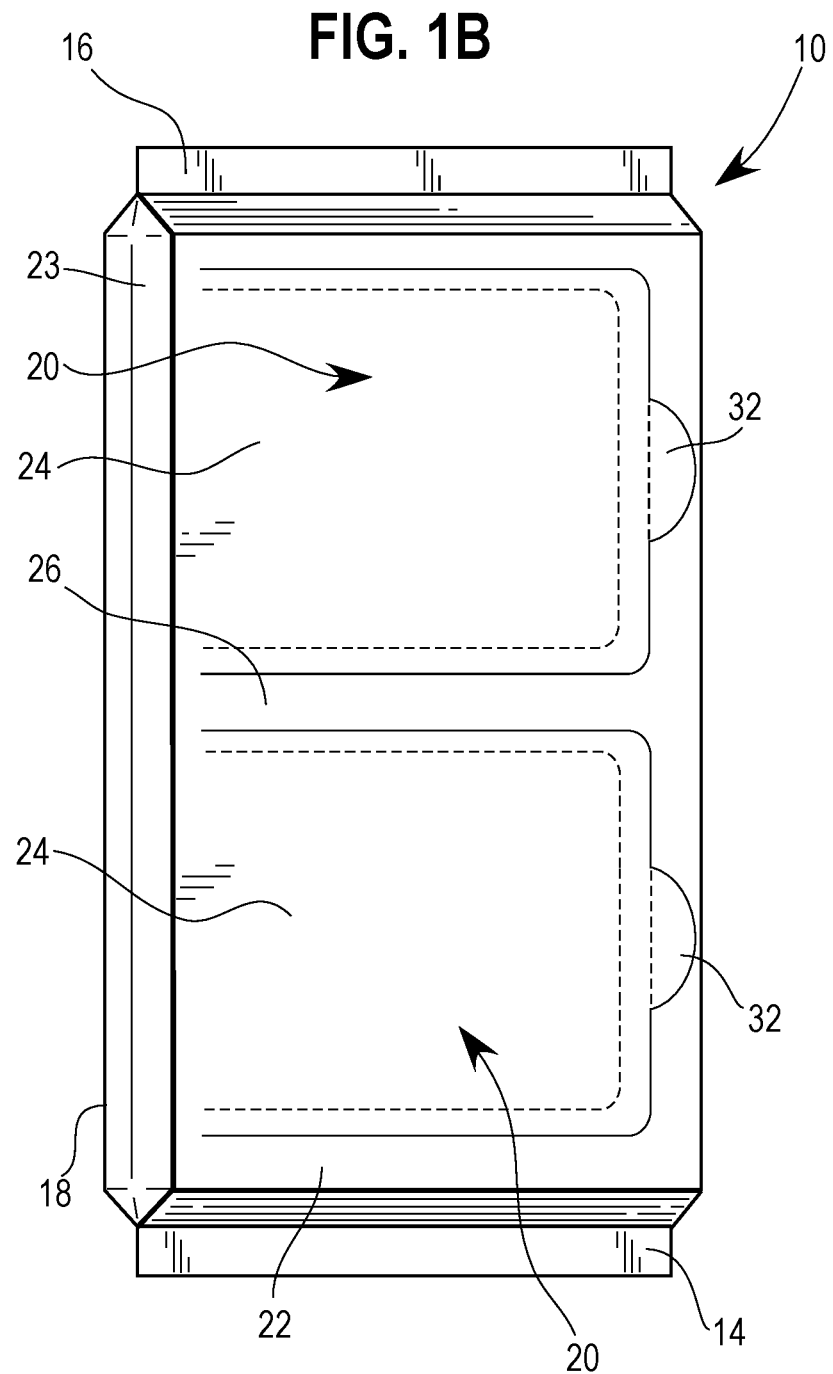

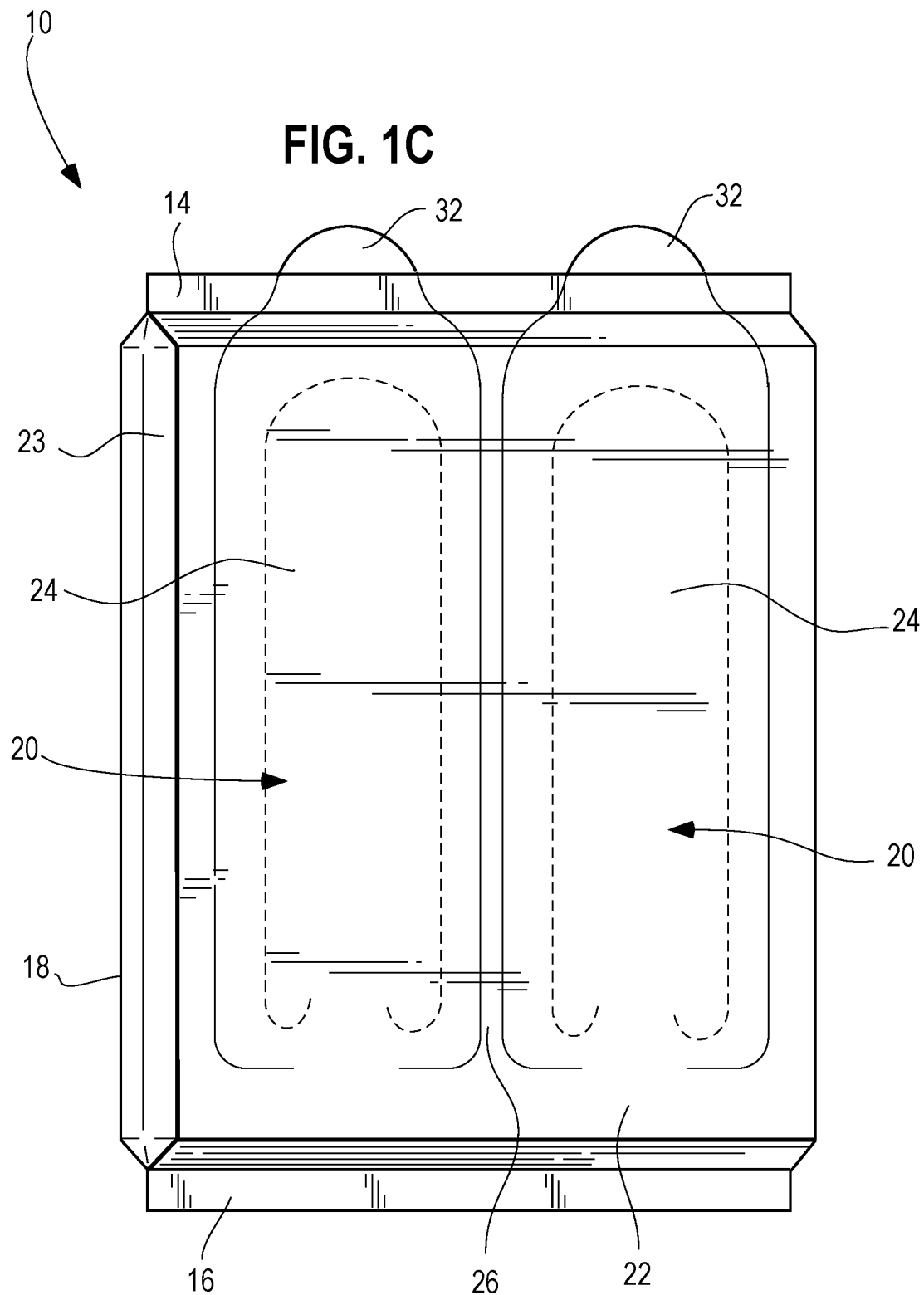

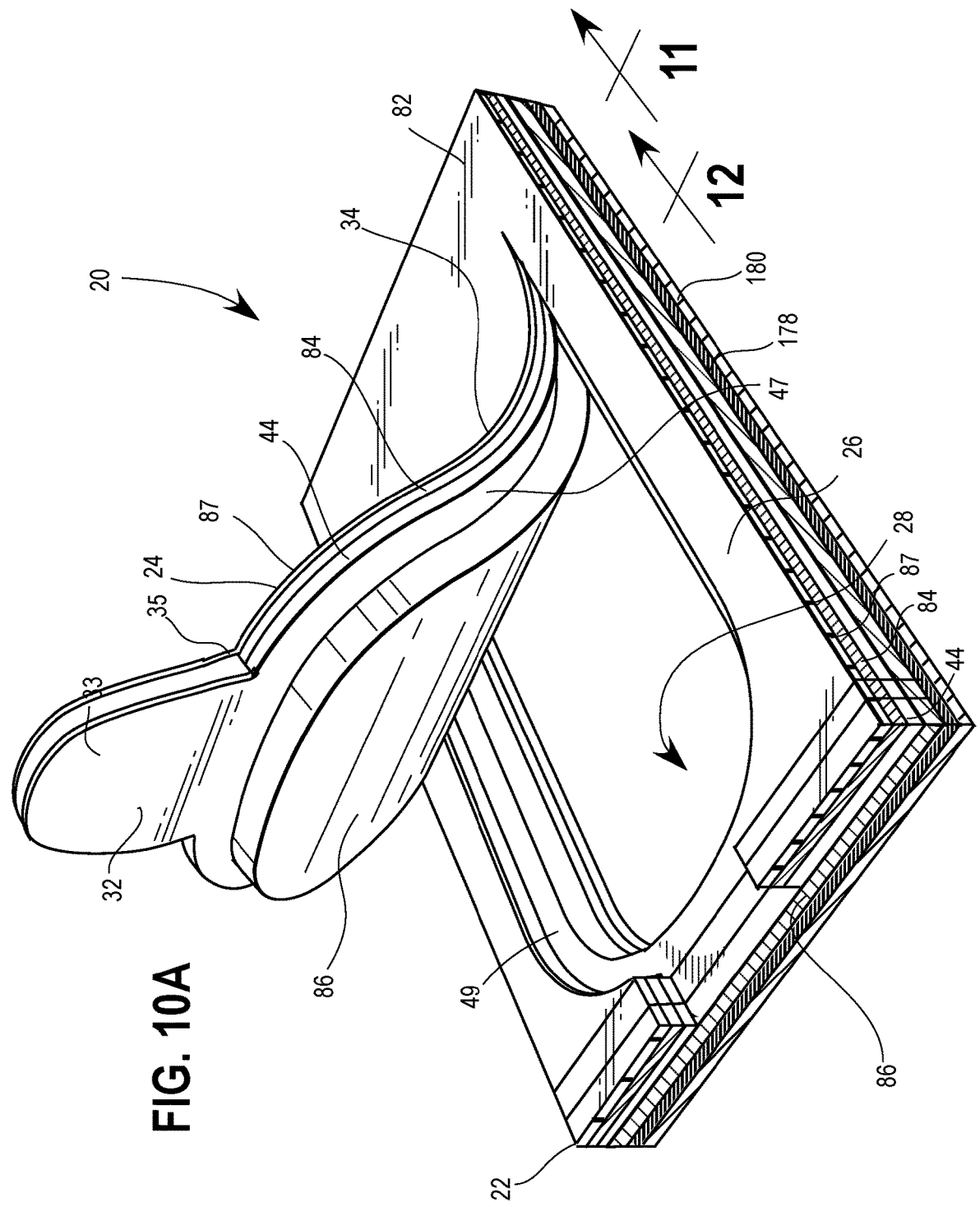

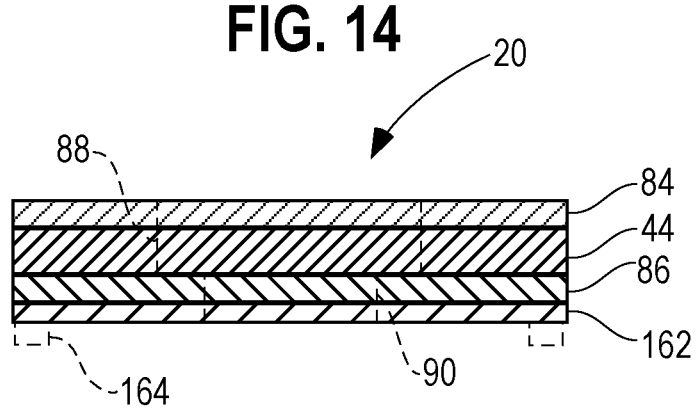
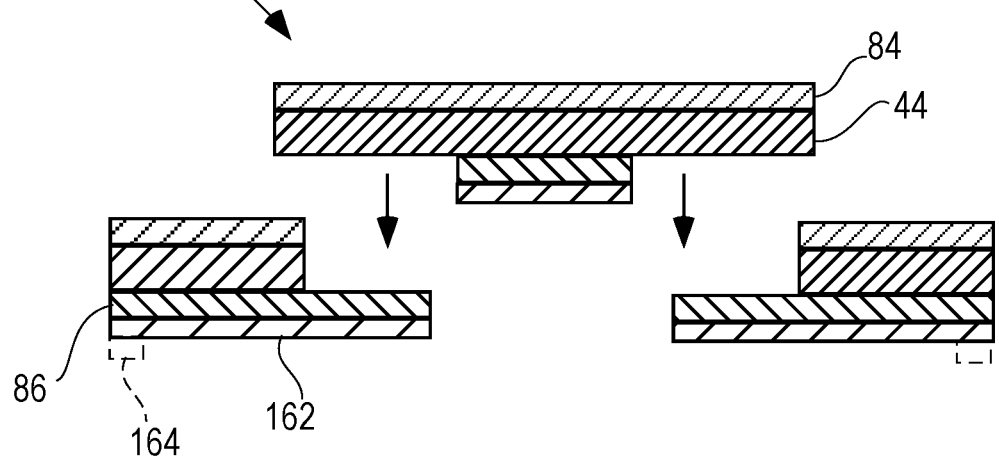

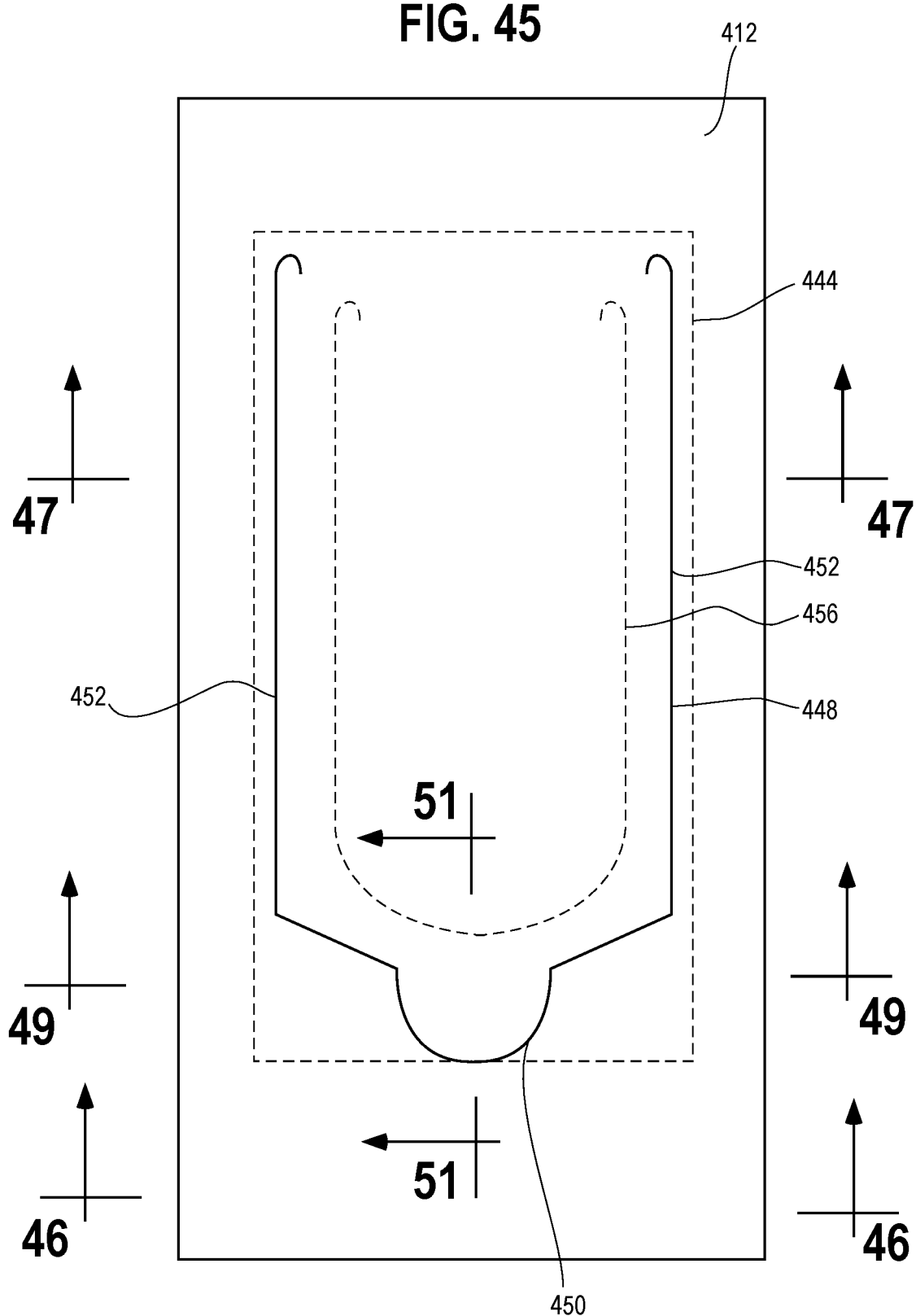

MULTI-LAYER FILM AND RECLOSABLE FILM PACKAGE

CROSS-REFERENCE TO RELATED APPLICATION

This application is a divisional of U.S. application Ser. No. 16/324,091, filed Feb. 7, 2019, which is a U.S. national phase application of International Application No. PCT/US2017/046759, filed Aug. 14, 2017, which claims priority to U.S. Provisional Application No. 62/375,283, filed Aug. 15, 2016, all of which are hereby incorporated by reference herein

FIELD

A multi-layer film, as well as a package made from such a multi-layer film, is described herein, and more particularly, a multi-layer film having a reclosable opening feature.

BACKGROUND

Reclosable film packages can include a dual layer laminate with inner and outer die cuts that define a reclosable flap and a reseal margin. In such packages, two layers are typically joined together using multiple adhesives or deadening agents during a printing, coating, or laminating step, or a pressure sensitive label is applied to a package. Subsequently these adhesives or labels are cut into a predesigned shape or fashion to facilitate creation of a reseal flap in the packaging. The use of multiple adhesives, deadening agents, or labels, as well as a step for lamination or label application, leads to specific requirements and constraints which can add cost and complexity to the manufacturing process.

Another type of package includes a layer of pressure sensitive adhesive and utilizes traditional heat seals to provide a package reclose feature. As such, a consumer can pull the heat seal apart, which can fracture the film forming the package to expose the pressure sensitive adhesive in the area of the heat seal. The consumer can then press the film back together to reclose the package. The initial fracturing of the film during opening, however, can require a large amount of force, which can be difficult for a consumer to apply and control.

SUMMARY

A multi-layer film for forming a package and a film package formed from the multi-layer film are described herein that have resealing materials on a different plane or layer of the film than between the webs making up the film. With this configuration, only one type of adhesive need be utilized between the webs of film rather than the dual patterns of a package using both permanent and resealing adhesive in the same layer between the webs of film. This advantageously can avoid the added costs and complexity associated therewith. Moreover, this approach avoids the use of separate reclosure labels.

A multi-layer film suitable as described herein includes: an outer film portion including an embedded tacky layer, and an inner film portion. At least a portion of the film can be formed via a single step, multi-layer coextrusion, which avoids the costs and extra steps of a lamination process. Additionally, the embedded tacky layer can be different from typical pressure sensitive adhesives. An opening feature formed in the multi-layer film includes a flap configured to be manipulated by a user to create an opening through the multi-layer film. The flap includes an upper portion at least partially defined by an outer cut extending at least partially through the outer film portion and a lower portion defined by an inner cut extending at least partially through the inner film portion. These cuts allow a consumer to easily open the package with less force as compared to fracturing a heat seal in prior packages.

In one form, the outer web of film includes a top film layer, the tacky layer, and a bottom film layer; the inner film portion is an inner web of film; and a permanent adhesive layer is disposed between and adheres the outer and inner webs of film together. For example, the tacky layer can be a tacky core encapsulated between the top film layer and the bottom film layer of the outer web of film (or inner web of film in alternative embodiments). In this form, the outer cut can extend through the top film layer into the middle tacky layer and the inner cut can extend through the inner web of film, the permanent adhesive layer, and at least portions of the bottom film layer.

The outer cut can include a tab portion, shoulder portions, and side portions extending longitudinally from ends of the shoulder portions. The permanent adhesive layer can then include an opening therein aligned with at least a portion of the tab portion of the outer cut so that the tab portion can be easily grasped by a consumer. Moreover, the outer web of film can be transparent or translucent and the permanent adhesive of the permanent adhesive layer can include ink visible through the outer web of film. The inner cut can include a forward edge, a rearward edge, and side edges extending therebetween to define the laminate opening.

The opening feature can further provide controlled easy opening and resealing via a combination of cuts extending partially through the laminate and application of permanent adhesive in the permanent adhesive layer.

By one approach, the inner cut further includes notches that extend rearwardly and outwardly from the forward edge thereof that are aligned with the tab portion of the outer cut. So configured, the notches direct an uncontrolled tear to the side edges of the inner cut so that the remaining tear propagates as desired.

By another approach, the opening feature can include a front cut extending through at least one of the inner web of film, the permanent adhesive layer, and the bottom film layer. The front cut can be disposed forwardly of the forward edge and aligned between the shoulder portions of the outer cut. As such, the permanent adhesive layer can include an opening therein aligned with a forward portion of the tab portion so that a permanent adhesive of the permanent adhesive layer surrounds the front cut.

By yet another approach, the opening feature can further include a middle tab cut extending through the bottom film layer aligned with the tab portion of the outer cut. The middle tab cut can further be spaced from the forward edge of the inner cut. Additionally, the forward edge of the inner cut in the bottom film layer can include a break aligned rearwardly of the tab portion of the outer cut. Next, the permanent adhesive layer can include an opening therein aligned with the tab portion of the outer cut and extending rearwardly to be spaced from the forward edge of the inner cut.

In another form, the package is formed from a coextruded film having an outer film portion, which can include one or more layers, an inner film portion, which can include one or more layers, and a tacky layer encapsulated or disposed therebetween. An opening feature formed in this multi-layer film includes a flap with an upper portion at least partially defined by an outer cut extending at least partially through the outer film layer and a lower portion at least partially defined by an inner cut extending at least partially through the inner film layer. The inner film portion can include a release layer configured specifically to interact with the tacky layer to provide a desired separation peel force and resealing functionalities. Moreover, the outer film portion can include an outer film layer disposed on an opposite side of the tacky layer from the release layer that is configured to permanently adhere to the tacky layer to ensure separation between the tacky and release layer during film opening.

Additionally, a package formed with the multi-layer film including any of the above is also described herein. The package can be formed using any suitable method to surround an interior of the package, which can optionally contain a food product, such as cookies or biscuits, which can optionally be in a tray to support the food products therein for access through the opening provided by the opening feature described above. Other suitable applications for the packages described herein can include personal care, pharmaceutical, agriculture, and electronic industry packages.

A single-step coextruded multilayer film is also described having two adjacent layers that can be peeled apart with a predetermined peel strength, both upon initial peeling and after opening and reclosing. The separation of these two adjacent layers for package reclose is advantageously not limited to heat sealed areas and can instead extend to any desired portion of the film. This allows an opening feature to have any desired design, pattern, or shape as directed by cut or scored lines. As described herein, the two adjacent layers can be a tacky layer of a thermoplastic material, an elastomer material, or blends thereof and an adjacent release layer of a polyamide material or blends thereof. The tacky layer and release layer advantageously have an affinity for one another such that separating the layers requires a peel force as can be provided by a typical consumer, but that also provides reclose and resealing. The coextruded multilayer film can further include a third layer disposed on an opposite side of the tacky layer such that the release layer and the third layer sandwich the tacky layer therebetween. The third layer can be permanently attached to the tacky layer such that the tacky layer separates from the release layer and remains attached to the third layer upon peeling by a consumer.

A flexible package is described that is created using a multilayer coextruded film structure having an encapsulated tacky layer, such as of a extrudable thermoplastic and/or elastomers, and a release layer adjacent to the encapsulated tacky layer. An opening feature in the film structure includes offset inner and outer score lines that form a flap configured to be pulled back by a user. The inner score line defines an opening to an interior of the package exposed when the flap is pulled back. The offset between the inner and outer score lines defines a sealing margin where the encapsulated tacky layer is configured to separate from the release layer along the sealing margin when the flap is pulled back.

By one approach, a multilayer flexible coextruded film is provided that contains a peelable and resealable tacky encapsulated thermoplastic and/or elastomeric layer and is capable of being oriented in a tenter frame process. By another approach, a multilayer flexible coextruded film having the embedded or encapsulated tacky layer can be produced by any suitable film converting method, including, for example, cast film, blown film (typical blown, double bubble, triple bubble, water quenching), machine direction orientation, biaxial orientation, extrusion coating. As such, the multilayer film can be used independently for food packaging applications or can be adhesive laminated for final food packaging applications. In one form, the multilayer film can be adhesive laminate to reverse printed biaxially oriented polypropylene or polyethylene terephthalate, including, for example, metalized, polyvinylidene chloride coated, aluminum oxide coated, silicon oxide coated.

In one illustrative embodiment, the package includes a package opening feature usable to expose a resealable opening. To that end, a multilayer film with a first film layer and a second film layer disposed around an embedded coextruded bonding or tacky layer (wherein the second film includes at least a release and reclose layer for resealability) may have a first cut formed therein that extends from the first film layer at least to the embedded coextruded bonding layer. Furthermore, the package also may include a base film adhered to the first film layer of the multilayer film via an adhesive lamination layer thereby forming a multi-ply multilayer film where the multilayer film and the base film have a non-adhering zone at points therebetween.

The multi-ply multilayer film also may have outer and inner cuts disposed therein. By one approach, the outer cut extends through the base film and at least partially through the embedded coextruded bonding layer and a portion of the outer cut coincides with the non-adhering zone to form, in part, a pull tab. By another approach, the inner cut, which is disposed inwardly from the first cut and the outer cut, may extend from the second film layer to at least the embedded coextruded bonding layer. Further, the resealable opening is formed, in part, from the reseal margin that is defined, in part, by the first cut and a resealable panel defined, in part, by the outer cut and an opening defined, in part, by the inner cut.

As used herein and described in more detail below, the multilayer film may include a polypropylene layer, a coextruded bonding layer, a release and reclose layer, and a heat sealable layer. By one approach, the second film layer includes a heat seal layer in addition to the release and reclose layer and the first cut does not extend through the release and reclose layer and the inner cut extends through the release and reclose layer and to the embedded coextruded bonding layer. Further, the adhesive lamination layer in between the multilayer film and the base film may be disposed in a pre-configured and repeating arrangement or pattern to thereby form a non-adhering zone that is not adhesive.

In one illustrative embodiment, the outer cut may be a multi-depth cut having a first portion and a second portion. For example, the first portion may have a first depth and may coincide with the non-adhering zone to form the pull tab and the second portion may have a second depth that extends from the base film to the embedded coextruded bonding layer. By one approach, the transition between the first and second portion may be a gradual change. By yet another approach, the transition between the first and second portions may be a step-wise change.

In one configuration, the first cut formed in the film prior to the adhering the base film to the multilayer film to form the multi-ply multilayer film may be a single cut or may include a plurality of cuts, such as repeating cuts disposed a distance from one another. In one approach, the plurality of repeating cuts may have different or multiple depths. If the first cut includes a plurality of repeating first cuts, the film allows for variation in registration thereof. Upon initial package opening, the first cut is formed to rupture both the first layer and the coextruded bonding layer.

For ease of assembly, the multilayer film may be coextruded and may include first eye marks printed onto the multilayer film prior to formation of the first cut. In addition, another set of eye marks may be formed or printed onto the base film such that the first eye marks and the second eye marks are matched or aligned prior to and/or during lamination of the multiple plies.

In operation, the package may be formed by extruding a multilayer film with at least a first and second film layers disposed around an embedded coextruded bonding layer and forming a first cut through the first film layer at least to the embedded coextruded bonding layer. In addition, the method may include adhering a base film, via an adhesive lamination layer, to the first film layer thereby creating a multi-ply multilayer film and forming a non-adhering zone between portions of the base film and the first film layer. The method also may include forming an outer cut in the base film that extends through the base film and at least partially through the embedded coextruded bonding layer at some portions and a section of the outer cut configured to coincide with the non-adhering zone to form, in part, a pull tab and forming an inner cut extending from the second film layer at least to the embedded coextruded bonding layer. The formed multi-ply multilayer film may then be wrapped around contents and sealed to form individual packages with resealable openings.

BRIEF DESCRIPTION OF THE DRAWINGS

FIG. 1B is a top perspective view of an alternative film package having two opening features both including flaps adapted to be pulled back;

FIG. 1C is a top perspective view of an alternative film package having two opening features both including flaps adapted to be pulled back;

FIG. 10A is a perspective sectional view of a second embodiment of a segment of film having an opening feature with a flap extending to a heat seal and a tab of the opening feature extending past the end seal showing the flap of the opening feature in an open configuration;

FIG. 14 is a cross-sectional view of an alternative film;

FIG. 15 is a cross-sectional view of the alternative film of FIG. 14 showing an opening feature in the film in an open configuration;

FIG. 36 is a top view of a portion of a multi-ply multilayer laminate formable into a package with a resealable opening, with an alternative construction;

FIG. 45 is a top view of a portion of a multi-ply multilayer laminate formable into a package with a resealable opening, similar to that of FIG. 36 but with an alternative construction in that the tacky layer does not extend the entire width or length of the film;

DETAILED DESCRIPTION

Figure 1A:
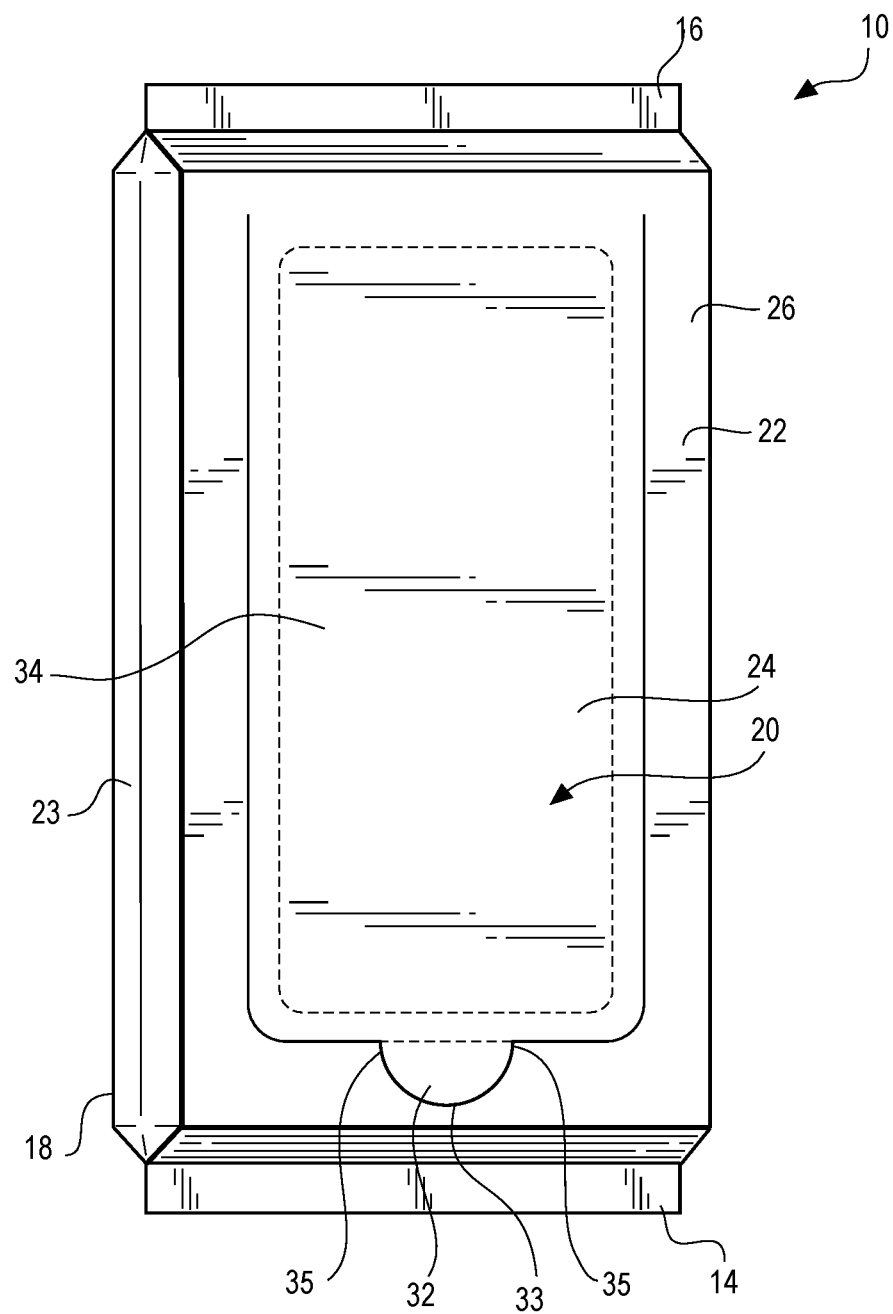
FIG. 1A is a top perspective view of a film package having an opening feature including a flap adapted to be pulled back.

A film package is described herein that utilizes a film having a tacky or bonding layer or core, which can include a material having a sticky or slightly sticky feel, disposed between film layers and a select release layer. As used herein, the tacky or bonding layer has selective room temperature tack to the adjacent release layer meaning the tacky or bonding layer exhibits a selective tack or bond to the adjacent release layer and permitting a repeated room temperature peel and reseal of the tacky or bonding layer to the selected release layer as discussed more herein. As also used herein, the tacky or bonding layer is a layer sandwiched or interposed between two other layers and that adheres to bond of the other layer. The release layer is a layer adjacent the tacking or bonding layer which can be delaminated from the bonding layer, but retains sufficient adhesive bonding characteristics such that it will reseal to the bonding layer when the bonding layer and release layer re-contact each other. Via various opening features, such as those described herein, the tacky layer is configured to delaminate from one or both of the adjacent film layers to maintain its tackiness to provide resealing capabilities for opening and closing film packages. The tacky layer can be continuous throughout the film and preferably covers 100% of the film layer, thereby removing the need for resealable adhesive to be deposited, coated, or laminated in a specific pattern. Additionally, with such a construction, the film provides a reclosure mechanism without the need for a separate adhesive label or a pressure sensitive adhesive.

A package is also provided of a coextruded multi-layer film wherein two coextruded layers of the multi-layer film are separated by a coextruded center layer. The multi-layer film includes a peelable and resealable flap therein such that the multi-layer film can be peeled apart between the two coextruded layers with the coextruded center layer sticking to one or both of the two coextruded layers and resealed by reapplying the flap so that the coextruded center layer holds the two coextruded layers together. By one approach, the peeling apart and resealing can be done at least 10 times. By a further approach, the peeling apart and resealing can be done at least 20 times. In various forms, the coextruded center layer can be a extrudable thermoplastic and/or elastomers, such as the tacky layer materials described herein, and one of the two coextruded layers can be a polyamide material. In one approach or embodiment, the package contains a coextruded portion, wherein layers of the portion can be delaminated without damaging the layers. The portion contains score lines such that when the portion is separated along the score lines, an opening to the package is provided permitting access to the contents, the delaminated layers have sufficient residual adhesion to each other so that when the separated portions are returned to their original position, the package is resealed. In another approach, all layers of the film, laminate, or package herein may be coextensive. Layers of the film, laminate or package may be coextruded in a single operation or may co-extruded in separate extrusions and then laminated or assembled together.

The tacky layer can be can be encapsulated or embedded between adjacent film layers such that the tacky layer is coextensive with the adjacent film layers and exposed during the first opening of the package to thereby reseal the package. In one exemplary form, the tacky layer is a polybutene-based resin. Of course, other tacky resins or natural cling materials, such as a copolymer of polypropylene and polyethylene plastomers and elastomers, or blends thereof, can also be utilized. In some approaches, the tacky layer may be blends of polybutene resins and olefinic elastomers and the release layer may be polyamide-based resins. As such, the tacky layer can stick or cling to the adjacent film layers so that the package can be easily and repeatedly resealed and reopened. More particularly, to open the package, the web of film can internally separate between the tacky layer and release layer utilizing cuts or other lines of weakness, such as scribed lines, perforated lines, or the like, exposing the tacky layer in desired areas for resealing. Additionally, alternative precision cut configurations are described herein that ensure hermetic sealing of the package, but also provide easy opening and desired tear propagation.

The films and packages described herein can further include a release layer next to the tacky layer in the coextruded multilayer structure. The release layer advantageously has enough affinity to the tacky layer to be coextruded as one single multilayer film, but the affinity is weak enough to be pulled apart or easily separated from the tacky layer at desired locations without undue peel strength, e.g., typical forces exerted by human hands opening a package in conjunction with a pull tab designed for the package. This delicate balance of desired affinity between the release layer and the tacky layer while still providing satisfactory separation force as described herein involves a polar polymer resin, such as a polyamide or a blend of polyamide, or other polar polymers including, but not limiting to, polystyrene, polyester, poly methyl methacrylate, polycarbonate, polycaprolactone, polylactic acid, polyhydroxy alkanoate and their copolymers or blends.

The films and packages described herein can also include an outer layer on an opposite side of the tacky layer from the release layer, such that the outer layer and the release layer have the tacky layer disposed therebetween. The outer layer can be permanently adhered to the tacky layer, such that the outer layer and tacky layer cannot be separated without damaging the film structure. As such, separation of the film is directed to a separation between the release layer and the tacky layer as desired.

The tacky layer and inner release layer disclosed herein can, in one form, be separated by a precut pull tab or portion, such that the tacky layer and release layer can be opened and resealed for more than 10 times, and, in another form, more than 20 times.

In a first form, the multi-layer film can be a laminated film. In this form, the tacky layer provides resealing capabilities on a different plane or layer of a multi-layer film laminate than between the webs of film that are laminated together. During lamination, a permanent adhesive can be utilized to join two or more webs of film together to form the multi-layer film and one of the webs of film in the laminate can include the tacky layer. In a second form, the multi-layer film can be a coextruded film, which can advantageously be produced using a single-step coextrusion process. Coextrusion creates a multi-layer film with the built-in tacky layer embedded therein in one step rather than the multi-step process of creating laminates, which includes coating adhesive on the webs of film. A coextruded multi-layer film can be utilized to form a package by itself, or can be laminated to one or more additional webs or layers of film, both of which are described herein.

A package formed from such a multi-layer film can include lines of weakness that extend through portions of the film to create an opening feature therein. By one approach, the opening feature may be a flap or other grasping feature in the film or package. The lines of weakness can extend through a top of the film, through a bottom of the film, or combinations thereof and can be configured to direct tears and/or break portions of the film during opening to thereby delaminate the tacky layer during opening. In the form using a laminate, lines of weakness can also extend through the permanent adhesive layer. By one approach, the lines of weakness can utilize the permanent adhesive during opening, such that initial opening of the package requires breaking or delaminating a portion of the permanent adhesive to thereby provide a tactile indication of initial opening, or provide a tamper indicator feature, and/or start delamination of the tacky layer. Additionally, the permanent adhesive layer can have a deadened or patterned portion so that a gripping portion can be easily grasped by a consumer.

Figure 1D:
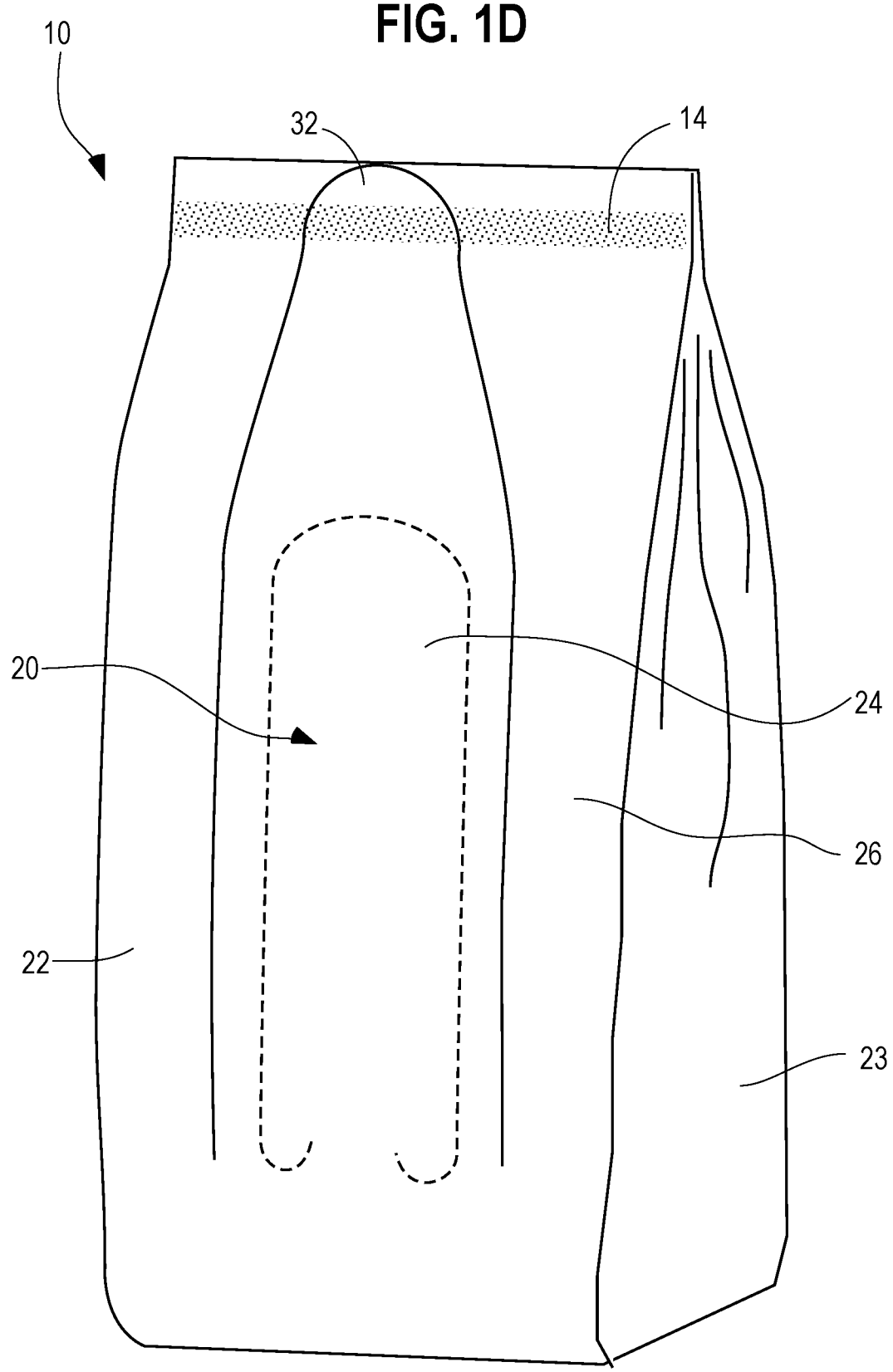
FIG. 1D is a perspective view of an alternative upstanding film package configured having an opening feature on a front wall portion thereof.

A film package 10 constructed from a multi-layer film 12 having these properties is shown in FIGS. 1A, 1B, 1C, and 1D. The film package 10 can be constructed using a standard flow pack process that includes creating forward and rearward transverse end seals 14, 16 and a longitudinal fin seal (not shown) extending therebetween and on an opposite side of the package as compared to the opening feature. In the illustrated form, the package 10 is generally box-shaped with a top wall portion 22, side wall portions 23, and a bottom wall portion 18. An optional tray 25 or the contents of the package 10 themselves can provide internal structure to the package 10, as desired. An opening feature 20 is disposed in the top wall portion 22 of the package 10 that allows a consumer to open and repeatedly reseal the package 10 during sequential use. Of course, as shown in FIGS. 1B and 1C, the package 10 can include two, or more, opening features 20, disposed as desired around the top, sides, or bottom of the package 10, or bridging therebetween, including extending transversely as shown in FIG. 1B or longitudinally as shown in FIG. 1C. Additionally, as shown in FIG. 1D, the package 10 can be configured to rest on one of the ends thereof in an upright orientation. As such, rather than a top wall portion 22, the opening feature 20 is disposed in a front wall portion.

Figure 3:
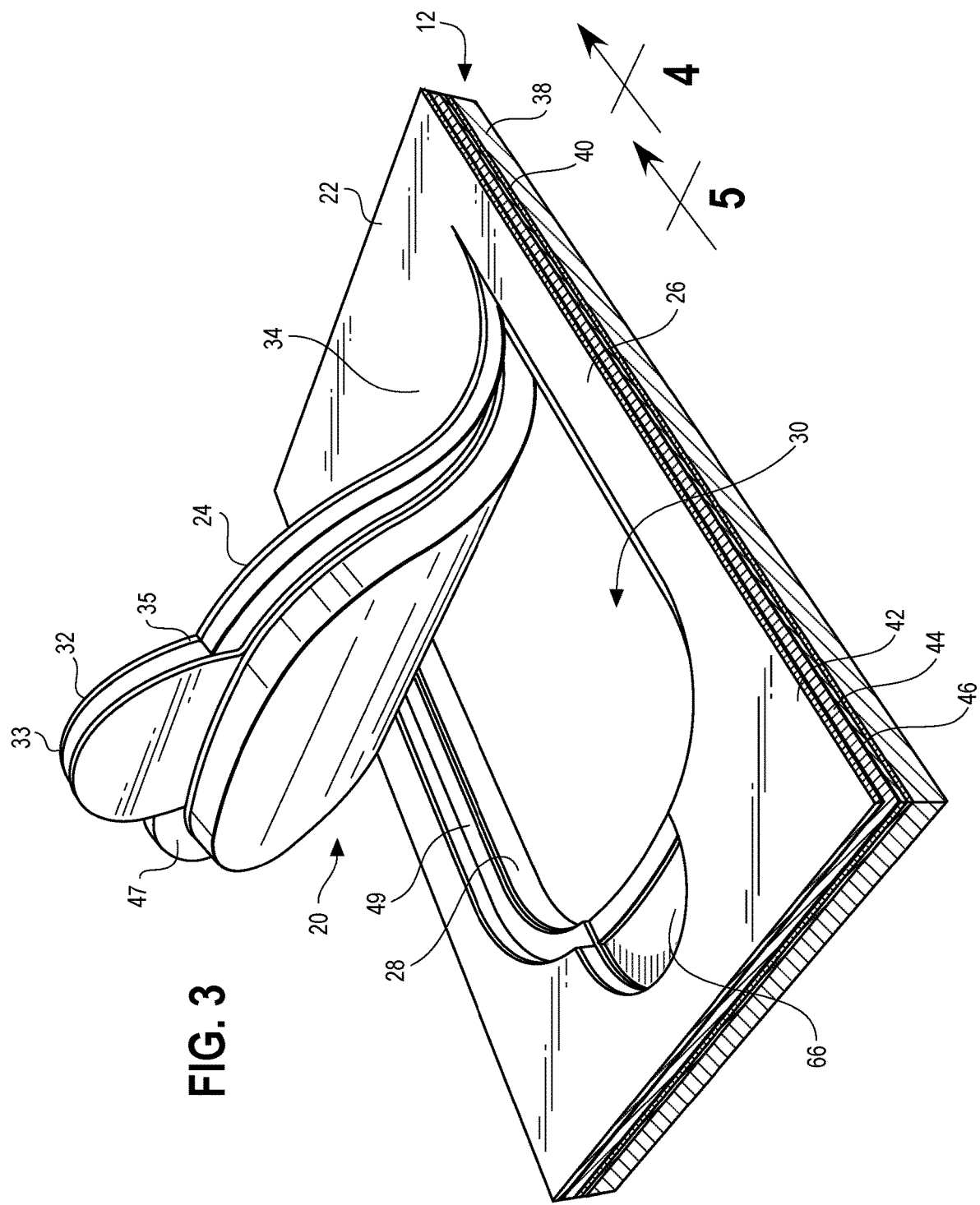
FIG. 3 is a perspective sectional view of a segment of a first embodiment of the top of package of FIG. 1A showing the flap of the opening feature in an open configuration.
Figure 3A:
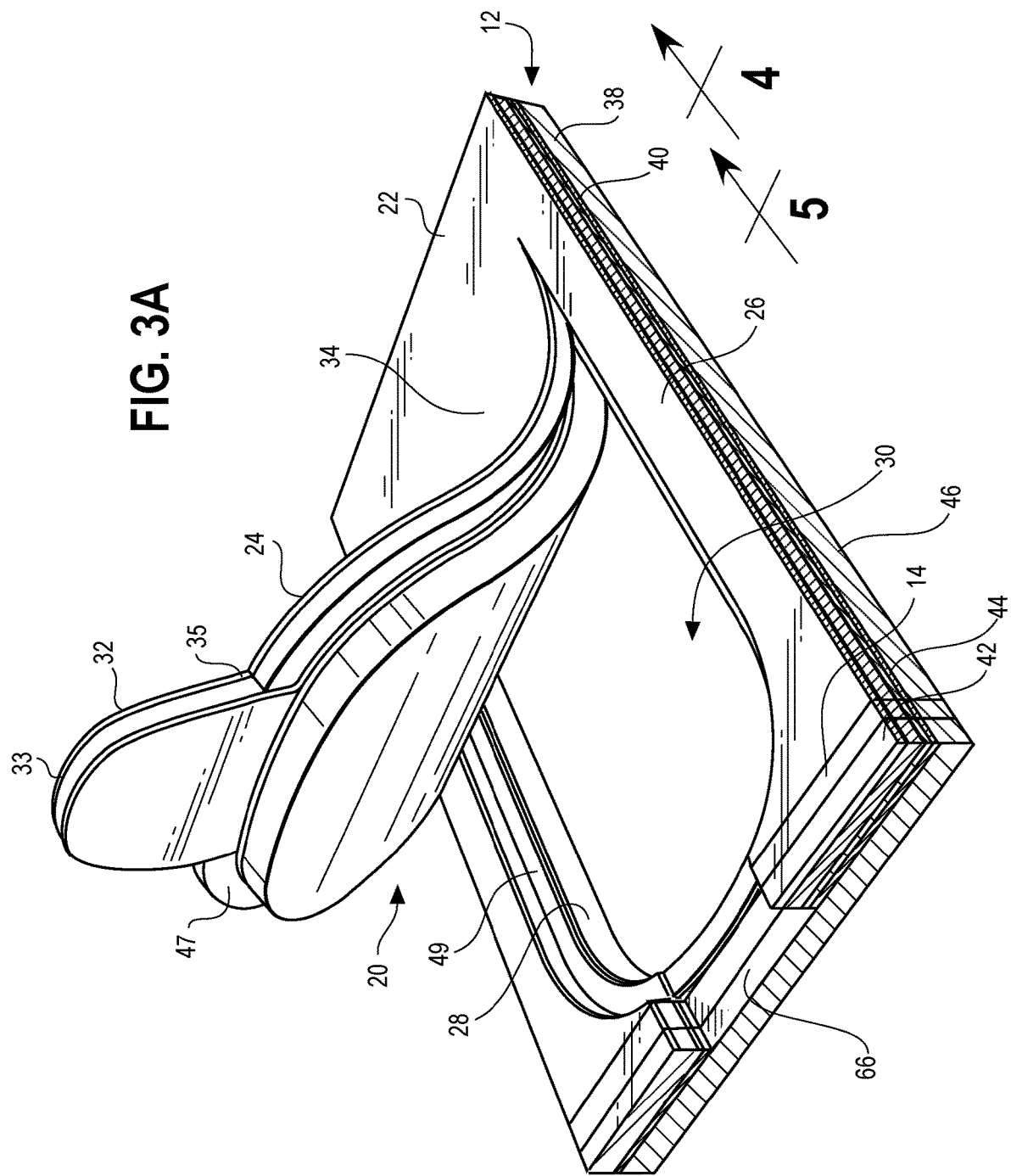
FIG. 3A is a perspective sectional view of a first embodiment of a segment of film having an opening feature with a flap extending to a heat seal and a tab of the opening feature extending past the end seal showing the flap of the opening feature in an open configuration.
Figure 10:
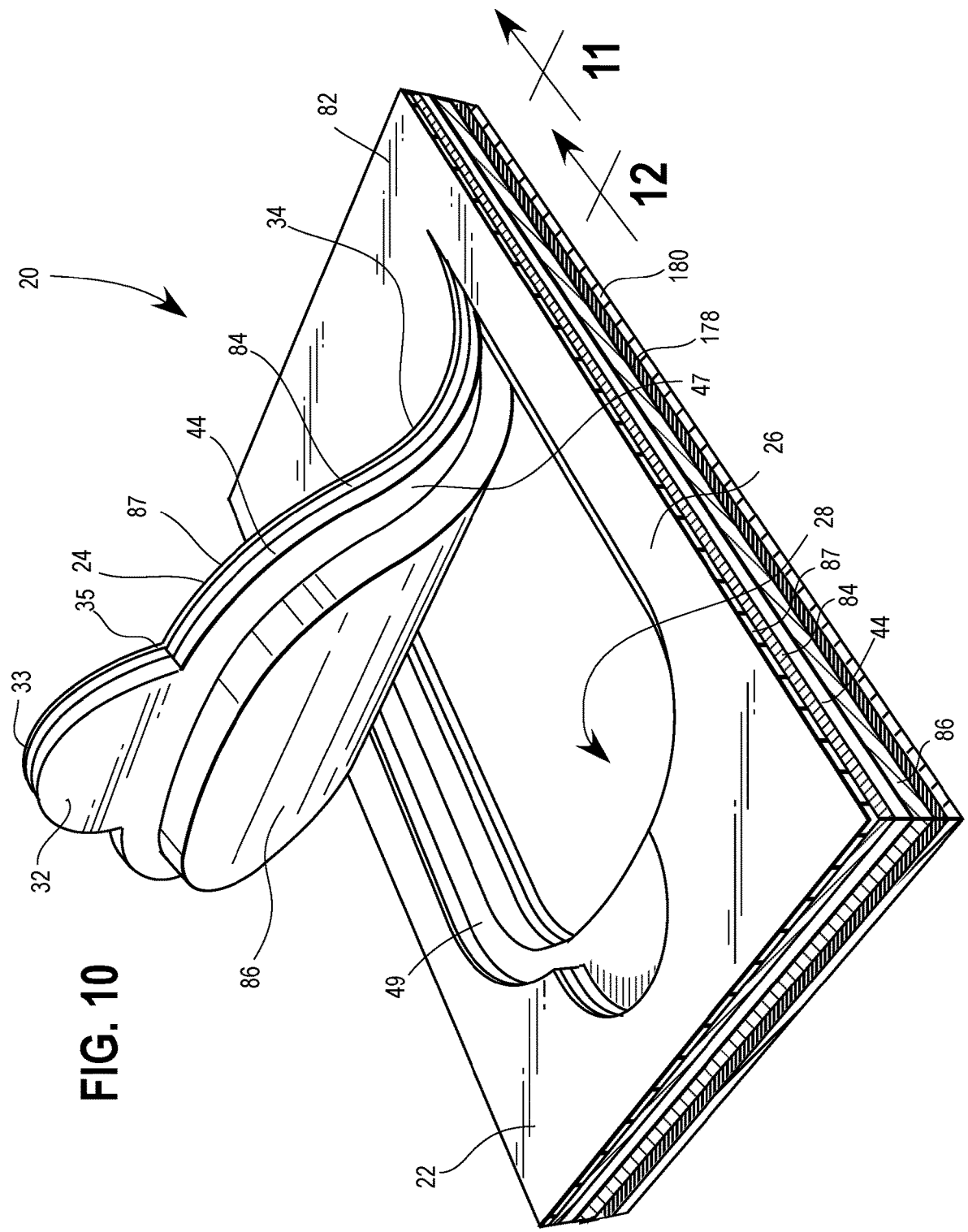
FIG. 10 is a perspective sectional view of a segment of a second embodiment of the top of the package of FIG. 1A showing the flap of the opening feature in an open configuration.

The opening feature 20 includes a flap 24 of the top wall 22 that can be separated and partially pulled away from a remaining portion 26 of the top wall 22 to reveal an opening 28 into an interior 30 of the package 10. The flap 24 can include a gripping tab 32 that projects away from a main portion 34 of the flap towards the forward end seal 14. The tab 32 is configured to provide a consumer a convenient gripping surface for opening the package 10. As shown, the tab 32 includes a forward curved portion 33 and generally parallel longitudinal sides 35. Further, as shown in FIG. 1C, the opening feature 20 can extend from the top wall portion 22 to the end seal 14 with the tab 32 projecting past the end seal 14. In this configuration, a user would grip the tab 32 and pull the flap 24 generally away from the top wall 22, breaking through the end seal 14 and opening the package as described above. Additional, embodiments of opening features extending past an end seal are shown in FIGS. 3A and 10A.

In the illustrated form, the package is generally box-shaped with a generally rectangular cross-section. Of course, other package shapes can also be utilized, such as other polygonal shapes, such as triangular, rectangular, square, pentagonal, etc., curved shapes, such as round, oval, etc., curvilinear shapes, such as track shaped, etc., or combinations thereof. Additionally, the shape of the package can be generally defined by the tray 25 and/or the contents disposed therein.

Figure 2:
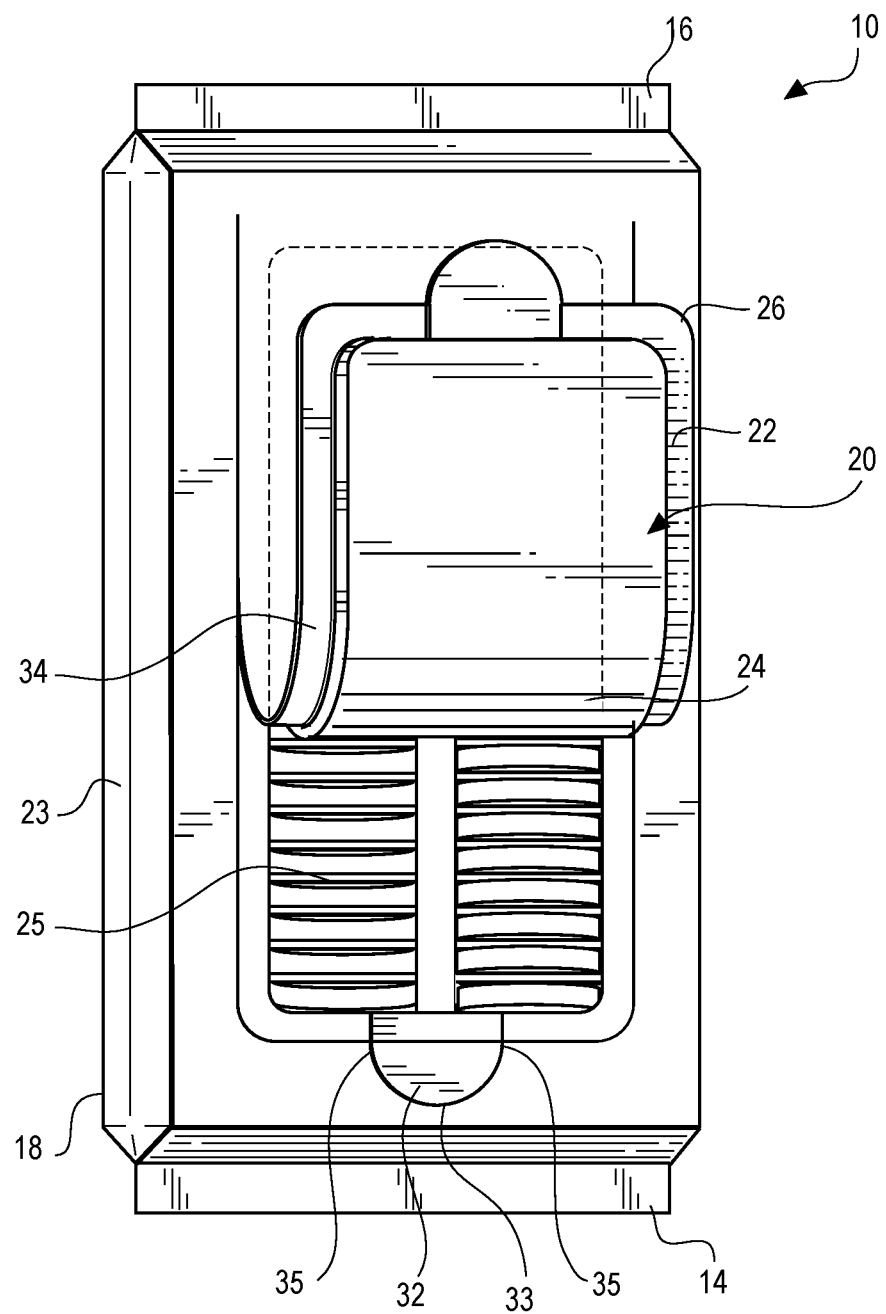
FIG. 2 is a top perspective view of the film package of FIG. 1A showing the flap of the opening feature pulled back to reveal a tray and food products within a package interior.
Figure 2A:
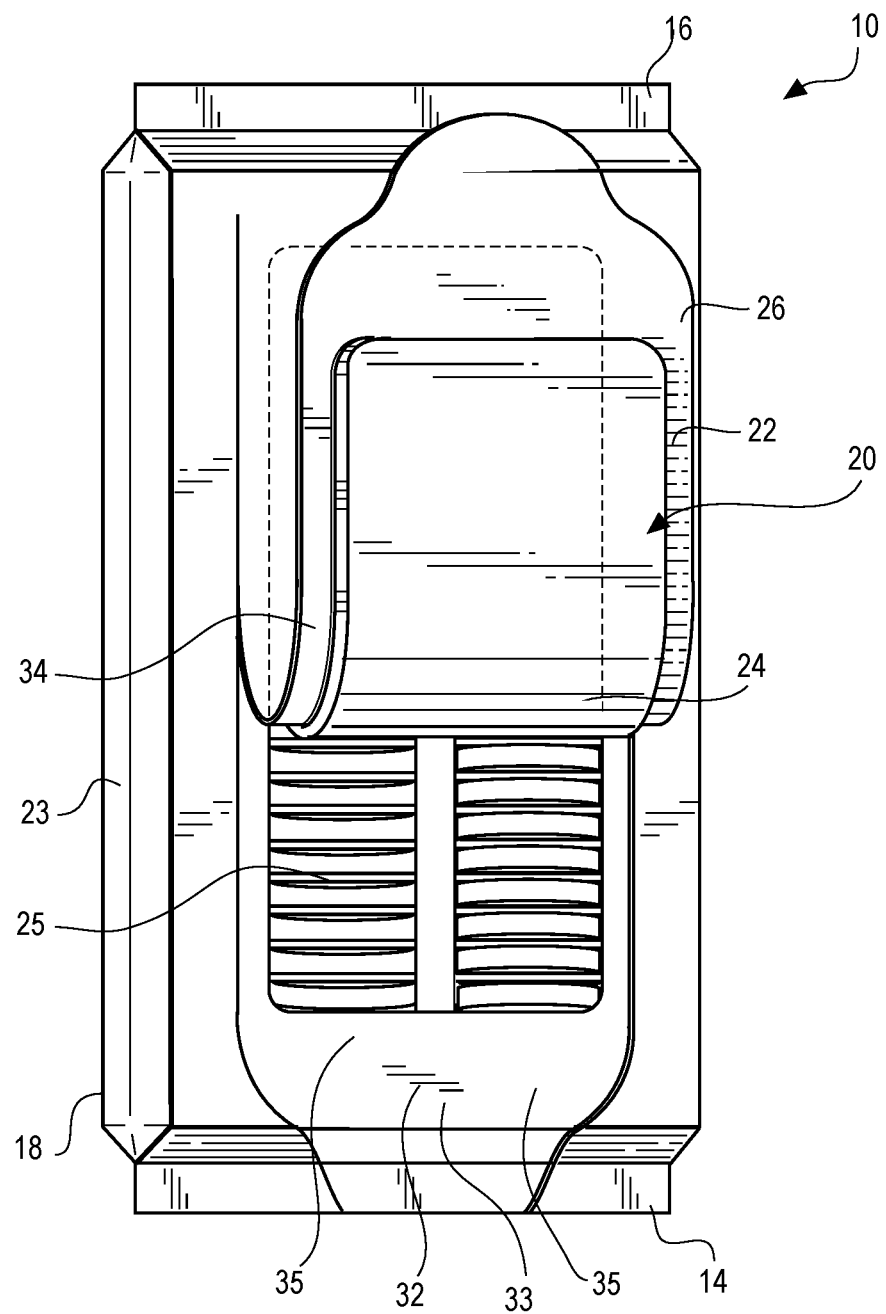
FIG. 2A is a top perspective view of an alternative film package having an opening feature including a flap adapted to be pulled back extending past an end seal of the package, showing the flap pulled back to reveal a tray and food products within a package interior.
Figure 4:
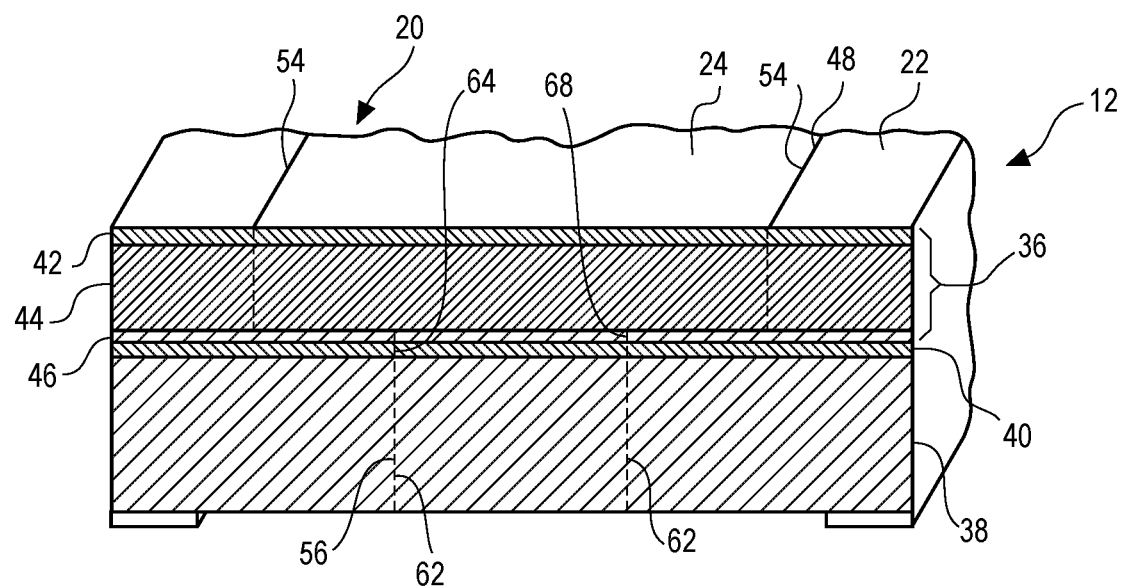
FIG. 4 is a cross-sectional view of the segment of the top of the package of FIG. 3 taken along the line 3-3 showing inner and outer cuts of the opening feature in a closed configuration.

In one form, the film 12 can be a laminate 13. A cross-section of an example laminate 13 is shown in FIGS. 2-4. As shown, the laminate 12 includes outer and inner webs of film 36, 38 joined together with a permanent adhesive layer 40 disposed therebetween. The outer web 36 has a multi-layer construction that includes a tacky or bonding layer or core 44 for resealing purposes, which can be created by a suitable film extrusion process as described. This film producing process can be blown film (single double or triple bubble process), cast film, mono-axially stretched film, or biaxially stretched film (either simultaneous or sequentially stretched) and the final material may also be metalized, coated or otherwise treated to impart additional functionality. In the illustrated form, the outer web 36 includes a top film layer 42, the tacky layer 44, and a bottom film layer 46. Of course, additional layers can also be utilized as desired or required for a particular application. The inner web 38 can be biaxially oriented polypropylene, polyethylene terephthalate, polyethylene, polylactic acid, polyhydroxy alkanoate, and blends of these polymers, metalized or coated variants of such films or indeed any other extruded multilayer or monolayer films. To create the laminate 12, the inner web 38 can be printed and adhesive laminated to the outer web 36 in a standard lamination process or other suitable process. Each layer of the film or the combined layers may have a thickness of at least 5 µm, 10 µm, 15 µm, 20 µm, 25 µm, 30 µm, 50 µm or 100 µm. Each layer of the film or the combined layers may have a thickness of no more than 750 µm, 500 µm, 400 µm, 300 µm or 250 µm. A preferred range of thickness of the combined layers is 10 µm-250 µm or 20 µm-200 µm.

As shown, the tacky layer 44 is encapsulated or embedded between the top and bottom film layers 42, 46. As such, the tacky layer can bond to the top and bottom film layers 42, 46 so that the package 10 can be easily and repeatedly resealed and reopened. To this end, the tacky layer 44 has a stronger bond to the top film layer 42 than to the bottom layer 46. The outer and inner webs of film 36, 38 are shown with 3 layers and 1 layer respectively, but it will be understood that any of the layers can itself be a laminate with a multi-layer construction. More specifically, the multi-layer film with the embedded tacky layer can be laminated through adhesive, extrusion, or tandem lamination or extrusion coated other films to form a complex film. Additionally, although the cut is shown as perpendicular in the figures, angled tears or fractures through the tacky resin also result in a viable reseal. Moreover, the package can be resealed whether the tacky resin is entirely disposed on the flap 24, entirely on the bottom film layer 46, or portions on both such as when opening the package 10 fractures through the tacky resin 44 itself.

Described generally and shown in FIGS. 2-4, the opening feature 20 utilizes the tacky layer 44 for package reclose. Pulling the flap 24 generally away from the top wall 22 breaks or separates cuts in the outer web 36 and inner web 38 to expose the opening 28, as well as a reseal margin 47 of the middle tacky layer 44 and a reseal margin 49 of the bottom film layer 46. The reseal margins 47, 49 are created by cuts in the upper web top film layer 42 and middle tacky layer 44 being dimensionally larger than cuts in the inner web 38, permanent adhesive layer 40, and bottom film layer 46, as described in greater detail below. By non-limiting example, the reseal margins 47, 49 can be between about 5 mm and about 40 mm wide, and more specifically between about 10 mm and about 15 mm, and more specifically between about 12 and about 13 mm wide to provide satisfactory resealing during use. Of course, other measurements and sizes can also be utilized for particular applications as needed or desired. For example, a relatively small package can utilize an approximately 5 mm reseal margin, while a larger package can utilize an approximately 10-15 mm reseal margin. So configured, a consumer is provided the convenience of a resealable package without the need for multiple adhesives being disposed in patterns on the same plane or layer within the laminate.

The opening feature 20 is defined by cuts or other lines of weakness formed by dies, lasers, or the like. In the illustrated embodiments, an outer cut 48 extends through the top film layer 42 and the middle tacky layer 44 to create a top portion of the flap 24. The outer cut 48 includes a top tab portion 50, outwardly extending shoulder portions 52, and opposite side portions 54 that run longitudinally down the package top wall 22 toward the rearward end seal 16. If desired, distal ends 55 of the side portions 54 can have tear stopping features, such as hooks or the like. In other embodiments, such as that shown in FIGS. 1C and 3A, the flap 24 can extend to the end seal 14 and the tab 32 can extend therepast.

Other embodiments do not require an outer cut such as those shown. For example, a tab portion 50 can be cut into the top film layer 42 and pulling on the tab can interact with cuts made in interior and/or bottom layers, such as those described below. With this configuration, the top film layer 42 tears during opening. In one form, this tearing can be controlled by utilizing a film with tear-directing properties.

Various embodiments for cuts made in the bottom film layer 46, the permanent adhesive layer 40, and the inner web 38 are shown in FIGS. 6-9. In a first form, the inner web 38 includes an inner cut 56 having a forward edge 58, a rearward edge 60, and side edges 62 that define the opening 28 into the package 10 and creating a bottom portion of the flap 24. In this form, the inner cut 56 has a rectangular shape with slightly rounded corners that help with controlled propagation during opening. Of course, other shapes can also be utilized, whether depending on the shape of the package, for specific package contents, or other desired aesthetic. For example, the bottom cut can include curvilinear portions creating rounded ends and/or sides, a waisted portion, or the like.

The permanent adhesive layer 40 includes an adhesive cut 64 that is substantially identical to the inner cut 56. Permanent layer 40 forms a bond between layers 46 and 38 that does not separate upon pulling and package opening. Although shown as a separate layer for illustrated purposes, it will be understood that the adhesive layer 40 is applied to one or both of the webs of film 36, 38. In the illustrated form, the adhesive cut 64 includes the forward, rearward, and side edges 58, 60, 62. In one approach, the bottom and adhesive cuts 56, 64 are made simultaneously into the laminate 12 with any suitable method, such as with a laser or die. As shown, the permanent adhesive layer 40 can be applied in a pattern leaving an open portion 66 aligned with some or the entire tab 32 which leaves the tab unadhered for easy gripping by a consumer. Alternatively, a registered adhesive kill can be applied in the open portion 66.

The bottom film layer 46 includes a middle cut 68 that is largely identical to the bottom and adhesive cuts 56, 64. As used herein, the bottom film layer 46 may also be referred to as a release layer. More specifically, the rearward and side edges 60, 62 are identical, while the forward edge 58 has a different configuration in an area aligned with the tab 32. In this first form, the middle cut 68 includes a middle tab portion 70 that extends away from the forward edge 58 to align with the top tab portion 50, albeit with longer sides 72 than the top tab portion 50 that extend to connect to the smaller-dimensioned middle cut 68. So configured, when a consumer grips the tab portion 32 and pulls outwardly and rearwardly, the customer must pull to overcome the portion of permanent adhesive adhering the bottom film layer 46 to the between the open tab portion 66 and the forward edge 58. After that portion of permanent adhesive breaks, the consumer can then continue to pull the flap 24 backward thereby continuing to break the outer and inner cuts 48, 56 to reveal the opening 28. Bottom film layer 46 may be a polyamide. In some approaches, the layer 46 may be about 0.5 to about 50 microns thick, and preferably about 0.5 to about 30 microns thick, and more preferably about 0.5 to about 20 microns thick.

Figure 5:
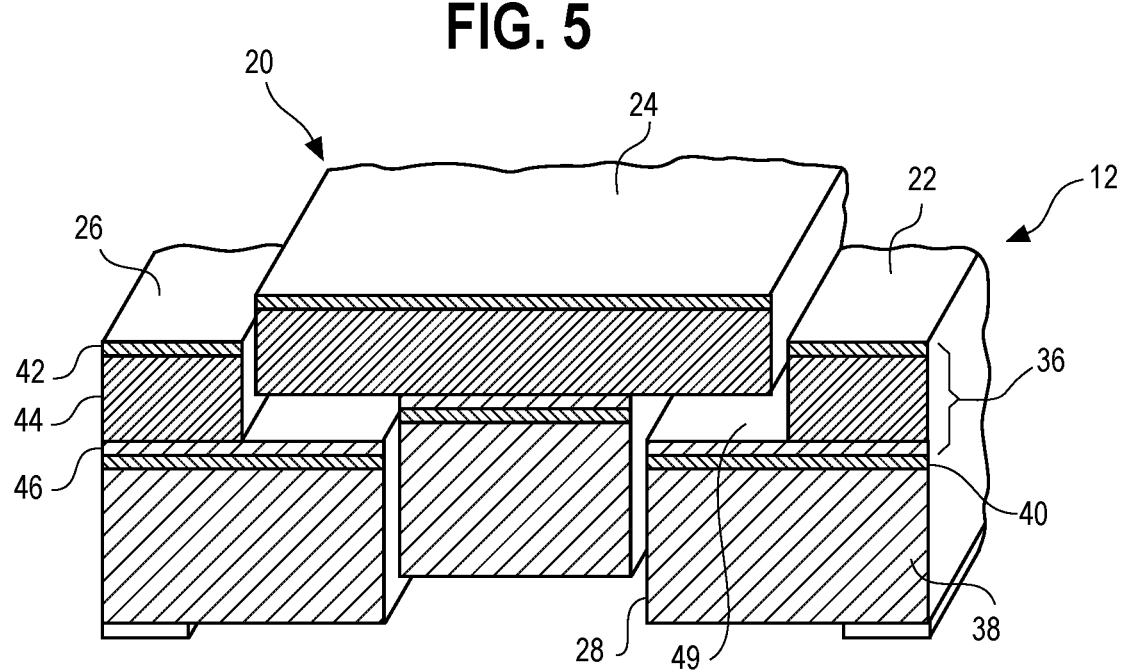
FIG. 5 is a cross-sectional view of the segment of the top of the package of FIG. 3 showing the inner and outer cuts separated in an open configuration.
Figure 6:
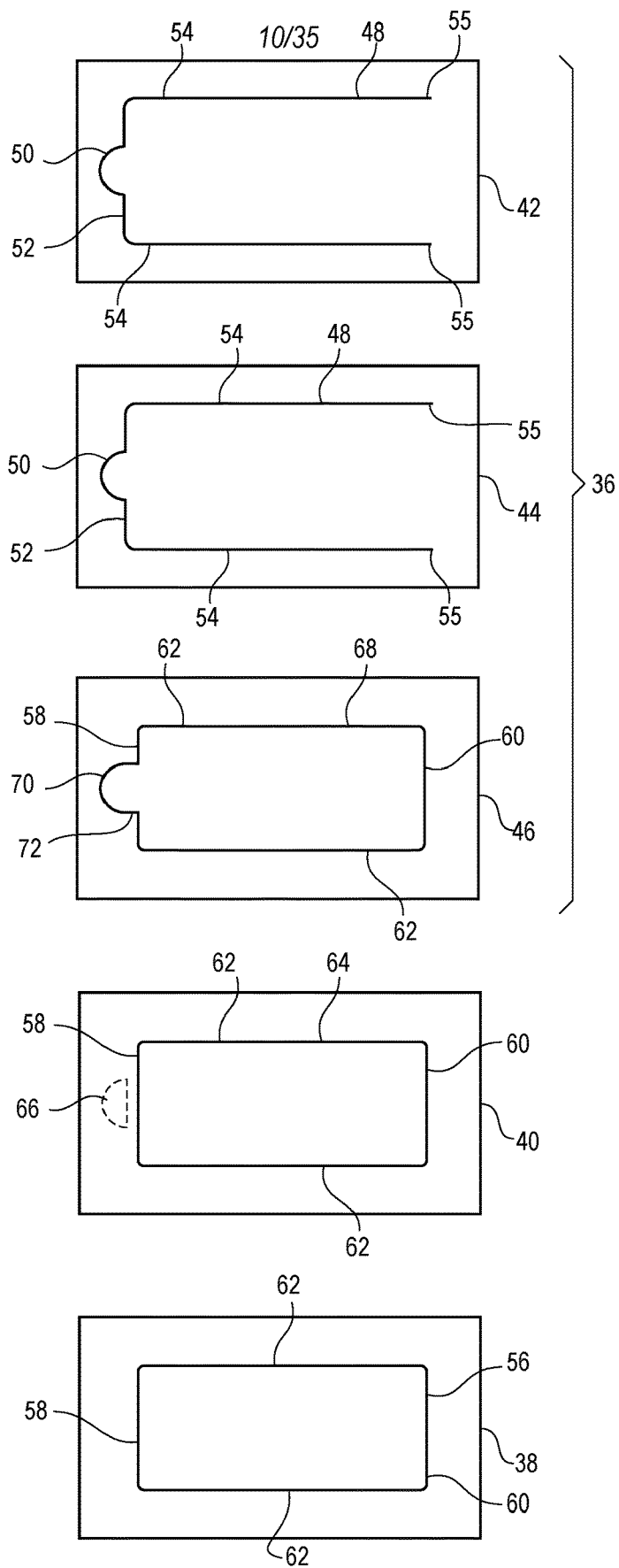
FIG. 6 is a top plan cut-out view of an upper web of film having three layers, a permanent adhesive, and a lower web of film showing details of an example opening feature.

By one approach, the bottom film layer or release layer 46 directly contacts the tacky or bonding layer 44 as shown in FIGS. 5 and 6. The bottom film layer or release layer 46 includes a select polymer or blend including at least one of a polyamide polymer and blend thereof of the following structures:

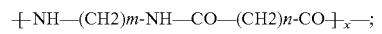

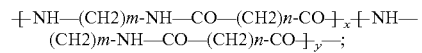

wherein, in the first structure, m and n are independently (can either be the same or different numbers) an integer from 4 to 64; in the second structure, m is 6 and n is either 6 or 36, depending on if they are in a hard or soft region of the polymers, and/or includes an aromatic polyamide including one or more of the following structures

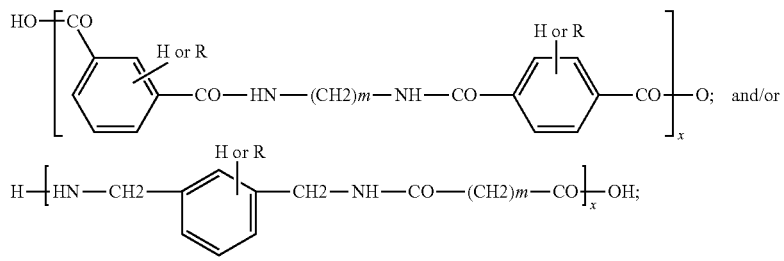

wherein m is an integer from 4 to 64 and R is an alkyl group on the aromatic ring. By one approach, the release layer 46 may be a thermoplastic polyamide elastomer, which are high-performance thermoplastic elastomer block copolymer, based on polyamide and polyethers, polyesters, or polyolefins. They may contain alternating hard and soft segments joined by amide linkage functional bonds. In the formulas above x and y are preferably each greater than 1000, and in other approaches greater than 2000.

The tacky layer 44 may be a layer formed out of polybutene-1-based resins and, in some approaches, may be a layer formed out of olefinic specialty elastomers, and in further approaches, blends of polybutene-1 resins and olefinic elastomers. Although these resins may not be recognized for their tacky properties, we have discovered that the surface energy of these resins and/or blends display tacky behavior that can adhere to release layers as described herein with minimal pressure, such as the weight of the separated film, finger, or hand pressure, depending the tacky layer formulation. The design and formulation of both the tacky layer and the design and formulation of the release layer can be optimized as described herein to ensure reliable and satisfactory performance during opening, reseal, and reopening. Moreover, the resins and blends discussed herein have European and U.S. Food and Drug Administration compliance for use in direct food contact applications.

The polybutene-1 resin maybe a high molecular weight resin with a density of about 0.9 g/cm3 and melt flow index (MFI) of 3.0 g/10 min at 190° C., 2.16 kg. In some approaches, the layer 44 may be about 5 to about 50 microns thick and preferably about 5 to about 30 microns thick, and more preferably about 5 to about 20 microns thick. In some approaches, the polybutene-1 resin can be high molecular weight isotactic, semi-crystalline thermoplastic polyolefins produced through the polymerization of butene-1 and ethylene, and/or propylene comonomers.

The tacky or bonding layer 44 may also be blends of polybutene-1-based resins and other olefinic specialty elastomer resins. Preferred blends include about 5 to about 95% of the polybutene-1 resins and about 95% to about 5% of the olefin resins. In some approaches, preferred ratios of the polybutene-1 to olefinic elastomer may be about 5% to about 20% polybutene-1 to about 95% to about 80% olefinic elastomers. Samples of the olefinic specialty elastomers may be Vistamaxx by ExxonMobil, Versify by Dow Chemical, Catalloy by LyondelBasell. In some approaches, the tacking or bonding layer may have a melt flow index from about 1 to about 3.5 g/10 mins at 190 C/2.16 kg, and in other approaches, about 1.4 to about 3 g/10 mins at 190 C/2.16 kg. In another approach, the tacky or bonding layer including at least one of polybutylene, polyethylene, and polypropylene, and blends and copolymers thereof;

By one approach, the tacky layer 44 can include propylene-based copolymers, either alone or blended with other resins. These copolymers can be produced using metallocene catalyst technology. The propylene-based copolymer includes semicrystalline copolymers of propylene and ethylene. The copolymers can have high propylene levels, for example greater than 80 wt %, with isotactic stereochemistry. The copolymers can further have uniform inter- and intramolecular composition and crystallinity distribution. The crystallinity can be modulated with ethylene to produce a very soft end product with an elasticity unlike other polyolefin polymers, blends, or alloys. For example, about 5 to about 25% crystallinity has a large amorphous fraction. Different grades of these copolymers can be created by varying the amount of polyethylene copolymers. Various grades, including 7010FL, 6102FL, 3980FL, 3020FL, were all found to provide suitable peel strength and resealing, albeit at varying levels.

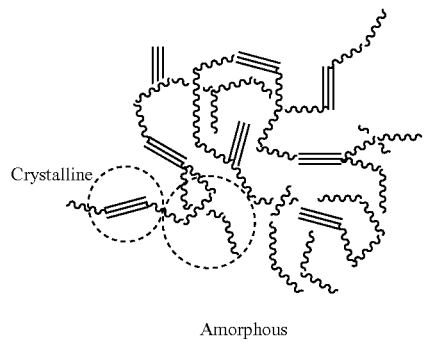

Figure 7:
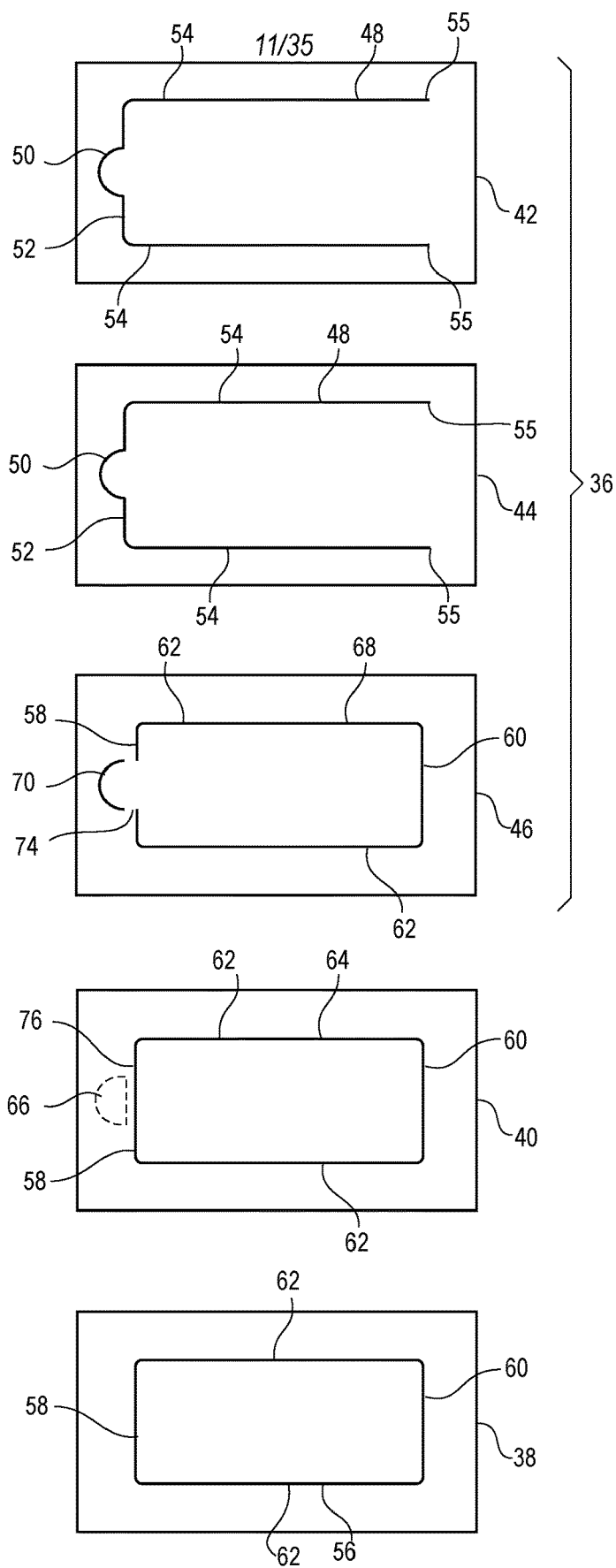
FIG. 7 is a top plan cut-out view of an upper web of film having three layers, a permanent adhesive, and a lower web of film showing details of a second example opening feature.
Figure 8:
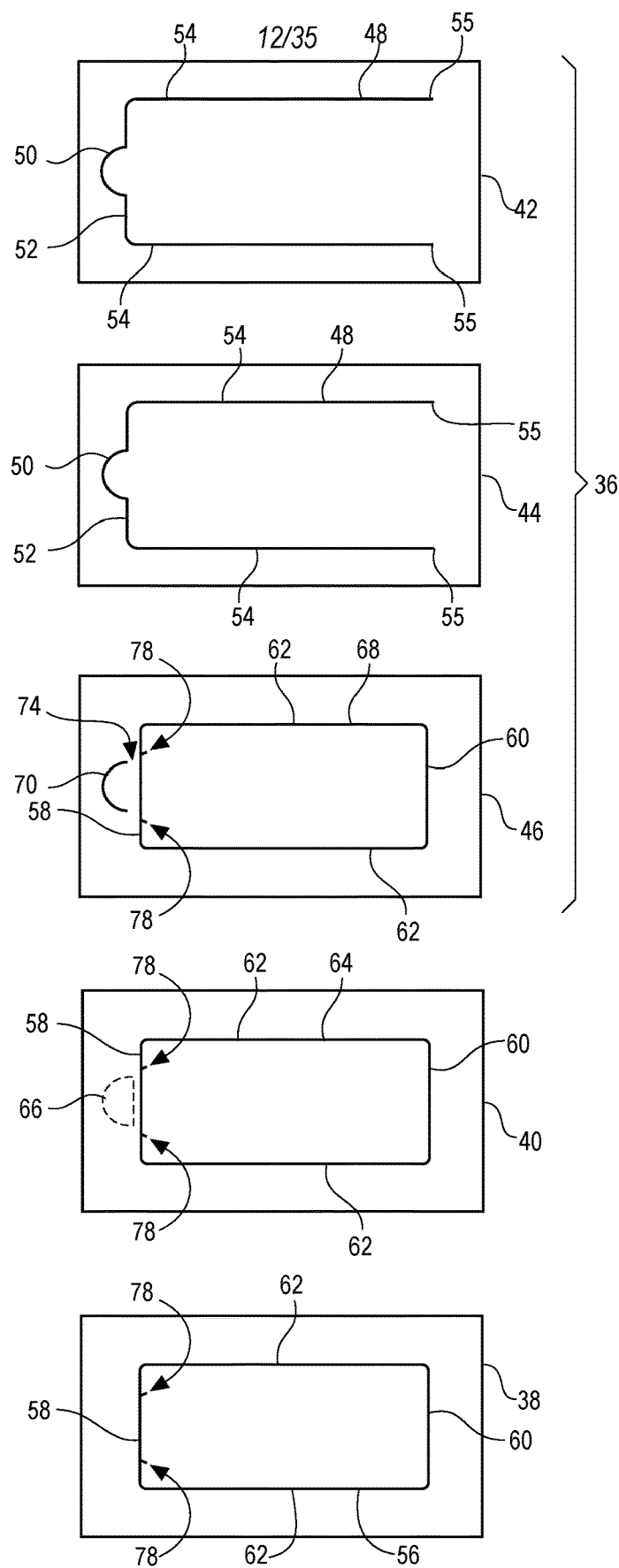
FIG. 8 is a top plan cut-out view of an upper web of film having three layers, a permanent adhesive, and a lower web of film showing details of a third example opening feature.
Figure 9:
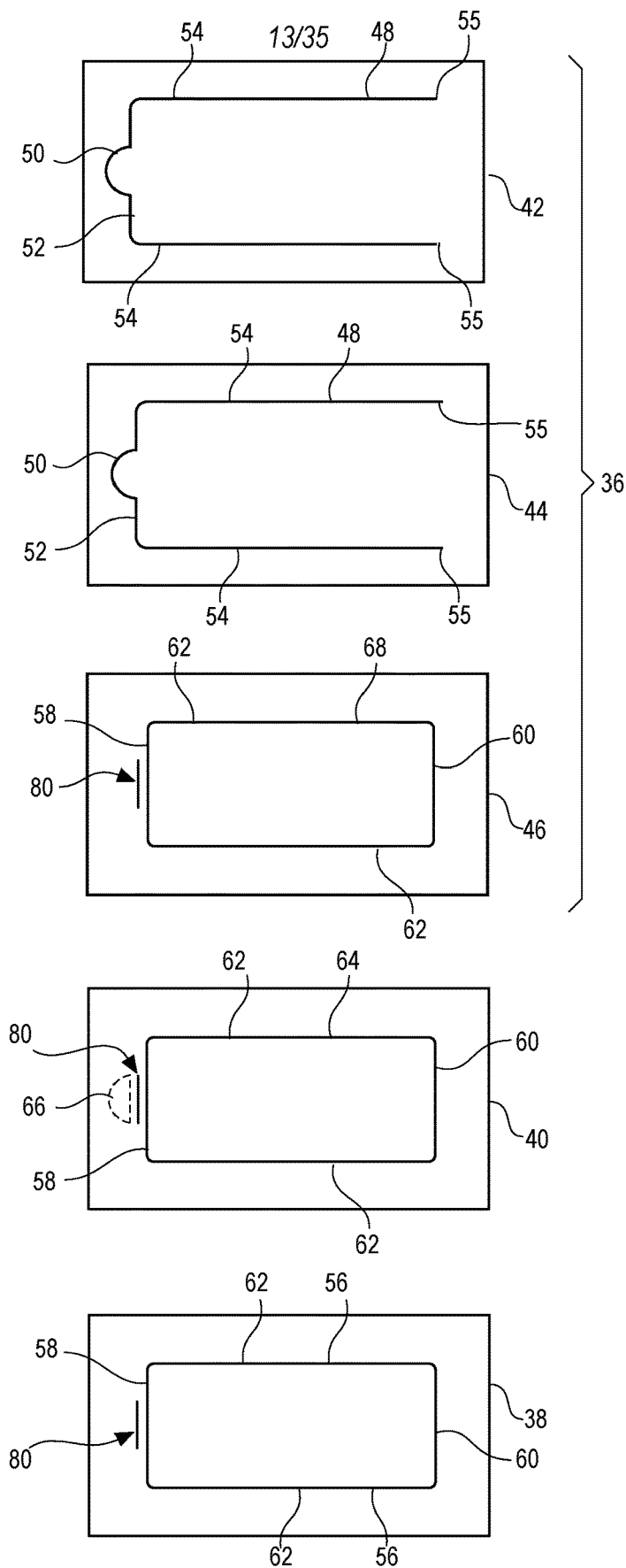
FIG. 9 is a top plan cut-out view of an upper web of film having three layers, a permanent adhesive, and a lower web of film showing details of a fourth example opening feature

While the above laminate described with respect to FIG. 6 can provide satisfactory results, alternative laminates shown in FIGS. 7-9 omit 74 the added length of the sides 72 of the middle tab portion 68 so that there are no cuts that align through the entire thickness of the laminate 12. This ensures that a hermetic seal is maintained throughout storage, transportation, and display of the film package 10. As such, each form includes alternative structural detail in order to provide easy opening and desired propagation of the tear when opening the package 10 given the omitted side portions 74.

In a second form, shown in FIG. 7, in addition to the omitted portions 74 of the sides of the middle tab portion 70, the open portion 66 of the permanent adhesive layer 40 is larger and extends an additional distance toward the forward edge 58 of the adhesive cut 64 leaving a relatively small strip of permanent adhesive 76 disposed next to the forward edge 58. The width of the strip is reduced to encourage a tear during opening that will skip or bypass this area and propagate correctly along the forward, side and rearward edges, 58, 62, 60 exposing the reseal margins 47, 49. In one non-limiting example, the width of the strip can be between about 5 mm and about 40 mm wide, and more specifically between about 10 mm and about 15 mm, and more specifically between about 12 and about 13 mm wide to provide satisfactory resealing during use. Of course, it will be understood that particular applications, contents, and package sizes may require other sizes. Accordingly, the strip width can be optimized for each specific application.

Additionally, the forward edge 58 in the bottom film layer 46 is broken in an intermediate portion thereof, which as illustrated is aligned with the tab portion 70. Without the sides 72 of the middle tab portion 68, a tear created by a consumer while opening may propagate uncontrollably creating an undesirable opening. In order to avoid this, the opening feature 20 as described in this second form breaks the forward edge 58 in the bottom film layer to avoid the tear undesirably propagating inwardly rather than outwardly towards the side portions 62. Moreover, the portion of permanent adhesive between the open tab portion 66 and the forward edge 58 is minimized while ensuring an initial hermetic seal which minimizes the force that a consumer has to apply during opening, which provides the consumer with more control over the tear after breaking this portion of permanent adhesive.

In a third form, shown in FIG. 8, in addition to the omitted portions 74 of the sides 70, the middle forward edge 58 is unbroken so that it is substantially identical to the bottom and adhesive cuts 56, 64. Moreover, each of the bottom, adhesive, and middle cuts 56, 64, 68 include notches or small cuts 78 that project inwardly from the forward edge 58 thereof. More specifically, the notches 78 extend at an angle with respect to the forward edge 58 and are directed towards their respective side edges 62. As shown, the notches 78 are generally longitudinally aligned with the sides 35 of the tab 32. So configured, if during opening, the tear does not propagate outwardly along the forward edge 58 correctly, the notches 78 direct the tear outwardly to intersect with the side edges 62 so that the remaining portion of the tear propagates correctly. Although the notches 78 are shown on the bottom film layer 46, the permanent adhesive layer 40, and the inner web 38, individual ones or combinations of two of each can alternatively be used.

In a fourth form, shown in FIG. 9, the middle tab portion 70 is entirely omitted. Instead, each of the bottom film layer 46, the permanent adhesive layer 40, and the inner web 38 includes a front cut 80 that is spaced forwardly of the forward edge 58 and runs generally parallel thereto. In the illustrated form, the front cut 80 is generally aligned between the shoulder portions 52 of the outer cut 48, and preferably is sized to extend substantially the entire length therebetween. Additionally, the open portion 66 of the permanent adhesive layer 40 is smaller so that the permanent adhesive surrounds the front cut 80. This maintains the hermetic seal of the film package 10 and creates a hard stop during opening against which a consumer must pull. The front cut 80 creates a break point that exposes the middle tacky layer 44 and therefore the reseal margins 47, 49 during opening and directs an opening tear to the inner cut 56. Although the front cut 80 is shown on the bottom film layer 46, the permanent adhesive layer 40, and the inner web 38, individual ones or combinations of two of each can alternatively be used. So configured, a consumer can grip the tab portion 32 and pull outwardly and rearwardly to open the package 10. The consumer must first break the permanent adhesive disposed forwardly of the front cut 80 while opening. After breaking this portion of permanent adhesive, the front cut 80 provides a break point so that the opening then tears along the bottom film layer 46 to expose the tacky layer 44. This tear continues rearwardly to intersect with the forward edge 58 continue to propagate therealong as desired.

In a further approach, the outer web 36 can be transparent or translucent and the permanent adhesive layer 40 can include ink or other printing/indicia thereon. As such, a consumer would see through the outer web 36 to the permanent adhesive layer 40. This would clearly identify the gripping tab 32 due to the open portion 66 of the permanent adhesive layer 40. Moreover, the inner web 38 can be opaque in order to prevent light from entering the package interior 30. Alternatively, the printing can be done on the outer web 36 in surface or by reverse printing.

Additionally, the opening feature 20 as described herein provides tamper evident features due to the permanent adhesive breaking during initial opening of the flap as well as the alignment of the flap 24 during reseal. Further, the transparent or translucent approach discussed above can clearly display to a consumer when a package has been previously opened due to damage to the permanent adhesive during opening.

Figure 11A:
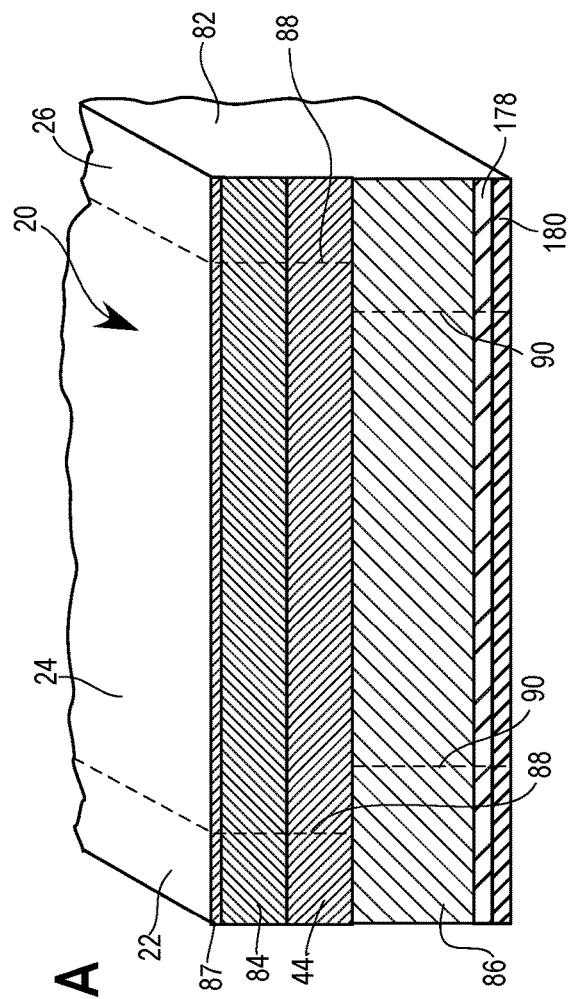
FIG. 11A is a cross-sectional view of the segment of the top of the package of FIG. 10 taken along the line 11-11 showing inner and outer cuts of the opening feature in a closed configuration.
Figure 12A:
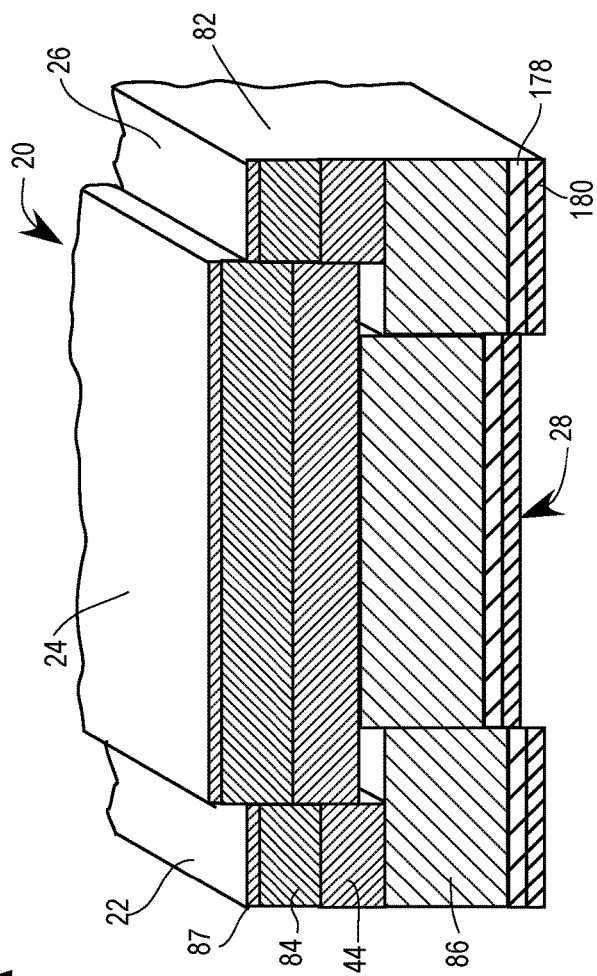
FIG. 12A is a cross-sectional view of the segment of the top of the package of FIG. 10 taken along the line 12-12 showing inner and outer cuts separated in an open configuration.

In another form, the film 12 can be a coextruded film. As shown in FIGS. 1A, 1B, 1C, and 10-13, the package 10 of this form utilizes a coextruded film 82. As discussed above, a single step coextrusion produces a film with at least an outer film layer 84 and an inner film layer 86 with the tacky layer 44 encapsulated or disposed therebetween. As such, the tacky layer can stick or cling to the outer and/or inner film layers 84, 86 so that the package 10 can be easily and repeatedly resealed and reopened. By one approach, the outer film layer 84 is permanently adhered or attached to the tacky layer 44 and the inner film layer 86 is a release layer configured to provide separation from and reseal to the tacky layer 44. The film layers can be produced in any of the ways described above. Example coextruded film cross-sections are shown in FIGS. 11A, 12A and 13. In another embodiment, such as that shown in FIG. 10A, the flap 24 can extend to the end seal 14 and the tab 32 can extend therepast.

Figure 11B:
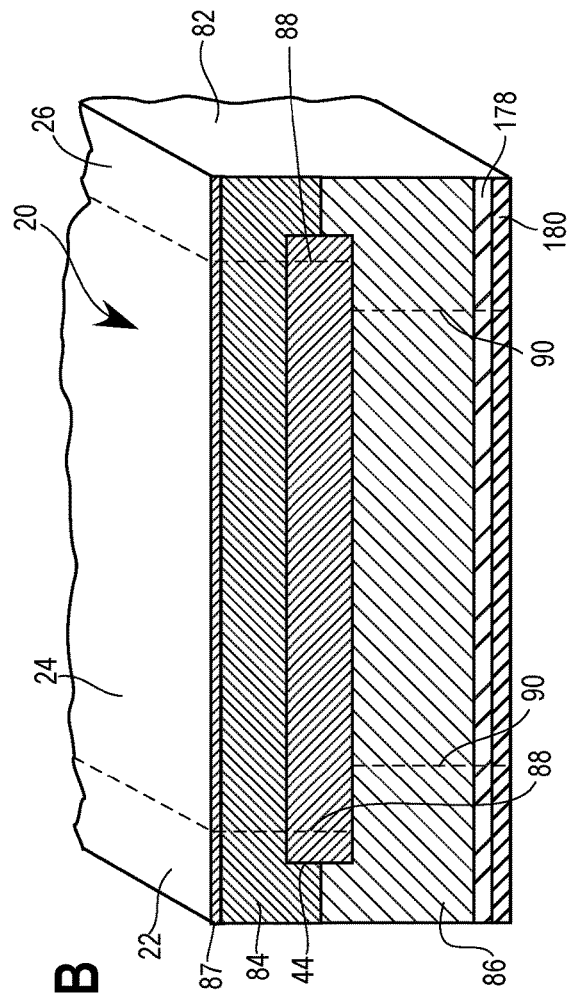
FIGS. 11B and 12B are cross-sectional views similar to those of FIGS. 11A and 12A, but showing an alternative construction.
Figure 12B:
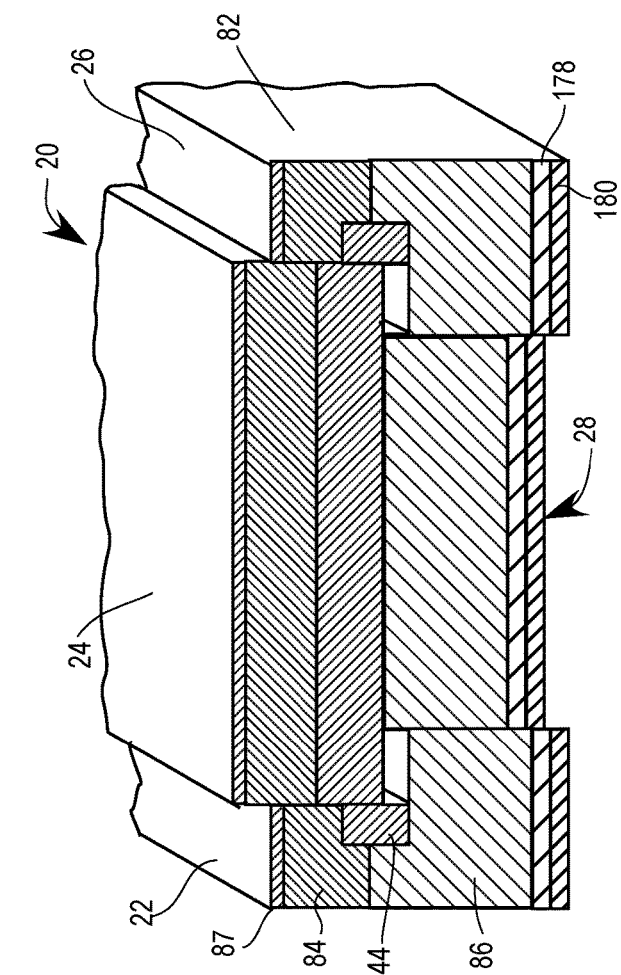

In an alternative arrangement, the tacky layer 44 is not coextensive with the width and/or the length of the outer and inner film layers 84 and 86, as depicted in FIGS. 11B and 12B. Instead, the tacky layer 44 extends a short distance (although other longer distances can be used) past the outer cut. If only having a reduced width, the tacky layer 44 can have a ribbon-like arrangement on the web. The outer and inner film layers 84 and 86 are attached via extrusion to each other where the tacky layer 44 is absent, such that one or more free edges of the tacky layer abut against either or both of the outer and inner film layers 84 and 86. The outer and inner film layers 84 and 86 can be of increased thickness where the tacky layer 44 is absent, as shown in FIGS. 11B and 12B, and can be of such increased thickness that the overall film thickness does not deviate or only deviates a very small amount proximate the tacky layer 44. This can be accomplished, for example, by adjusting the dies for those layers and/or the flow rates through the dies. Alternatively, the outer and inner film layers 84 and 86 may not be of increased thickness outwardly of the tacky layer 44, such that the overall film thickness will be increased proximate the tacky layer 44. A reduced width of the tacky layer 44 can be accomplished by adjusting the width of the extrusion die to be less than the widths of the dies for the other layers. A reduced length, either instead of a reduced width or in addition to a reduced width, can be accomplished by cycling on and off the extrusion of the tacky layer 44 during extrusion of the other layers. A reduced width and/or reduced length tacky layer 44 can be used in any of the various embodiments described herein.

"Traditional" pressure sensitive adhesives are usually based on acrylics, bio-based acrylate, butyl rubber, natural rubber, silicone rubber with special tackifiers, styrene block copolymers (SBC), styrene-butadiene-styrene (SBS), styrene-ethylene/butylene-styrene (SEBS), styrene-ethylene/propylene (SEP), styrene-isoprene-styrene (SIS), vinyl ethers, ethylene-vinyl acetate (EVA) with high vinyl acetate content, and nitriles. These traditional pressure-sensitive adhesives can be manufactured with either a liquid carrier or in 100% solid form. Articles such as tapes and labels are made from liquid pressure sensitive adhesives (PSAs) by coating the adhesive on a support material and evaporating the organic solvent or water carrier, usually in a hot air dryer. The dry adhesive may be further heated to initiate a cross-linking reaction and increase molecular weight. 100% solid pressure sensitive adhesive may be low viscosity polymers that are coated and then reacted with radiation to increase molecular weight and form the adhesive (radiation cured pressure sensitive adhesive); or they may be high-viscosity materials that are heated to reduce viscosity enough to allow coating, and then cooled to their final form (hot melt pressure sensitive adhesive (HMPSA)). In some cases, the traditional pressure sensitive adhesive has odor due to lower molecular weight components or uncured components, i.e., unreacted monomers remaining in cured products.

The benefits of a coextruded film as described herein include no odor in the resulting film, as compared to "traditional" pressure sensitive adhesives as described above. The benefits of a using polybutene and olefinic specialty elastomers and their blends as coextruded film layers as described herein include no odor in the resulting film because these are polyolefins that do not need to cure and do not need time for setting.

The benefits of a coextruded film as described herein further include a single step converting process, a contact sensitive reclose where the weight of the flap of the opening feature effectively recloses the opening feature without the need for additional pressure. Repeated reclose is realized at least in part by the engineering design of the chemistry of the tacky layer and the adjacent release layer, which has an affinity for one another, but less attraction to contamination. Moreover, the tacky layer as described herein is less tacky than "traditional" pressure sensitive adhesives and, as such, is less prone to contamination than traditional pressure sensitive adhesives to thereby provide more opening and reclosing cycles than traditional pressure sensitive adhesives. Additionally, the tacky layer as described herein provides a better compliance with the U.S. Food and Drug Administration and the European Food Safety Authority for use in direct food contact applications.

Moreover, as illustrated in FIG. 1B, a film package 10 made from a coextruded film includes a coextensive encapsulated tacky or bonding layer and, as such, opening features as described herein can be disposed anywhere on the package including on the top, sides, and bottom of the package, and extending therebetween. Although two opening features 20 are shown in FIG. 1B, the package could be adapted to specific uses, including for portion control, multiple serving, multi-compartment packages, specialty uses, and/or to create distinctive packaging to create consumer goodwill.

The coextruded film with the tacky layer as described herein can be challenging to make. For example, it is challenging to engineer the release layer to have the right polarity with regard to the tacky layer to achieve the desired balance between affinity between the release layer and the tacky layer and subsequent peel force. In addition, due to the single step process, printing is done on the outer surface of the film and, as such, may require additional protection over traditional laminated films that can have clear outer layers laminated after printing or a clear coating over the outer layer after printing. Moreover, an opening feature like those described herein is formed by cutting on both sides of a single coextruded web, rather than on separate films that can be laminated together at a later step.

An opening feature 20 is shown in FIGS. 1 and 10-13. As with the previous form, the opening feature 20 is at least partially defined by cuts or other lines of weakness formed by dies, lasers, or the like. Additionally, although the lines of weakness are shown as perpendicular in the figures, angled tears or fractures through the tacky resin also result in a viable reseal. Moreover, the package 10 can be resealed whether the tacky resin is entirely disposed on the outer film layer 84, entirely on the inner film layer 86, or portions on both such as when opening the package 10 fractures through the tacky resin 44 itself. The opening feature 20 includes the flap 24 of the top wall 22 that can be separated and partially pulled away from the remaining portion 26 of the top wall 22 to reveal the opening 28 into the interior 30 of the package 10. The flap 24 can include the gripping tab 32 that projects away from the main portion 34 of the flap towards the forward end seal 14. The tab 32 is configured to provide a consumer a convenient gripping surface for opening the package 10. As shown, the tab 32 includes the forward curved portion 33 and the generally parallel longitudinal sides 35.

Unlike the earlier form, the tab 32 of this form is adhered to the tacky layer 44. As such, a consumer can peel the tab 32 to delaminate the tacky layer 44 from the outer and/or inner film layers 84, 86. Accordingly, after peeling the tab 32 away from the top wall 22, the consumer can continue to pull the flap 24 away from the top wall to open the package 10. Pulling the flap 24 generally away from the top wall 22 breaks or separates cuts in the outer film layer 84 and the inner film layer 86 to expose the opening 28, as well as the reseal margin 47 of the middle tacky layer 44 and the reseal margin 49 of the inner film layer 86. Alternatively, the tab 32 can extend past the end seal 14, such as in the embodiment shown in FIG. 10A, and the consumer can grip and pull the tab 32 so that the film breaks at the end seal 14 to break or separate cuts in the outer film layer and the inner film layer 86 to expose the opening 28, as well as the reseal margin 47. The reseal margins 47, 49 are created by lines of weakness in the outer film layer 84 being dimensionally larger than cuts in the inner film layer 86, as described in greater detail below. By non-limiting example, the reseal margins 47, 49 can be between about 5 mm and about 40 mm wide, and more specifically between about 10 mm and about 15 mm, and more specifically between about 12 and about 13 mm wide to provide satisfactory resealing during use. Of course, other measurements and sizes can also be utilized for particular applications as needed or desired. For example, a relatively small package can utilize an approximately 5 mm reseal margin, while a larger package can utilize an approximately 10-15 mm reseal margin. So configured, a consumer is provided the convenience of a resealable package without the need for multiple adhesives being disposed in patterns on the same plane or layer within the laminate.

The opening feature 20 of this form includes an outer cut 88 that extends at least partially through the outer film layer 84 and an inner cut 90 that extends at least partially through the inner film layer 86. In another form shown in FIGS. 11A and 12A, the inner cut 90 can also extend through a tie layer 178 and a polyethylene layer 180 disposed adjacent to the inner film layer 86. In yet another form shown in FIGS. 14 and 15, the film includes the outer film layer 84, the tacky layer 44, the inner film or release layer 86, the sealant layer 162, and optional cold seal areas 164. Moreover, portions or all of the outer and/or inner cuts 88, 90 can extend into or through the tacky layer 44. The outer cut 88 includes a top tab portion 91, outwardly extending shoulder portions 92, and opposite side portions 93 that run longitudinally down the package top wall 22 toward the rearward end seal 16. If desired, distal ends 94 of the side portions 93 can have tear stopping features, such as hooks or the like. The inner cut 90 can include a forward edge 95, a rearward edge 96, and side edges 97 that define the opening 28 into the package 10 and creating a bottom portion of the flap 24. In this form, the inner cut 90 has a rectangular shape with slightly rounded corners that help with controlled propagation during opening. Of course, other shapes can also be utilized, whether depending on the shape of the package, for specific package contents, or other desired aesthetic. For example, the bottom cut can include curvilinear portions creating rounded ends and/or sides, a waisted portion, or the like.

Other embodiments do not require an outer cut such as those shown. For example, the tab portion 91 can be cut into the outer film layer 84 and pulling on the tab can interact with cuts made in the inner film layer 86. With this configuration, the outer film layer 84 tears during opening. In one form, this tearing can be controlled by utilizing a film with tear-directing properties.

The films as described herein can be formed into a package, such as a food package, via heat seals utilizing a sealant layer or via cold seals utilizing a pattern coated cold seal.

Two issues can arise when creating an opening feature in a coextruded film with an intermediate tacky layer, such as those described above. One issue is that the opening force required to initially separate the layers of film to delaminate the film layer from the tacky layer and expose the tacky layer for subsequent reclose may be too strong such that controlled opening may not occur. For example, if the opening force is too strong, the film may not open along designated cuts or scribed lines and instead tear uncontrollably. Likewise, if the opening force is too weak, the package may be opened unintentionally or may not provide a satisfactory seal. Another issue that can occur is that, once exposed, the tacky layer and adjacent film layer may not readhere together sufficiently to reclose the package after opening.

Accordingly, the object of the present disclosure is to provide a coextruded film for packaging that includes an embedded or encapsulated tacky layer of thermoplastic and/or elastomeric material with an adjacent release layer that can be utilized to produce an opening feature with smooth and consistent peel strength during opening and during multiple reclose operations. To achieve this, the tacky layer delaminates or separates from an adjacent "release" film layer between die cuts. In one form, the tacky layer is a contact sensitive adhesive such that simply bringing the tacky layer and adjacent film layer into contact with one another is sufficient to reseal the opening feature. In another form, the coextruded film described herein is capable of being oriented in a tenter frame process. Moreover, the coextruded film described herein can be produced using most common film processing equipment and converting methods including, but not limited to, multilayer blown film processes (typical blown, or double bubble or triple bubble), multilayer cast film, machine direction orientation (MDO), biaxial orientation, extrusion coating, and the like. Optionally, the coextruded films described herein with encapsulated, coextensive tacky layers can be combined with typical biaxially-oriented polyethylene terephthalate (BOPET), biaxially-oriented polypropylene (BOPP), blown film, or cast film, with or without ink, with or without metallization or high barrier coating through lamination to form a further film. In addition, the coextruded films described herein can be metalized or treated with higher barrier coating for final application.

While not wishing to be limited by theory, it is believed that the polarities of the material of the tacky layer and the adjacent release layer affect both the initial bond between the layers, and therefore the required opening force, and subsequent resealing adherence or tackiness. Additionally, it is believed that polarity is a larger factor than crystallinity in this regard. The tacky layer materials described herein are non-polar. Suitable materials for the tacky layer 44 include a polybutene resin, olefinic elastomers, and blends thereof. The following examples are included to illustrate the disclosure herein and not to limit it. Unless noted otherwise, all parts, percentages, and ratios in the disclosure and examples are by weight.

Table 1 below includes the known or estimated polar component of surface free energy (shown in mJ/m2 (equivalent to dynes/cm)). Materials having similar, i.e., a difference of about 1-5, in these polar component values will exhibit satisfactory peeling and resealing.

TABLE 1

| Material | $\gamma_s^P$ | |
| --- | --- | --- |
| Paraffin | 0 | |
| Polyethylene | 1.4 | |
| vistamaxx | 2.1 | estimated value |
| PP | 2.4 | |
| PB-1 | 2.6 | estimated value |
| EMA | 3.2 | |
| nylon 636 | 4.4 | estimated value |
| nylon 6,12 | 4.7 | |
| nylon 12 | 5.2 | |
| EPDM | 5.8 | |
| PET | 7.2 | |
| nylon 6 | 9.6 | |
| nylon 6,6 | 9.8 | |

Example coextruded film structures are shown in FIG. 13. In each example, a polypropylene material can be an outer film layer 84 and a polyamide material can be the release layer. Moreover, in each example, the tacky layer 44 can be a polybutene-1 resin, a copolymer of polypropylene and polyethylene plastomers and elastomers, or blends thereof.

Figure 13A:
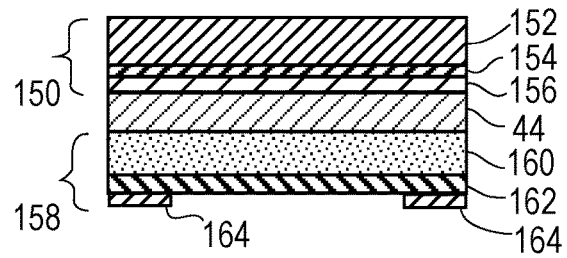
FIGS. 13A to 13F are cross-sectional views of several examples of coextruded and coextruded and laminated film structures.
Figure 13B:
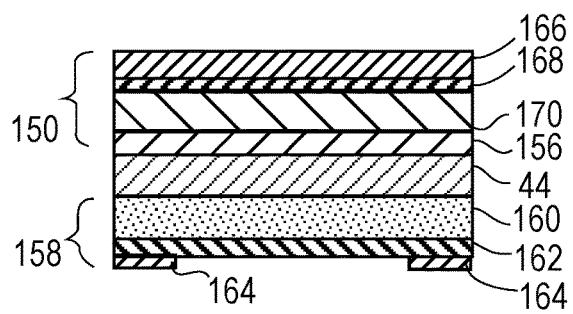
Figure 13E:
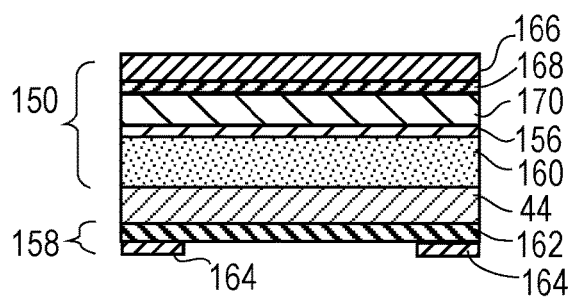
Figure 13C:
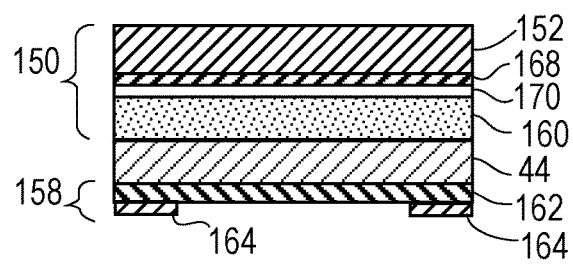
Figure 13F:
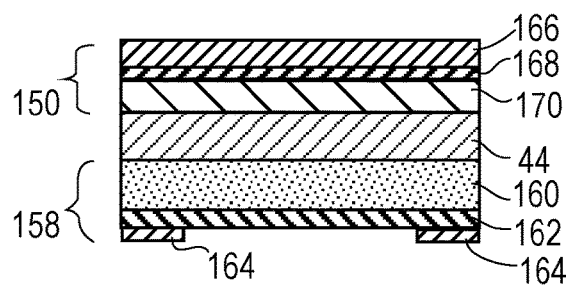
Figure 13D:
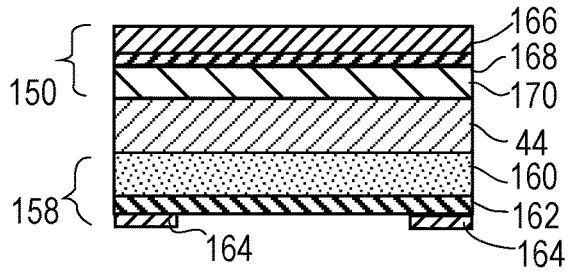

Additional example layers are shown in the various cross-sections of FIGS. 13A-13F. As shown, each film cross-section includes the tacky or bonding layer 44 with one or more layers above and below the tacky layer 44. Beginning with FIG. 13A, an outer film portion 150 can include a top film layer 152, an ink and/or lamination layer 154, and an outer layer 156. An inner film portion 158 can include a release layer 160, a barrier sealant or inner layer 162, and optional cold seal areas 164. As shown in FIG. 13B, in another form, the outer film portion 150 can include a protective coating layer 166, an ink layer 168, an optional metallization layer 170, and the outer layer 156. In this form, the inner film portion 158 can include the release layer 160, the barrier sealant or inner layer 162, and the optional cold seal areas 164. As shown in FIG. 13C, in another form, the outer film portion 150 can include the top film layer 152, the ink layer 168, the optional metallization layer 170, and the release layer 160. In this form, the inner film portion 158 can include the barrier sealant or inner layer 162 and the optional cold seal areas 164. As shown in FIG. 13D, in another form, the outer film portion 150 can include the protective coating layer 166, the ink layer 168, the optional metallization layer 170, the outer layer 156, and the release layer 160. In this form, the inner film portion 158 can include the barrier sealant or inner layer 162 and the optional cold seal areas 164. As shown in FIG. 13E, in another form, the outer film portion 150 can include the protective coating layer 166, the ink layer 168, and the optional metallization layer 170. In this form, the inner film portion 158 can include the release layer 160, the barrier sealant or support layer 162, and the optional cold seal areas 164. As shown in FIG. 13F, in another form, the outer film portion 150 can include the protective coating layer 166, the ink layer 168, the optional metallization layer 170, and the release layer 160. In this form, the inner film portion 158 can include the barrier sealant or inner layer 162 and the optional cold seal areas 164.

Figure 16:
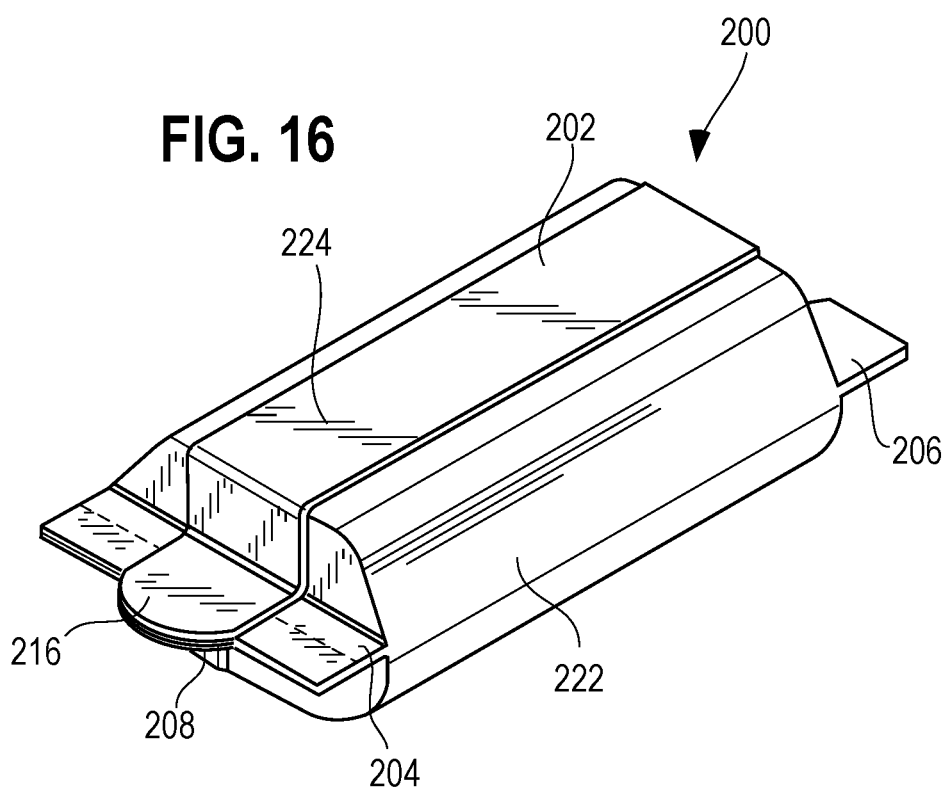
FIG. 16 is a perspective view of a flexible film package having an opening feature.
Figure 17:
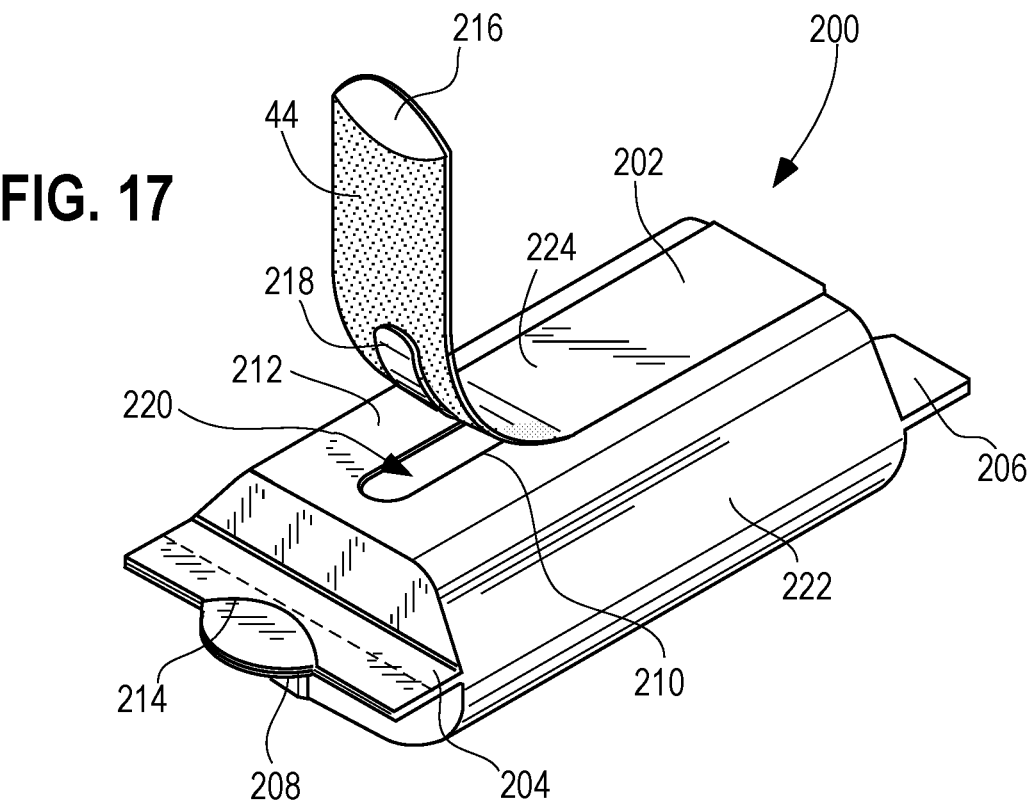
FIG. 17 is a perspective view of the flexible film package of FIG. 16 showing the opening feature in a partially open configuration.
Figure 18:
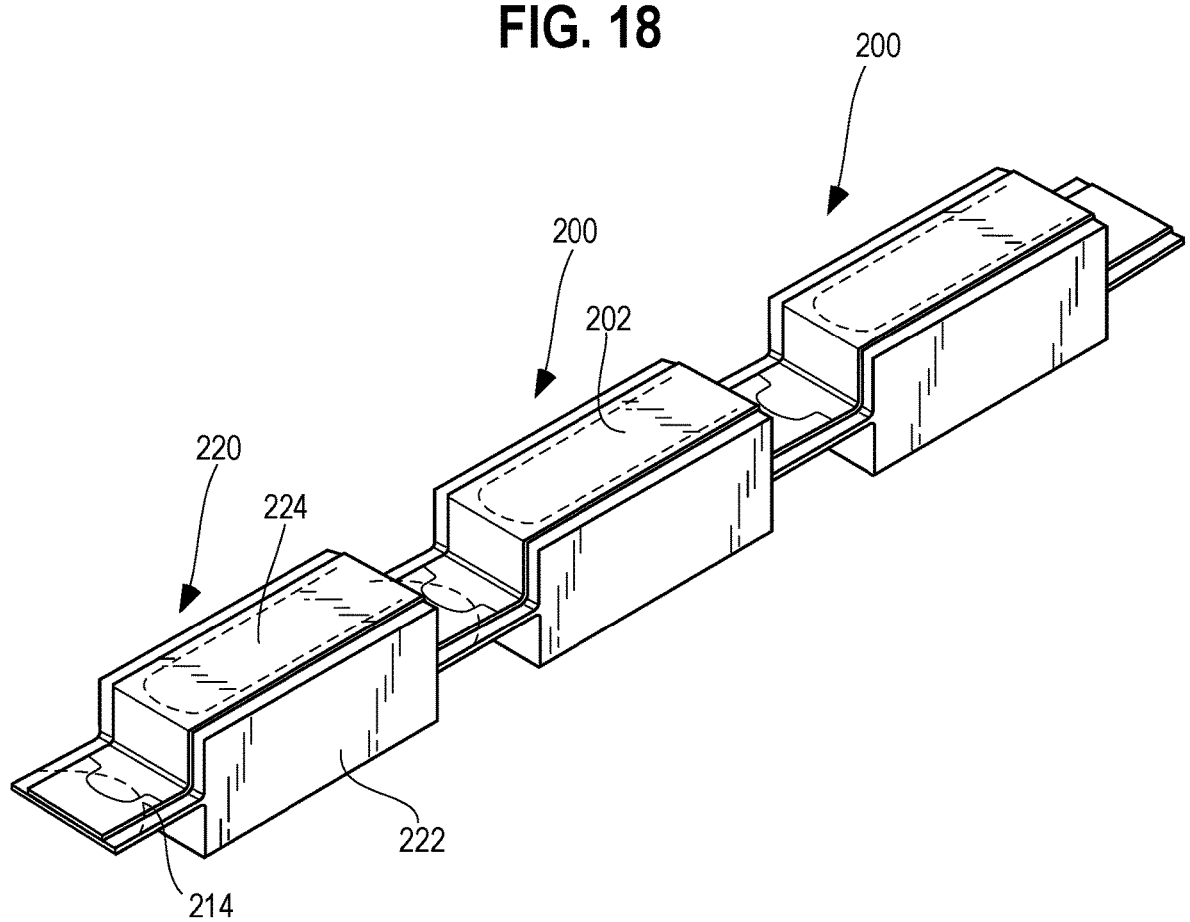
FIG. 18 is a perspective view of the flexible film package of FIG. 16 in a continuous flow-wrap configuration after formation of end seals.
Figure 19:
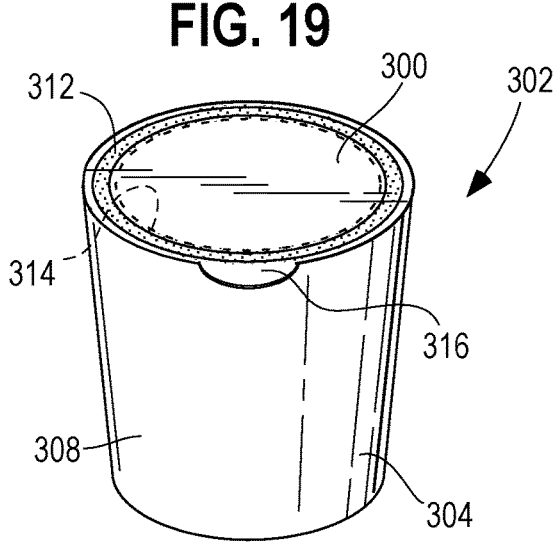
FIG. 19 is a perspective view of a package having a film sealed to a base.
Figure 20:
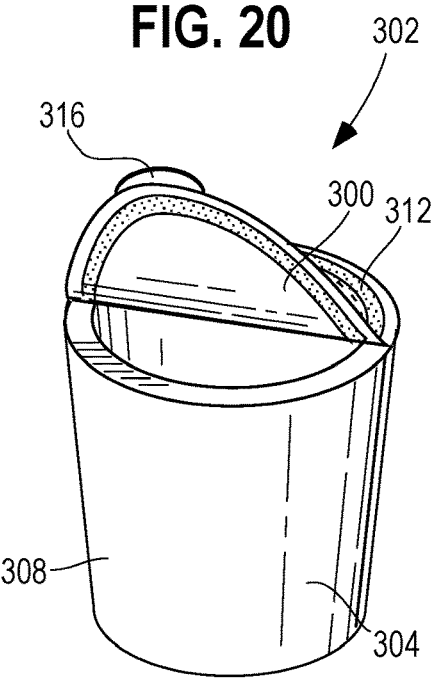
FIG. 20 is a perspective view of the package of FIG. 19 showing the film partially peeled back to provide an opening to the base.
Figure 21:
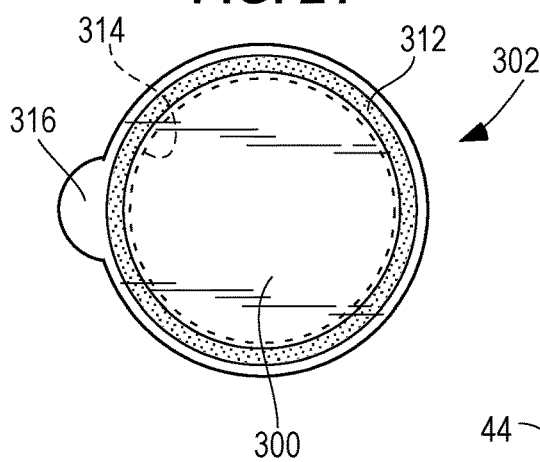
FIG. 21 is a top plan view of the package of FIG. 19.

Another embodiment of a package is 200 shown in FIGS. 16-18. In this form, a continuous strip of film or closure layer 202 extends from a first end seal 204 to a second end seal 206. The package 200 can further include a fin or longitudinal seal 208 extending between the first and second end seals 204, 206. The package 200 includes an opening cut or score 210 in a top 212 thereof and a tab cut or score 214 in or adjacent to the first end seal 204. The closure layer 202 is applied to the film to cover both the opening cut or score 210 and the tab cut or score 214. As such, a consumer can grip a tab 216 of the closure layer 202, which includes a portion of the film of the package by virtue of the tab cut or score 214, and pull the closure layer 202 away from the top 212 and rearwardly along the package 200 to expose the opening cut or score 210. The closure layer 202 can adhere to a portion 218 of the top 212 to expose an opening 220 to the package interior. The films 222, 224 of the package 200 and closure layer 202 can take any of the forms described herein, except that the top 212 of the package is the release layer described herein and that the bottom layer of the closure layer 202 is the tacky or bonding layer described herein. As such, the closure layer 202 can be applied to the package top 212 and release easily therefrom.

As shown, the closure layer 202 extends only partially over the width of the flexible film that forms the film package 200. It is also contemplated, however, that the closure layer 202 may extend the entire width of the package but only be partially disposed over the length of the film. More particularly, the closure layer 202 preferably does not extend both the entire width and the entire length of the package. The closure layer 202 is partially disposed in either direction (i.e., the length or width) and continuously disposed in the other of the directions. In one approach, the closure layer 202 is continuously applied along one axis of the film and is only partially applied along the axis normal to the continuously applied axis. Thus, the flexible film packages 200 may have a closure 202 that runs the entire length of the package and over only a portion of the width or a closure 202 that runs the entire width of the package and over only a portion of the length of the package.

Advantageously, packages 200 configured as discussed above with respect to FIGS. 16 and 17 can be produced using a continuous flow wrap process. As noted, the closure layer 202 can be applied continuously along the longitudinal length of the flow or web of the package film 222. Once products are at least partially enveloped and sealed within the web of film 222, the film 222 and closure film 224 may be cut into individual packages 200. FIG. 18 illustrates a series of formed packages that have not been separated from one another. As shown, the tabs 216 may be formed, in part, by the arcuate tab score or cut 214 formed, in part, on a roll of film, and disposed at least partially at leading end seal 204. When the individual packages 200 are cut from the film 222, 224, a leading edge or profile of the tab 216 may be formed. For example, the leading seal on a first package has a profile matching a trailing seal on a second package. Thus, the tab 216 may have a front edge that is arcuate and defined, in part, by the leading edge of the package and may have a rear, trailing edge that is arcuate and defined, in part, by the arcuate score line 214.

As discussed herein, the method of manufacturing and assembling the packages can employ heat seal mechanisms, cold seal mechanisms, extension and adhesive lamination mechanisms, and co-extrusion mechanisms. The equipment employed may depend on the desired package configuration. For example, if a tab includes a cut-out portion of film adhered to the closure layer, the tab may be created by adhering or applying the closure layer to the film and scoring and/or cutting the tab. In addition, various score configurations may be employed, and the equipment for forming the score line may depend on the score configuration thereof.

Figure 22:
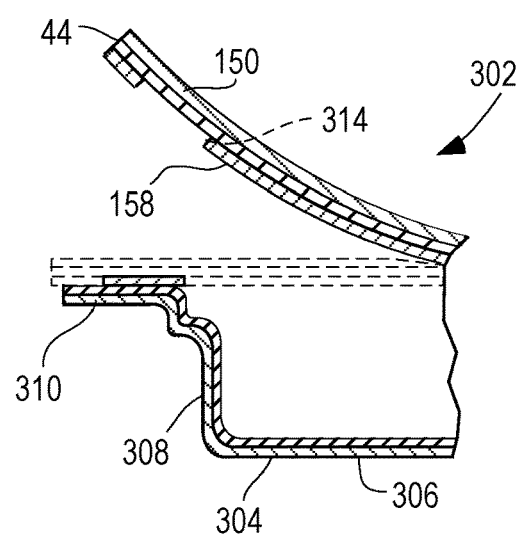
FIG. 22 is a side cross-sectional view showing the film structure and base of the package of FIG. 19 as the film is peeled back to open the package.

A film 300, having any of the configurations described herein, can also be utilized in a package 302 having a rigid or semi-rigid base 304. The base 304 can include a bottom wall portion 306, a sidewall portion 308 upstanding from the bottom wall portion 306, and a flange 310 projecting outwardly from a top of the sidewall portion 308. As shown, the film 300 is sealed to the base 304 along the flange 310 thereof creating a heat seal region 312 of the film 300 corresponding to the flange 310. For simplicity, the film 300 is shown in FIG. 22 as including three layers, the outer film portion 150, the tacky or bonding layer 44, and the inner film portion 158. It will be understood, however, that the outer and inner film portions 150, 158 can take any form as described herein.

To provide an opening feature, the film 300 can include a die cut or score 314 extending completely or partially around the flange 310 inwardly adjacent thereto. Additionally, the film 300 can include a tab 316 to provide a consumer with an easy gripping portion. So configured, a user can grip the tab 316 and pull the film 300 generally away from the base 304. The film 300 breaks at the heat seal region 312 such that the inner film portion 158 remains sealed to the flange 310 and the tacky or bonding layer 44 is exposed. Thereafter, opening reaches the die cut or score 314 and the inner film portion 158 inwardly of the die cut or score 314 remains adhered to the tacky or bonding layer 44. Accordingly, the tacky or bonding layer 44 is only exposed in the region coinciding to the flange 310 and can be repeatedly reapplied and removed therefrom as desired.

Figure 23:
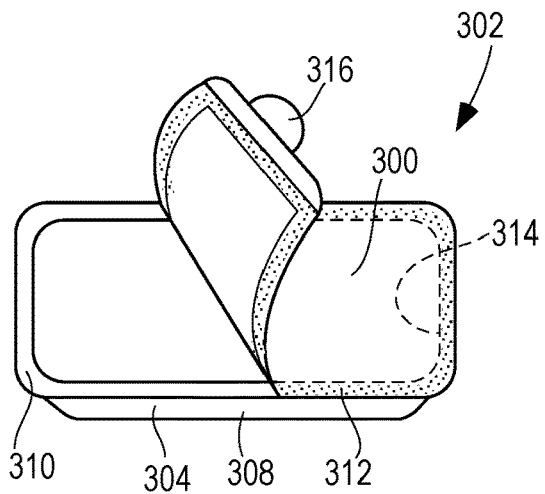
FIG. 23 is a perspective view of another package having a film sealed to a base.
Figure 24:
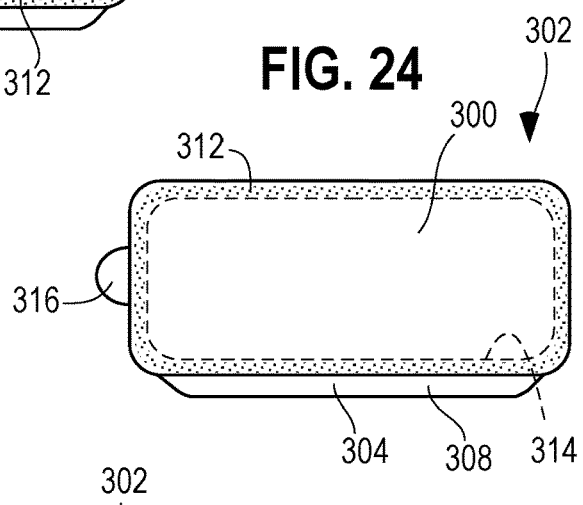
FIG. 24 is a perspective view of the package of FIG. 23 showing the film partially peeled back to provide an opening to the base.
Figure 25:
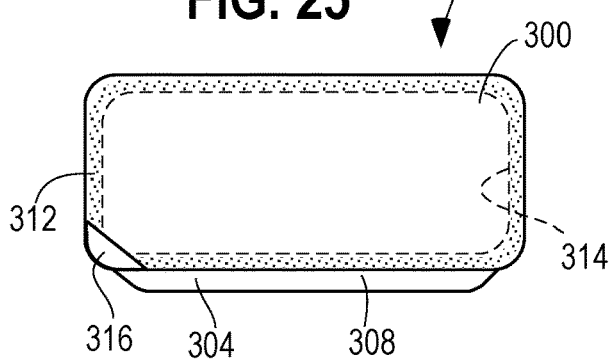
FIG. 25 is a top plan view of an alternative configuration of the package of FIG. 23 showing a pull tab of the film in a corner thereof.

The package 302 can take any desired form. In the form of FIGS. 19-22, the base 304 includes a circular bottom wall portion 306 and an annular sidewall portion 308. In the form of FIGS. 23-25, the base is generally box-shaped with a rectangular bottom wall portion 306 with four sidewall portions 308. With a configuration having multiple sidewall portions 308, the tab 316 can be configured to project along an edge, as shown in FIG. 23, or a corner, as shown in FIG. 25, thereof.

In another form, the film 300 can include an opening feature 20, as described herein. For example, the package 302 can include an opening feature such as that shown in FIG. 1A with the opening feature spaced inwardly from the flange 310 and the heat seal region 312 of the film 300.

Figure 26:
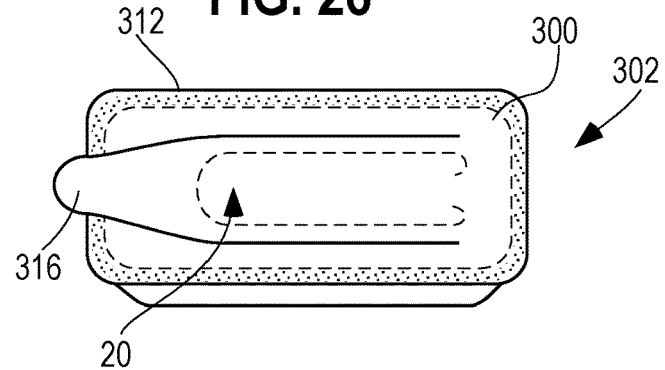
FIG. 26 is a perspective view of an alternative configuration of the package of FIG. 23 showing an opening feature in the film with a pull tab extending past a heat seal of the film to the base

Alternatively, as shown in FIG. 26, the film 300 can include an opening feature 20 such as that shown in FIG. 1C with the flap 24 extending to the heat sealed region 312 and the tab 316 extending past the heat sealed region 312.

A rolling ball tack test was also performed on samples of the bonding or tacky material, was a modified version of ASTM D3121 and followed the test method parameters of ASTM D3121, unless otherwise specified. Tack is generally determined by the rolling ball method, where a steel ball is released from the top of an incline, allowed to accelerate down the incline and roll across the horizontal surface of the pressure-sensitive adhesive. The relative tack is determined by measuring the distance the ball travels across the adhesive before stopping. Relative degree of tack is compared among formulation variations according to the distance the ball travels from the end of the ramp. The longer the distance, the less tacky the surface. So, the shorter the travel distance, the higher the tack. In this modified version, a glass ball was used instead of a steel ball and the release point on the incline was shortened due to the low tack nature of our surfaces. The modified test measured how strong the surface of the coating adhered to non-like materials, such as the polar surface of a rolling glass ball. In the modified rolling back tack test herein, the smallest steel ball (5/32 inch) was used and the release point was 2.25 to 2.5 inches up the ramp. Make sure the tester is well leveled before testing. Also make sure the testing table is leveled as well for film to stay flat. Use tapes at both ends to secure the flatness of the film before testing. The bonding or tacky layer herein is preferably about 4 to about 100 mm of rolling ball tack.

The rolling ball method included: releasing a glass ball or steel ball which was placed two inches to 2.5 inches up the standard incline specified in the ASTM method and allowing the ball to accelerate down the incline and roll across a horizontal surface of the pressure sensitive adhesive sample. The modified test version included using a glass ball instead of a metal ball, the glass ball having a diameter of about 1/8 inch, and using a shortened release point off of the incline (i.e., as indicated above, two inches up the incline). As used herein, a steel ball 5/32 inch was used placed approximately 2.25 to 2.5 inches up the ramp (preferably 2.25 inches). The relative tack was determined by measuring the distance the ball traveled across the adhesive before stopping, beginning from the end of the ramp. A longer rolling ball travel distance indicated lower tack to the polar surface of the glass ball, and indicated that the coating has a lower tendency to stick to rollers and metal surfaces on packaging machines, compared to coatings with a shorter rolling ball travel distance which indicated a higher tack level. A longer rolling ball travel distance may also correlate to a lower tendency to adhere to food crumbs. In this measurement, the measurement was limited to a maximum of 4 inches because the maximum sample size available for testing was 4.0 inches× 4.0 inches. Results from the rolling ball tack test are shown in the Table below.

The surface energy of a substrate was measured by contact angle. The equipment used for this test included a G 10 contact angle measuring goniometer, diiodomethane, double distilled water, two syringes, a timer, and a micrometer. The procedure of the test is as follows:

(1) Place the substrate on the sample stage and draw a vacuum to flatten the surface. Turn on a light behind the stage, using the knurled knob on the back of the apparatus, to illuminate the stage. Remove the lens cap directly in front of the stage.

(2) Apply a 1-2 mm max. diameter sessile drop of either DI water or diiodomethane via the syringe to the surface. Do this by squeezing a small drop from the syringe, then raising the stage until close enough for the drop to transfer to the surface, while not touching the needle itself to the surface. Use a micrometer to gauge drop size. Then lower the stage until the drop is visible through the eyepiece.

(3) Position the cross hairs on the contact point of the liquid drop and the surface being measure. Move the stage using (e) and (f) to line up the origin of the cross hairs with the right end of the drop, at the contact pint (i.e., the point at which the bottom of the drop meets the drop reflection. Focus the drop using (a), or more preferably, (h).

(4) Rotate the cross hair to the position of the tangent point to the drop surface from the contact point of the drop and the surface, using (d).

(5) From the angular scale, record the tangent angle in degrees (0 to 180°). Note the time it takes from placing the drop to recording the angle because surface energy is a time-dependent phenomenon. With practice, repeat measurements can be comfortably made in 1.5 minutes.

(6) Repeat five times to obtain five values keeping the same time interval as in (5).

(7) Change to the other liquid and repeat steps (2) through (6).

(8) Average the values obtained and calculate the surface energy of the substrate using the Fowkes Equation to calculate the polar and dispersive surface energies, as well as overall surface energy.

The surface energy was also measured using another test. The surface energy of a substrate is an indication of how easily the substrate wets out with an adhesive or coating. In polyolefins, it measures the degree of treatment and suitability for use with a given adhesive or coating. The equipment needed for this test includes cotton swabs and commercial treatment check solutions (such as AccuDyne test marker pens from Diversified Enterprises or equivalents). The procedure of the test is as follows:

(1) Choose a treatment check solution either from an educated guess of what the surface energy will be or start with a 38 dyne/cm$^2$ solution.

(2) Dip a clean cotton swab (never use a swab twice, not even in the same solution) in the solution and squeeze out excess solution on the side of the bottle below the rim.

(3) Wipe the side edge of the swab on the surface to be check to cover approximately one square inch (not necessarily a one inch square) and immediately start timing or counting by thousands to approximate seconds.

(4a) If the solution breaks up in less than two seconds, the surface energy is less than the dyne number on the bottle used. Discard the swab, choose a lower numbered dyne/cm$^2$ solution bottle, a clean swab, and a fresh area on the surface of the substrate, and repeat steps (2) and (3).

(4b) If the solution has not broken up in three seconds, the surface energy is higher than the dyne/cm$^2$ solution bottle, a clean swab, and a fresh area on the surface of the substrate, and repeat steps (2) and (3).

(4c) If the solution breaks up between two and three seconds, record the dyne/cm$^2$ number of the solution used as the surface energy of the substrate.

TABLE 2

Rolling Ball and Surface Energy Measurement Results

| Sample ID | Polybutene-1 (%) | Olefinic Elastomer (%) | Additive (%) | Inner Layer (Formula) | Rolling Ball on bonding layer (mm) | Dynes Pen on bonding layer (Dynes) |
|---|---|---|---|---|---|---|
| 1 (Comparative) | — | — | — | PP/PET | 2.38 | 36 |
| 2 (Comparative) | — | — | — | PP/PET | 3.46 | 36 |
| 3 (Inventive) | 75 | 25 | — | PA | 4.46 | 32 |
| 4 (Inventive) | 50 | 50 | — | PA | 5.13 | 32 |
| 5 (Inventive) | 25 | 75 | — | PA | 5.65 | <32 |
| 6 (Inventive) | 0 | 100 | — | PA | 7.28 | |
| 7 (Comparative) | 10 | 85 | 5% A/B | PA + 10% OCMB + 10% CaCO3 MB | >17 | <32 |

*A/B = Antiblock Master Batch

The rolling ball tests following the methods described in paragraph 107 above as shown in Table 2 above. Comparative sample 1 is commercially available shipping tape under the trade name Tarten. Comparative sample 2 is a commercially available Oreo cookie package. The rolling ball tack tests show that the tacky or bonding layer by blending PB with olefinic elastomer blends has much lower energy than the surface energy of the adhesive used on a commercially available package of OREO cookies. The steel ball stuck to the OREO packaging adhesive or the sipping tape PSA very quickly when in contact with the surface, indicating a higher tacky surface. Where for PB blends with Olefinic elastomers, the ball traveled too far if release from the very top of the ramp. When lower the ball's release point to much lower position, (2.25 inch ramp distance from the release point to the top of the table), the distance traveled by the ball became measurable. Still, when measured at the same release height, the ball traveled much further on the surface of the blend of PB with Olefinic elastomer than on the surface of the Oreo PSA or shipping tape. As to samples V30, which has no reclose-ability, the ball traveled across a much longer distance on the surface (it was recorded as >17 mm). While for PA side of the release layer, the ball can travel all the way across the film surface and then continue off the surface. (>12 inch). On the other side, the surface energy recorded by the Dynes pen also showed lower surface energy of the bonding layers that were formed by blending PB with olefinic elastomers. Also, the PA surface (release layer) has much higher surface energy. Such as the PA636 from Nycoa 2012 is 50 dynes and blend of PA2012 with PA666 is 54 dynes.

Figure 27:
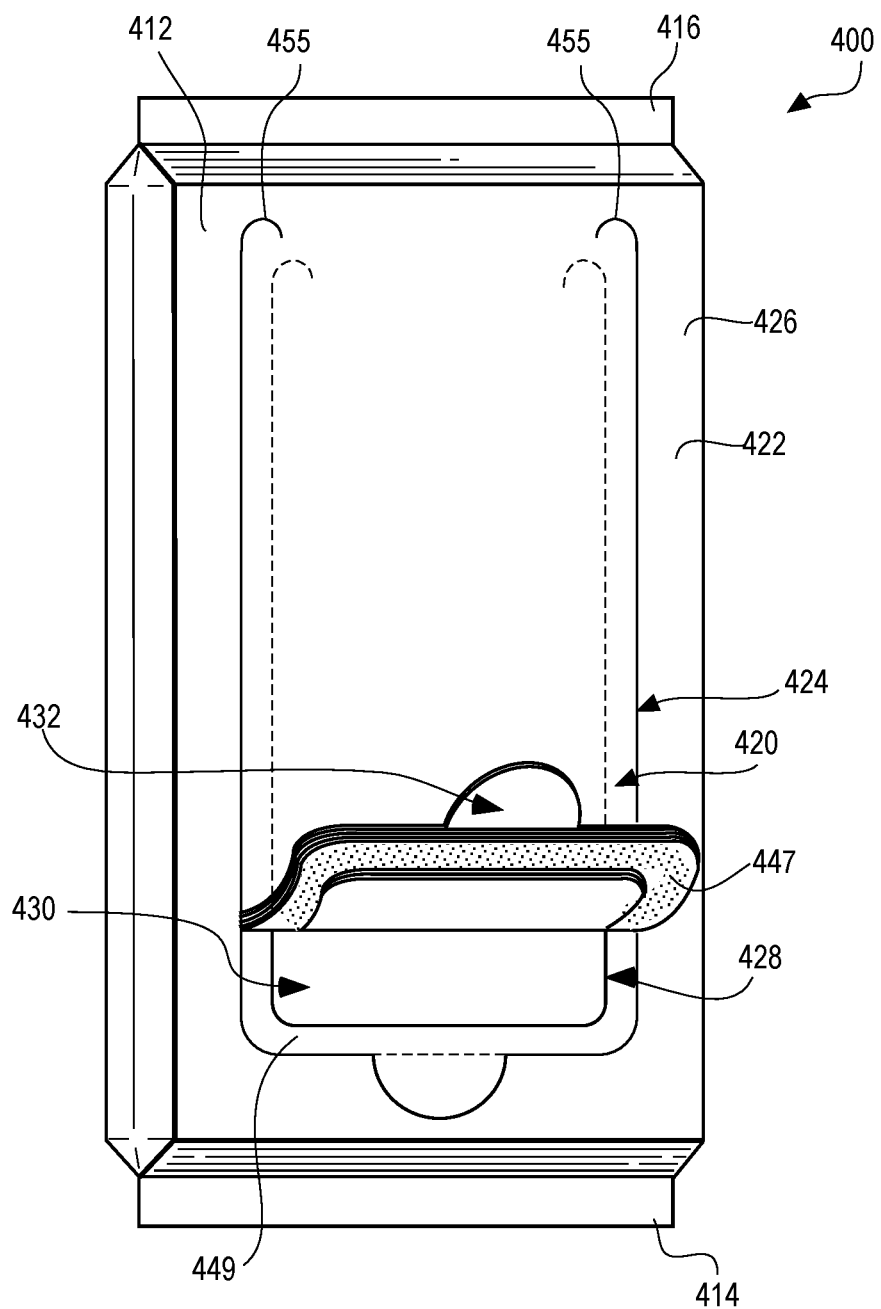
FIG. 27 is a top perspective view of another package in a partial open configuration.

Another package embodiment having an embedded coextruded bonding or tacky layer that is coextensive with adjacent layers of the multilayer film is shown in FIG. 27. FIGS. 28-35 illustrate the film components and cross sectional views in various states of formation before being configured into the package of FIG. 27, which incorporates some of the layers discussed above. As mentioned, the multilayer film can itself be utilized to form a package, or it can be laminated to one or more additional web or layers of film to form a resealable package. In the embodiment of FIGS. 27-35, the multilayer film is laminated to a base film via an adhesive disposed in a pre-configured and repeating arrangement to form a multi-ply multilayer film.

The film package 400 may be constructed using a standard flow pack process that includes forming forward (or leading) and rearward (or trailing) end seals 414, 416 and a longitudinal fin or lap seal (not shown) extending therebetween, which may be on the opposite side of the package opening 428, as shown. In the illustrative example of FIG. 27, the package 400 generally has a top wall portion 422 above an optional tray and a resealable opening 428 in the top wall portion 422. Further, the package 400 may have a package opening feature 420 that permits the user or consumer to open and repeatedly reseal the package 400 during use.

The resealable opening feature 420 may include a gripping or pull tab 432 and a flap or resealable panel 424. The resealable panel 424 can be separated and partially pulled away from a remaining portion 426 of the top wall 422 to reveal the resealable opening 428 and an interior 430 of the package 400. The gripping or pull tab 432 of the package 400 is provided to give consumers a convenient gripping surface for opening the package 400.

Figure 29:
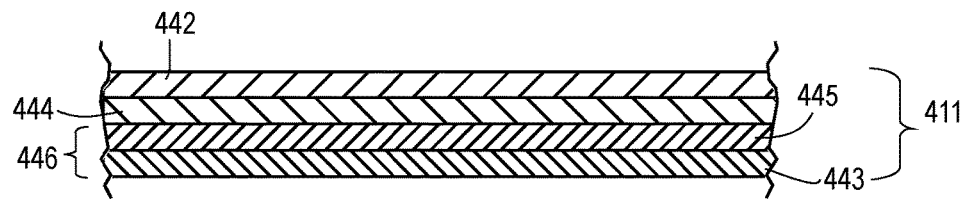
FIG. 29 is a cross section of the film web of FIG. 28 with the background omitted to more clearly illustrate the film.
Figure 35:
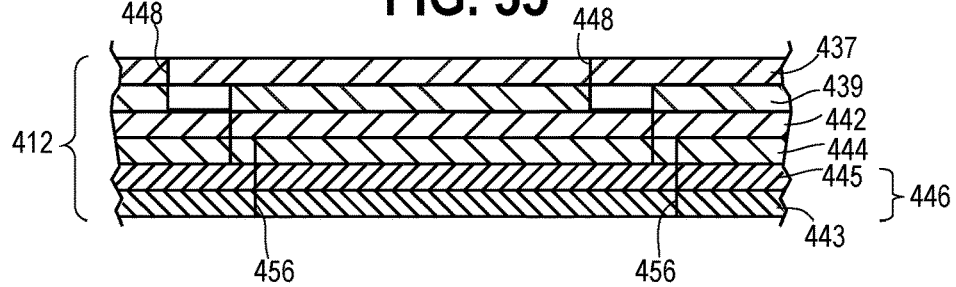
FIG. 35 is a cross section view of the film web of FIG. 34 with the background omitted.
Figure 36:
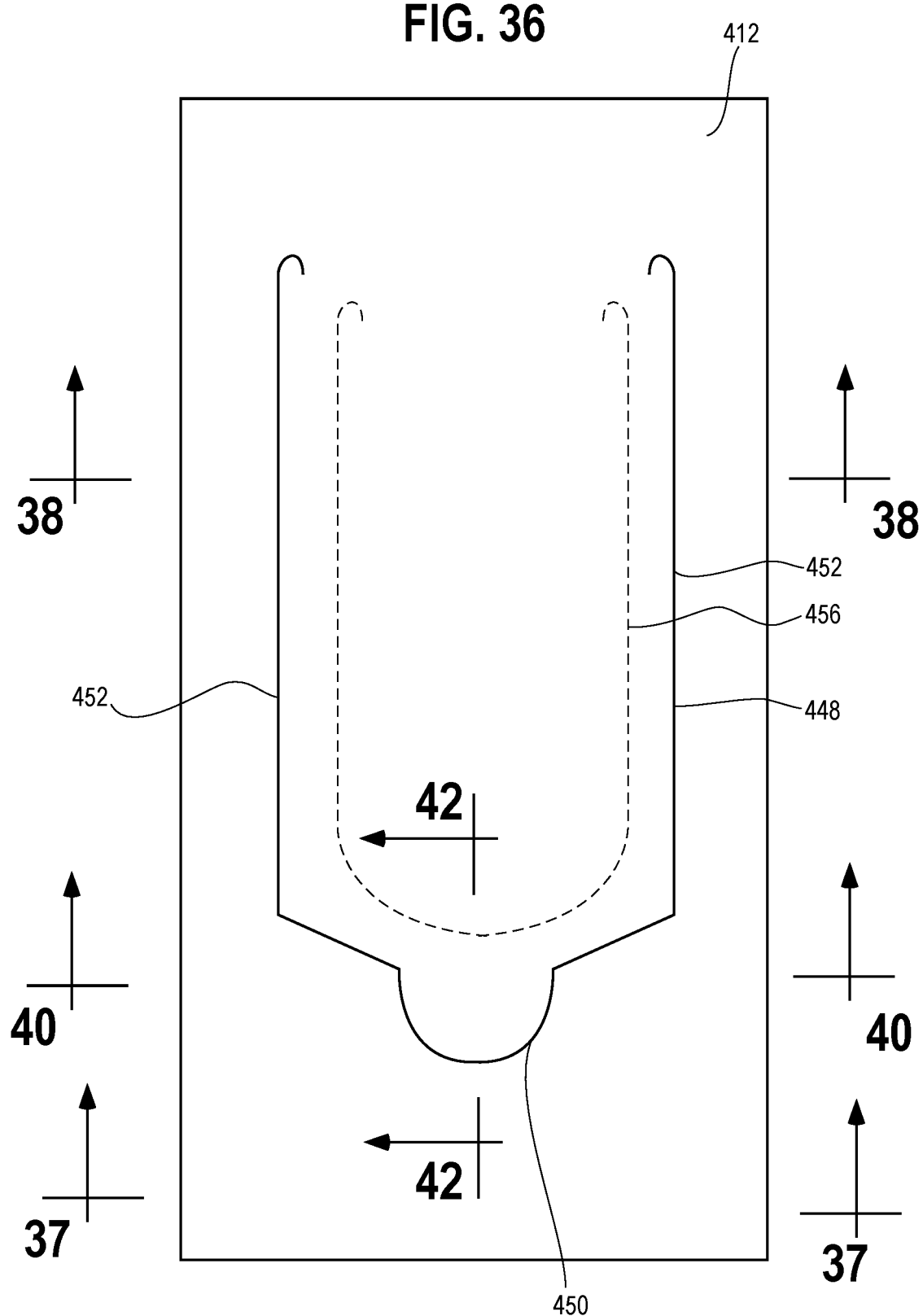
FIG. 36 is a top view of a portion of a multi-ply multilayer laminate formable into a package with a resealable opening.
Figure 37:
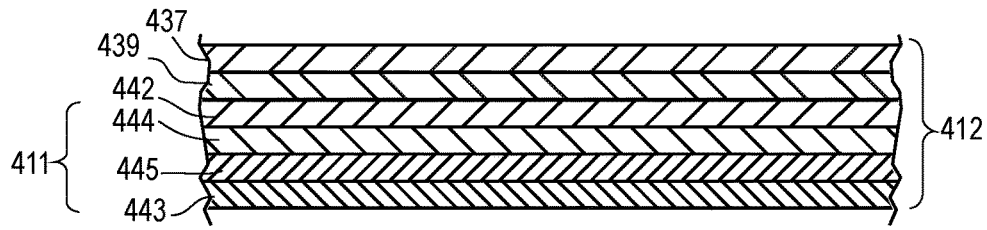
FIGS. 37-43 are cross section views of FIG. 36 with some of the FIGURES illustrating the films layers in the closed configuration and other FIGURES illustrating the film layers in the open configuration.

In one form, the film 412 (a portion of which is shown in FIG. 35 in cross section) forming the package 400, includes a number of layers and cuts therein. A portion of the multi-ply multilayer film 412, the multilayer film 411, is shown in FIG. 29. The multilayer film 411 includes a first film layer 442, a tacky core or an embedded coextruded bonding layer 444, and a second film layer 446 that may include a release and reclose layer 445. The second film layer 446 also may include a heat seal layer 443 that helps form the seals of the package. As shown, each of the layer of the multilayer film 411 are coextensive with one another and may be formed in a number of different manners as discussed above.

As shown, the coextruded bonding layer 444 is encapsulated or embedded between the first and second film layers 442, 446. As such, the coextruded bonding layer 444 can bond to the first and second film layers 442, 446 so that the package 400 can be easily and repeatedly resealed and reopened. To this end, the coextruded bonding layer 444 has a stronger bond to the first film layer 442 than to the release and reclose layer 445 of the second film layer 446. It will be understood that any of the layers can itself be a laminate with a multi-layer construction.

Similar to packages described above, the opening feature 420 utilizes the bonding layer 444 for package reclose. Pulling the resealable panel 424 generally away from the top wall 422 breaks or separates cuts in the first film layer and the second film layer. In the illustrative example of FIG. 27, the resealable panel 424 also includes a portion of a base film 437, which is adhesively laminated to the multilayer film 411 as explained below.

Figure 28:
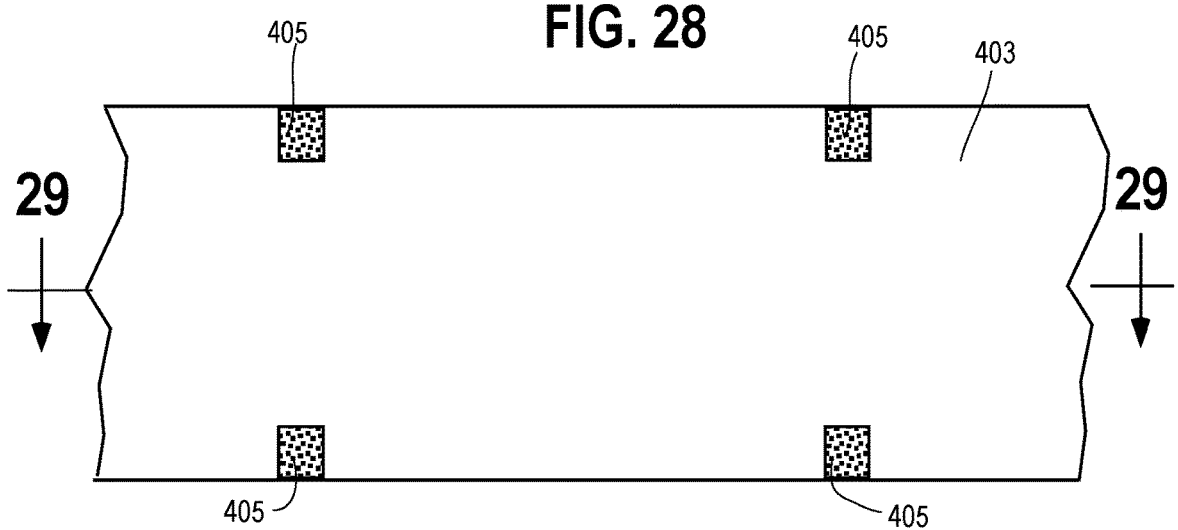
FIG. 28 is a top view of a portion of a multilayer film web.

To further illustrate the components of the package 400, the film 412, portions thereof, and cuts therein are illustrated in FIGS. 28-44. FIG. 28 illustrates a top view of a multilayer film 411 and FIG. 29 illustrates a cross section thereof. To assist with laminating the multilayer film 411 to a base film 437, the surface 403 may have eye marks 405 printed thereon. For ease of understanding, the cross sectional views omit background features to more clearly illustrate the features of the film. For example, the side of the eye marks are not included in the cross section views, which illustrate only the layers of material found at the cross section location.

Figure 30:
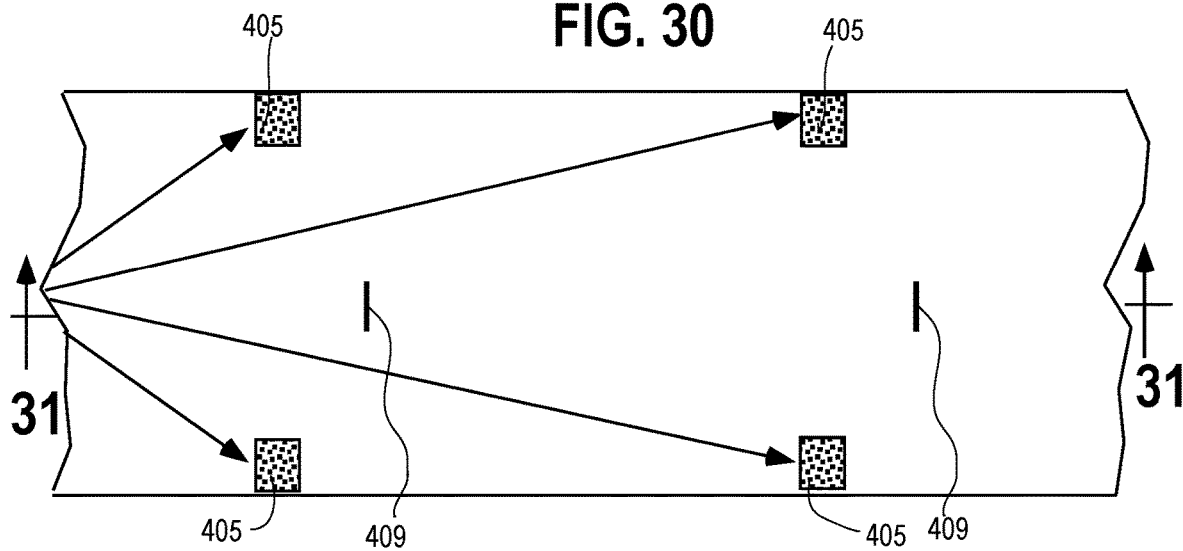
FIG. 30 is a top view of the portion of the film web in FIG. 28 with a first cut therein.
Figure 31:
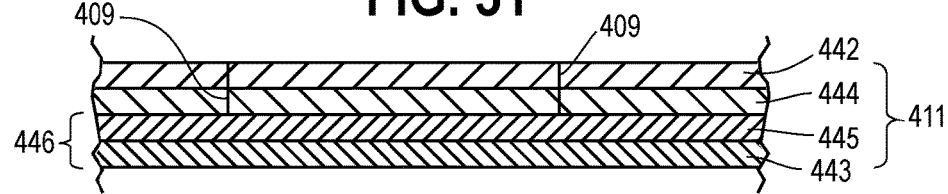
FIG. 31 is a cross section of the film web of FIG. 30 with the background omitted.
Figure 32:
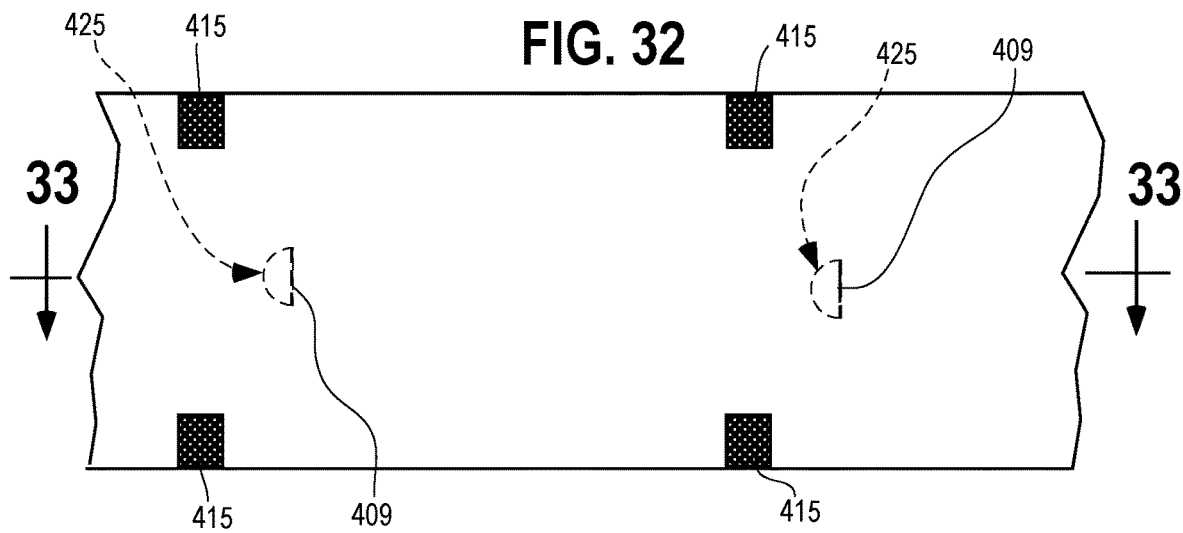
FIG. 32 is a top view of a multi-ply multilayer film web, with non-adhering zone.

FIGS. 30 and 31 illustrate a first or intermediate cut 409 that is disposed in a portion of the multilayer film 411. The first cut 409 subsequently forms the rear or trailing edge of the pull tab 432. The first cut extends from an outer surface 403 of the first film layer 442 therethrough to at least the embedded coextruded bonding layer 444. In operation, the first cut 409 is formed to rupture both the first film layer 442 and the coextruded bonding layer 444 at least upon initial package opening. In this manner, the consumer can lift the pull tab 432 and then a portion of the reseal panel 424 including a portion of the bonding layer 444 beginning at the first cut 409. Though the first cut 409 is illustrated as a linear cut across a portion of the width of the film 411, the first cut 409 also may be a non-linear line or may have curved ends (such as to inhibit tearing of the film), in addition to being a straight line. The placement of the first cut 409 may be determined by the location of the eye marks 405 along the multilayer film 411, which is preferably formed before formation of the first cut 409. In addition, the first cut 409 is illustrated as nearly intersecting the outer cut 448. If the first cut 409 does not intersect the outer cut 448, the film therebetween may tear during initial package opening. In another configuration, the first cut 409 may intersect and even cross over the outer cut 448 at this location, which also may be the transition between the first and second depth cuts other outer cut 448, if the film includes a multi-depth outer cut 448 as discussed below.

Figure 44A:
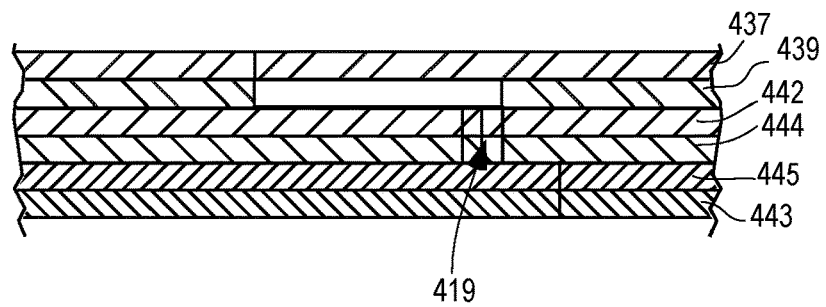
FIG. 44A is a first alternative cross section of FIG. 42.
Figure 44B:
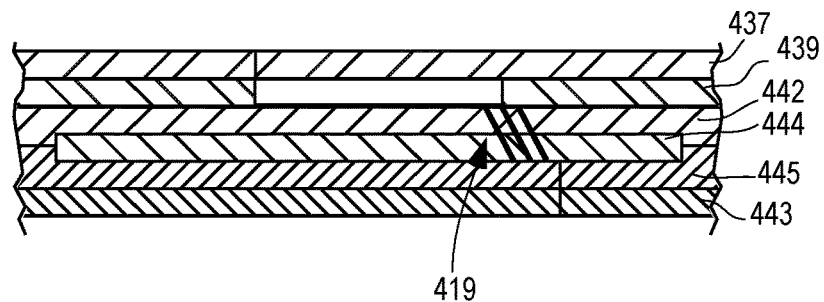
FIG. 44B is a second alternative cross section of FIG. 42.
Figure 46:
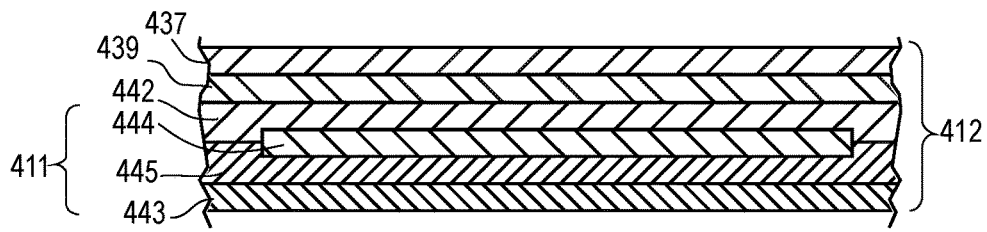
FIGS. 46-52 are cross section views of FIG. 45 with some of the FIGURES illustrating the films layers in the closed configuration and other FIGURES illustrating the film layers in the open configuration.
Figure 47:
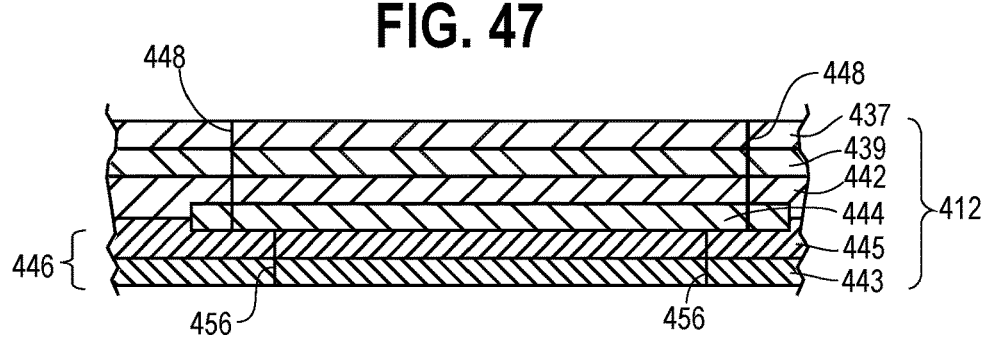
Figure 48:
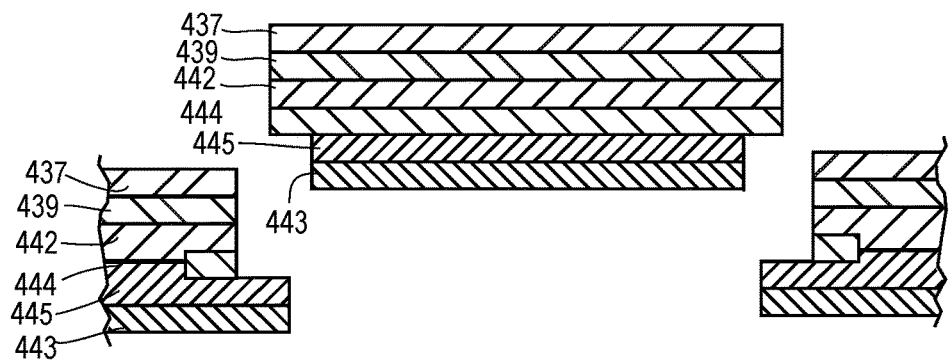
Figure 49:
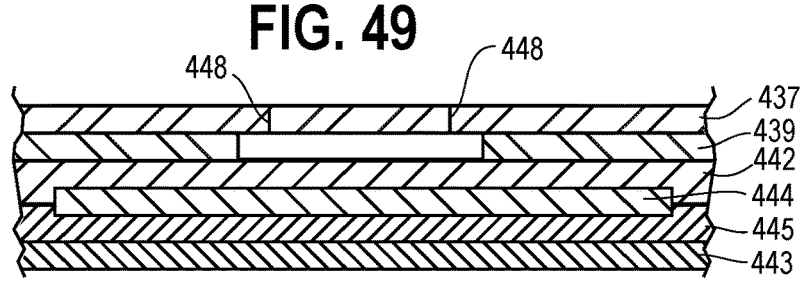
Figure 50:
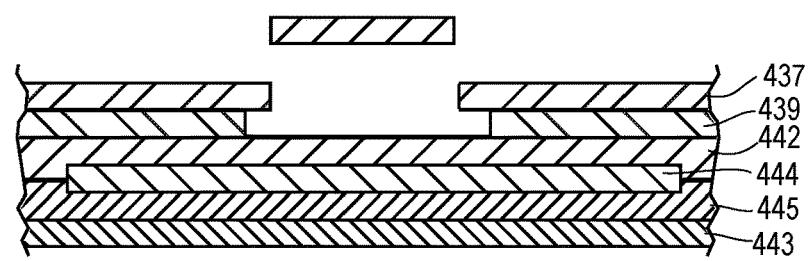
Figure 51:
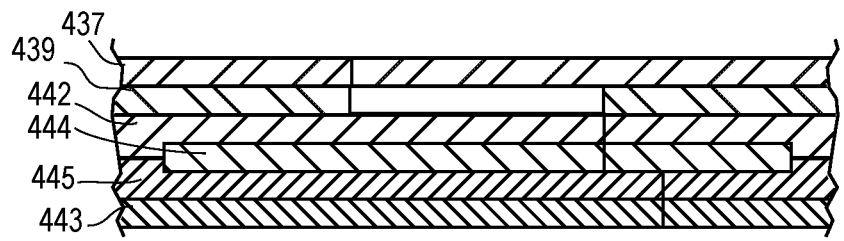
Figure 52:
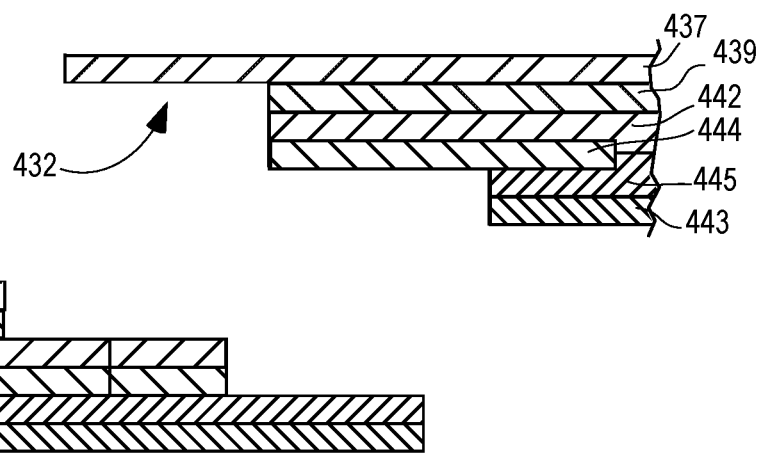

The first cut 409 may be a single cut or may include multiple discrete cuts (as illustrated in FIGS. 44A and 44B). The first cut 409 having a plurality of repeating first cuts disposed a distance from one another allows for variation in registration of the multilayer film 411. In addition, the multiple repeating cuts may have a variety of depths. As shown in FIG. 44A, the first cut 409 may include multiple first cuts 419 that become progressively deeper in depth. Though the first cut 409 may have one or a variety of depths, the first cut 409 does not extend into the release and reclose layer 445. As shown in FIG. 44B, the multiple first cuts 419 can also be inclined toward the inner cut 456 to assist in directing tear forces through the film 411. The angle of inclination can be between 30 and 90 degrees, e.g., 45 degrees or 60 degrees, as may be suitable.

In the illustrative embodiment with multiple first cuts 409, the first cuts may be made in a single or multiple passes of the die cutter or knife. If multiple first cuts 409 are incorporated into the multilayer film 411, the cuts may be formed via multiple knives or a single knife with multiple blades. One example of the multiple, repeating first cuts 419 is shown in FIG. 44. As suggested above, the cuts (including the first, outer, and inner cuts described herein) may be formed via dies, lasers, or the like.

During package opening, the first cut 409 operates to rupture both the first film layer 442 and the coextruded bonding layer 444 such that the front or leading edge of the reseal margins 447, 449 is formed. The film 412 forming the package 400 may further include a base film 437 adhered to the first film layer 442 via an adhesive lamination layer 439 configured such that the multilayer film 411 and the base film 437 form a multi-ply multilayer film 412 with a non-adhering zone 425 between portions of the base film 437 and the first film layer 442 of the multilayer film 411.

By one approach, the base layer 437 is a fully printed, protective outer web that is laminated, via adhesive (that may be pattern applied to leave an unbonded area between the base film 437 and the first film layer 442), to the first film layer 442. The unbonded area, such as non-adhering zone 425, may subsequently become the package pull tab 432, and, to that end, the unbonded area is positioned and registered such that it is adjacent the intermediate, first cut 409 that forms the trailing or rear edge of the pull tab 432.

Figure 33:
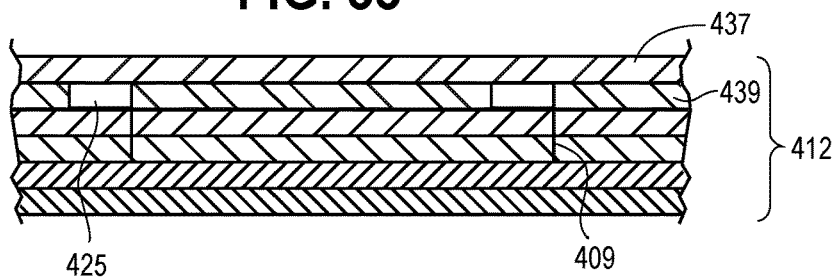
FIG. 33 is a cross section of the film web of FIG. 32 with the background omitted.
Figure 34:
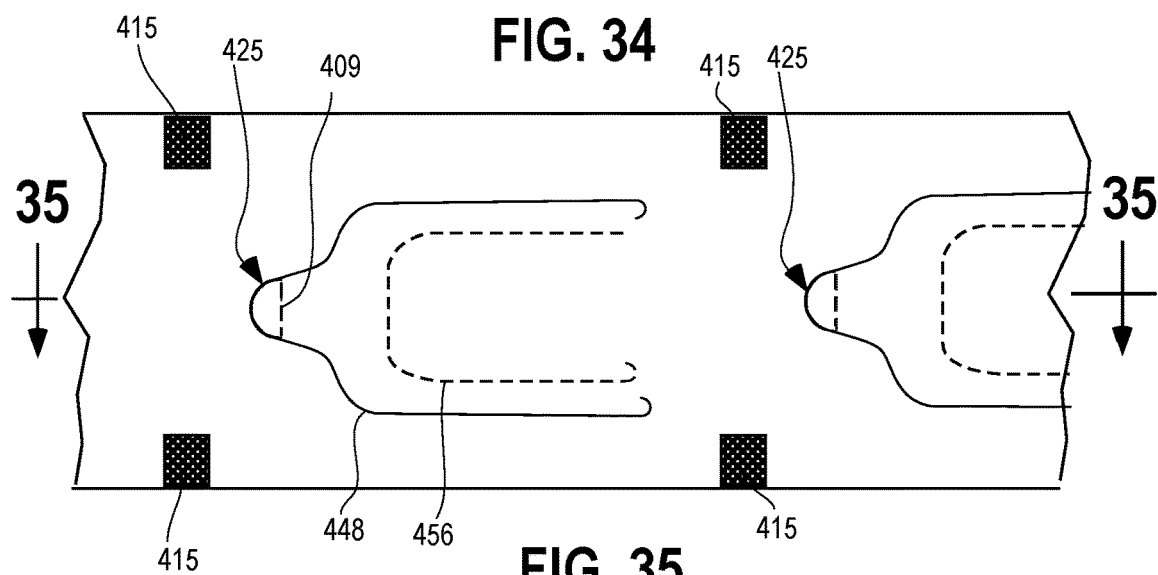
FIG. 34 is a top view of the multi-ply multilayer film web of FIG. 32 with inner and outer cuts formed therein.

FIG. 33 illustrates a cross section of the film showing the first cut 409 embedded in the multi-ply multilayer film 412 that includes a base film 437 adhered to the multilayer film 411 via an adhesive lamination layer 439. In one illustrative approach, the non-adhering zone 425 or the area without any adhesive between the base film 437 and the first film 439 is disposed adjacent the first cut 409. As the non-adhering zone 425 subsequently becomes the pull tab 432 and the first cut 409 forms a trailing edge of the pull tab 432, the first cut 409 may be disposed proximate a trailing area of the non-adhesive zone 425. In one illustrative embodiment, the adhesive lamination layer 439 is disposed in a pre-configured and repeating pattern to thereby form the non-adhering zone 425. The die cut 409 may have a variety of configurations. The die cut 409 shown in FIG. 33 is disposed within the non-adhering zone 425 that forms the pull tab 432, the first cut 409 also may extend beyond the outer cut 448 or may include tear-inhibiting ends.

As noted above, a surface 403 of the first film layer 442 of the multilayer film 411 may include eye marks 405 thereon, which assist with registration and formation of the first die cuts 409. In addition, the base film layer 437 also may include eye marks 415 printed thereon. In this manner, after the multilayer film 411 is coextruded (or otherwise formed) and the first die cuts 409 formed, the first eye marks 405 and the second set of eye marks 415 may be aligned or matched up and then the multiple plies may be laminated together to form the multi-ply multilayer film 412.

Figure 38:
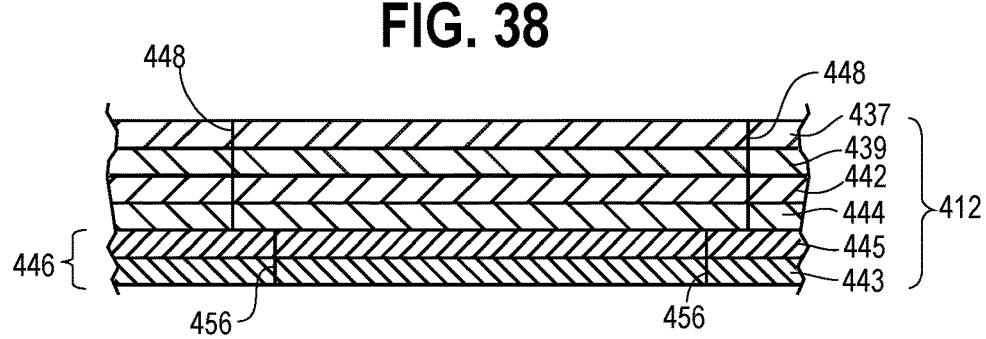
Figure 39:
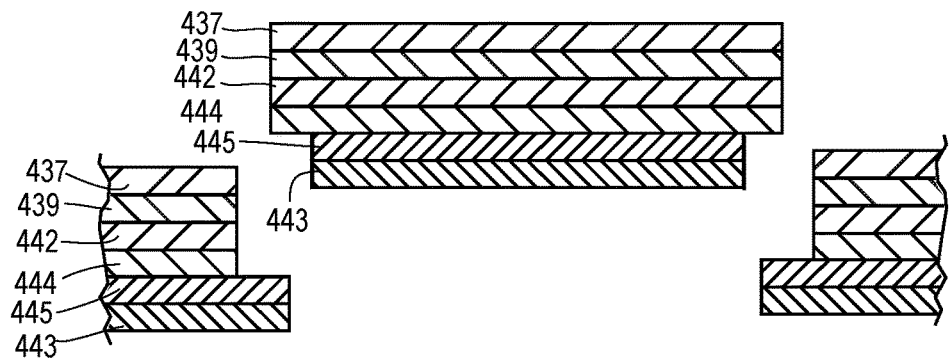
Figure 40:
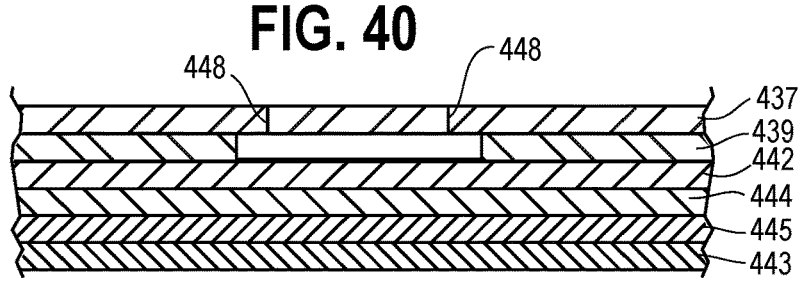
Figure 41:
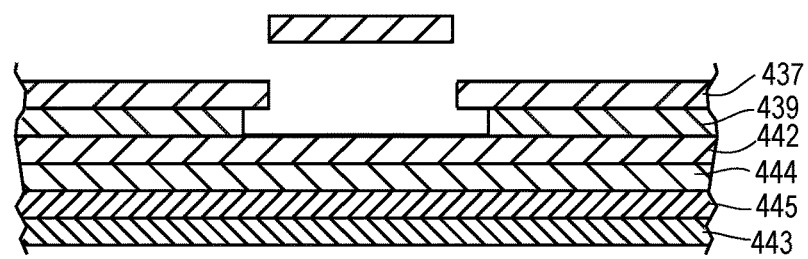
Figure 42:
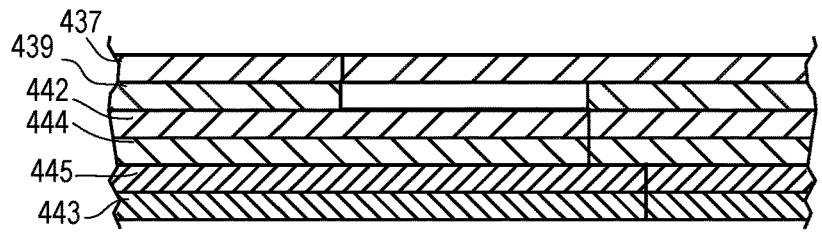
Figure 43:
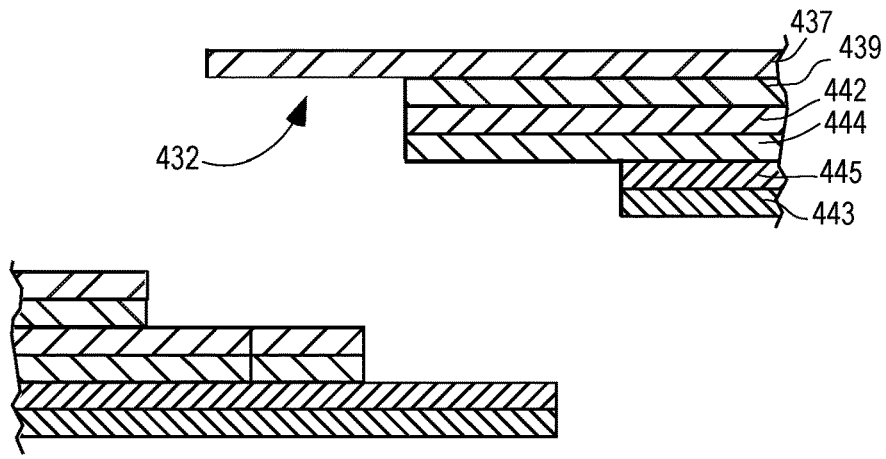

Subsequent to the formation of the multi-ply multilayer film 412, an outer cut 448 and an inner cut 456 are formed in portions thereof. The outer cut 448 is disposed in the base film 437 and extends therethrough and at least portions or sections of the outer cut 448 extend at least partially through the embedded coextruded bonding layer 444 (as illustrated in FIG. 38). Furthermore, the outer cut 448 has a portion or section thereof that coincides with the non-adhering zone 425 to subsequently form the pull tab 432. The inner cut 456 is disposed inwardly of the outer cut 448 and extends from the second film layer 446 to the bonding layer 444.

The film 412 and the cuts 409, 448, and 456 formed therein define a resealable opening feature 420 that is formed with a reseal margin 447, 449. The reseal margin 447 being the portion thereof that is lifted from a remainder of the package and the reseal margin 449 being the portion thereof that remains. The reseal margin 447, 449 being partly defined by the first cut 409, the inner cut 456 and the outer cut 448. The resalable opening feature 420 also includes a resealable panel 424 that is defined partly by the outer cut 448 and a portion of which is lifted from the remainder of the package 400 to expose the resealable opening 428, defined, in part, by the inner cut 456.

In operation, pulling the pull tab 432 and the resealable panel 424 generally away from the remainder of the top wall 422 breaks or separates the inner and outer cuts 456, 448 in the multi-ply multilayer film 412 to expose the package opening 428, as well as a reseal margin 447 of the embedded bonding layer 444 and a reseal margin 449 of the reseal and reclose layer 448 of the second film layer 446. The reseal margins 447, 449 are created by the outer cut 448 in the base film layer 437, the adhesive lamination layer 439, the first film layer 442, and the embedded coextruded bonding layer 444. The outer cut 448 is dimensionally larger than the inner cut 456 in the second film layer (which includes the reseal and reclose layer 445 and the heat seal layer 443).

The opening feature 420 is defined by cuts or other lines of weakness formed by dies, lasers, or the like. In one illustrative embodiment, the outer cut 448 extends through the first film layer 442 and the bonding layer 444 to create a resealable panel 424. The outer cut 448 may have a variety of configurations, such as those described above. In other configurations, the outer cut 448 may have a shape similar to a silhouette of a wine or water bottles. Further, the distal ends 455 may have a tear stopping or tear inhibiting feature, such as hooks or the like.

While the cuts described and illustrated in the FIGS. 31, 33, 35, 38, 40, 42, and 44 are illustrated as cleanly through various layers of the multi-ply multilayer film 412, it is also anticipated that the cuts may be slightly longer or slightly shorter than depicted such that by pulling on the pull tab 4332 the cuts may be further torn to open the package. In this manner, the tearing can be controlled by utilizing a film with tear-directing properties.

A number of optional films and materials have been described for use in the multi-ply multilayer film 412. In one illustrative embodiment, the multilayer film 411 may include a polypropylene layer, polyethylene, a copolymer, or a polyester film layer, a high oxygen and flavor barrier layer, a coextruded bonding layer 444, a release and reclose layer 445, and a heat sealable layer 443. Accordingly, the first film layer 442 may include a polypropylene layer and/or the second film layer 446 may include a heat seal layer 443 in addition to the release and reclose layer 445. In this manner, the first cut 409 does not extend through the release and reclose layer 445 and the inner cut 456 extends from the bottom of the film through the release and reclose layer 445 and to the embedded coextruded bonding layer 444. Though a number of different materials are available, the configuration of the multi-ply multilayer film 412 includes an embedded bonding layer 444 adjacent the release and reclose layer 445 to provide the desired reseal opening.

By one approach, the heat sealable layer 443 is coextensive with the adjacent film layers. By another approach, the heat sealable layer 443 is primarily disclosed in the areas of the multilayer film 411 that subsequently form the package seals.

FIG. 35 illustrates the outer cut 448 and the inner cut 456 disposed in the multi-ply multilayer film 412. While the outer cut 448 may be of a uniform depth such that the entirety of the outer cut 448 extends from the base film 437 to the embedded bonding layer 444, in another configuration, the outer cut 448 is a multi-depth cut have a first portion 450 with a first depth and a second portion 452 with a second depth. By one approach, the first portion 450 coincides with the non-adhering zone 425 to form the pull tab 432 and the second portion forms the resealable panel 424 that extends from the pull tab 432 down the top of the package 400. In one example, the first depth of the first portion 450 may extend only through the base film layer 437, as illustrated in FIG. 35. In other examples, the first depth of the first portion may extend past the adhesive lamination layer 439 into the first film layer 442 or even the coextruded bonding layer 444. The second depth of the second portion 452 extends from the base film 437 into the embedded coextruded bonding layer 444.

The transition from the first depth of the first portion 450 to the second depth of the second portion 452 may occur proximate the rear of the pull tab 432 and may occur in a gradual, somewhat sloping, configuration or may occur in a step-wise fashion.

As described herein, the first cuts 409, 419, inner cut 448, and outer cut 456 may be at least one of die cut or laser cut. Furthermore, these cuts may have linear portions and/or non-linear portions. By one approach, some of the cuts may terminate in a tear-inhibiting feature, such as a curved end or hook.

As mentioned above, the embedded bonding layer 444 can extend to the width and/or the length of the film web 412, but it alternatively can be of reduced width and/or length, as shown in FIGS. 45-52, which otherwise have the same construction as FIGS. 36-43.

FIGS. 53-59 illustrate the features of the film web 412 in a layer-by-layer arrangement. More particularly, the layer-by-layer illustrations of the film web before they are formed into a package, but after each of the first, inner, and outer cuts are formed, permits inspection of the features as they relate to one another, such as where the non-adhering zone is located in relation to various cuts. Though seven layers are illustrated in this illustrative example, additional layers may be added to the film web 412.

Figure 53:
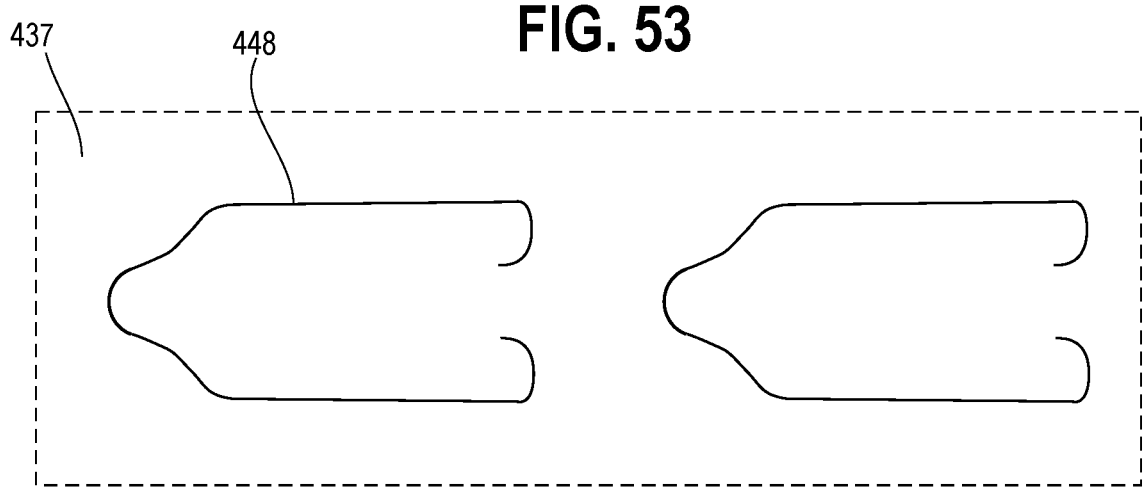
FIGS. 53-59 are top views of different layers of a film web.
Figure 54:
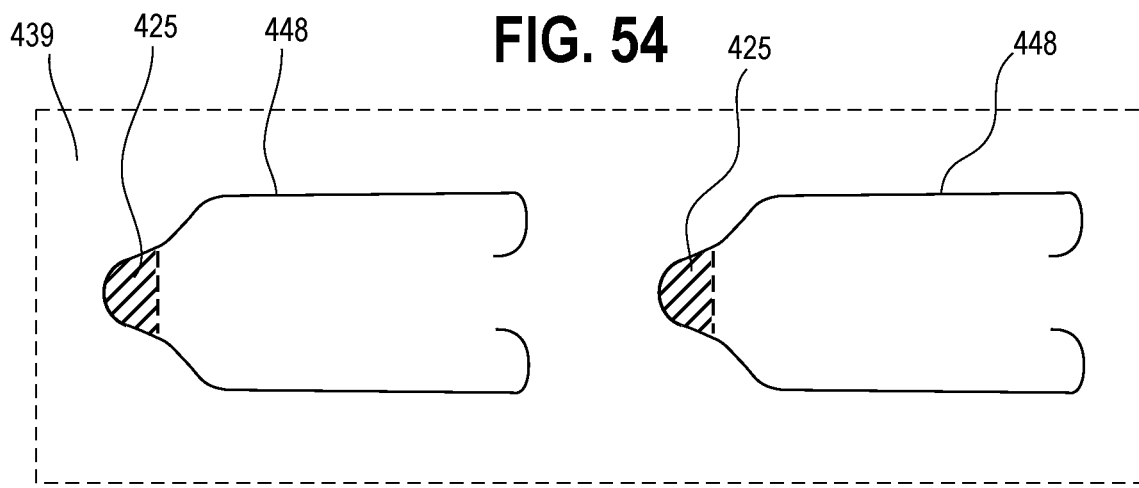
Figure 55:
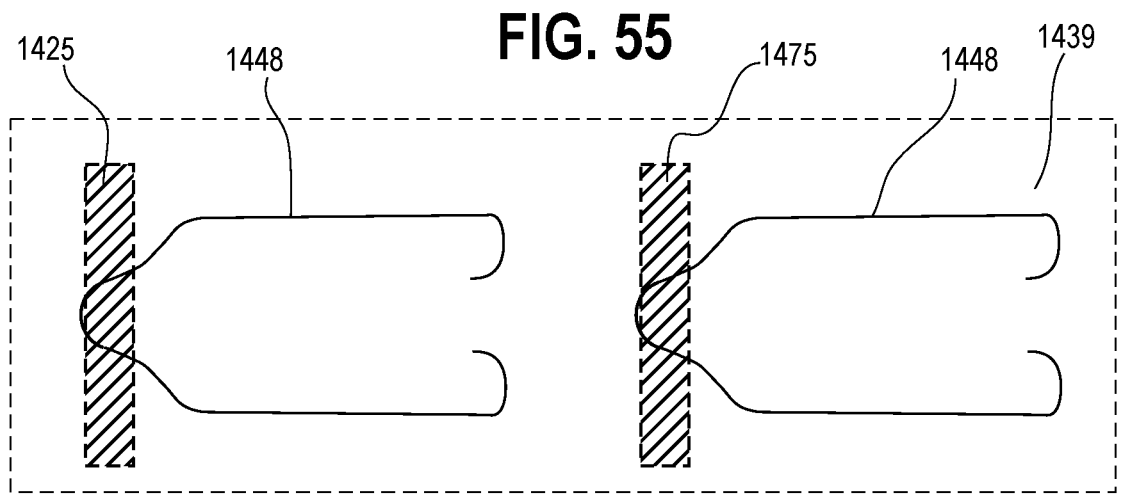

The portion of the film web in FIG. 53 illustrates the base film 437 having an outer cut 448 formed therein. FIG. 54 illustrates the adhesive lamination layer 439 having a non-adhering zone 425 and the outer cut 448 formed therein. FIG. 55 illustrates an alternative adhesive lamination layer 1439 that also includes a non-adhering zone 1425 and an outer cut 1448.

Figure 56:
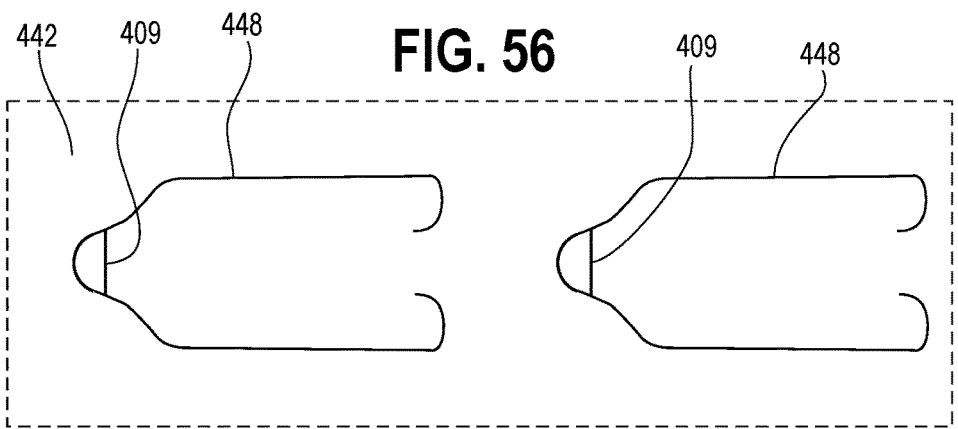
Figure 57:
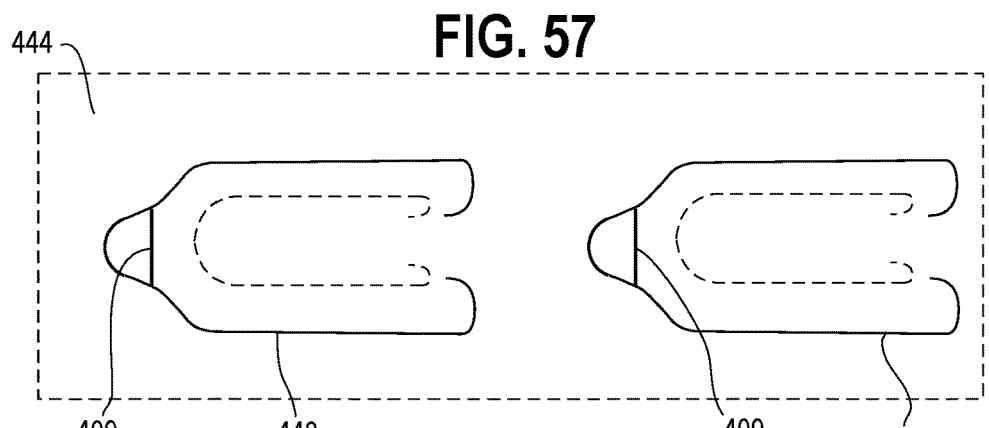
Figure 58:
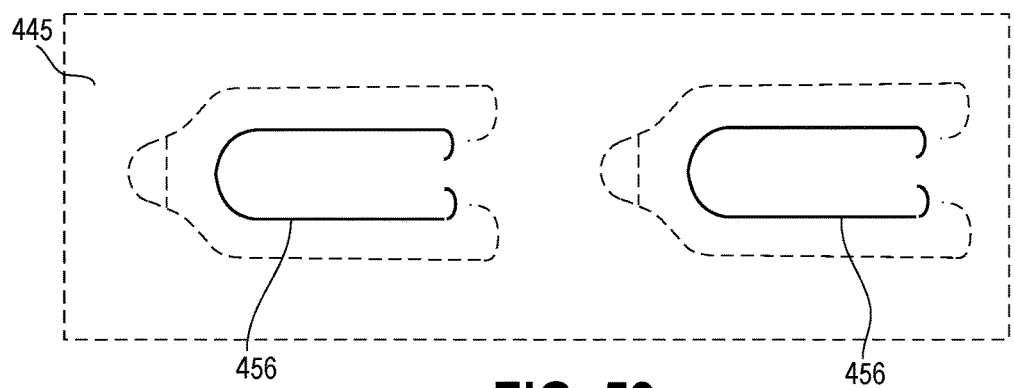
Figure 59:
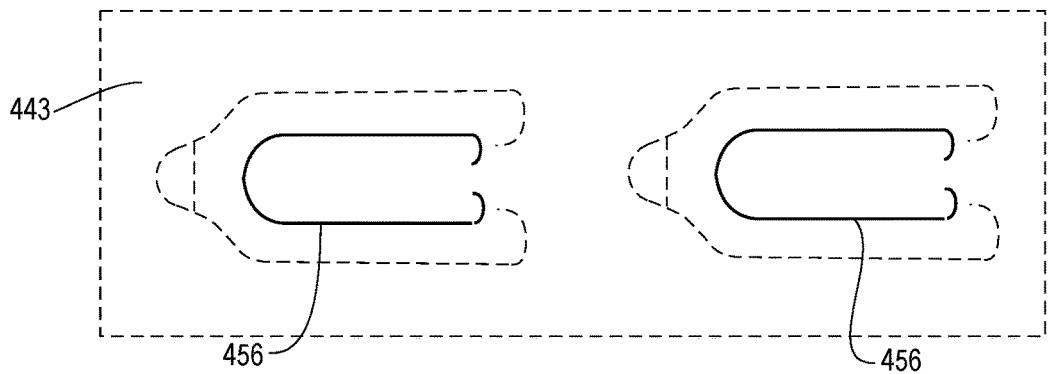
Figure 60:
FIGS. 60-69 are schematic views of a first intermediate cut.
Figure 61:
Figure 62:
Figure 63:
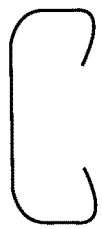
Figure 64:
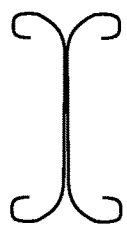
Figure 65:
Figure 66:
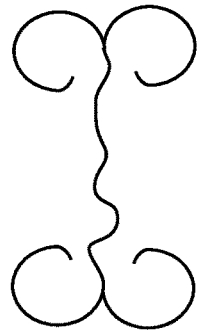
Figure 67:
Figure 70:
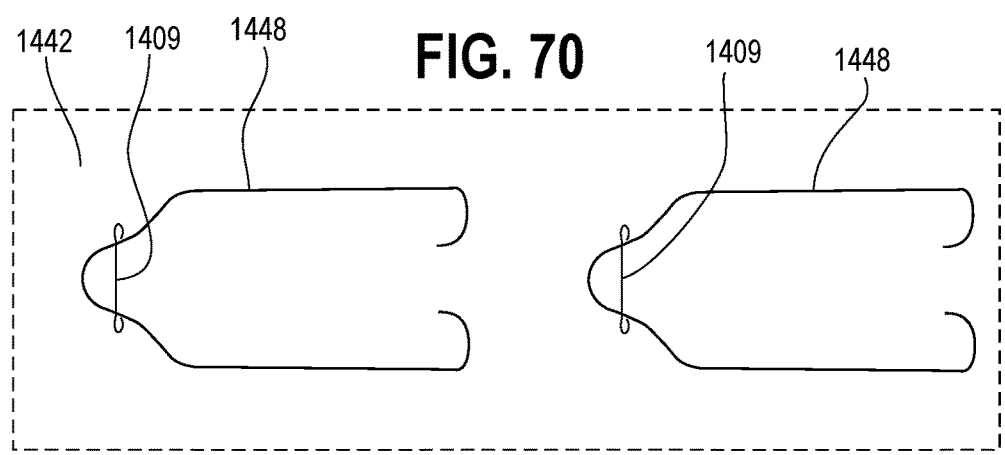
FIG. 70 is an alternative embodiment of the film layer of FIG. 56.

FIG. 56 illustrates the top layer of the coextruded 442 having the first cut 409 and the outer cut 448 formed therein. As shown, the first cut 409 and the outer cut 448 intersect with one another, but in another approach, the first cut 409 does not extend all the way to the outer cut 448 and the two cuts remain distinct from one another. In another illustrative embodiment, the first cut 1409 extends beyond the outer cut 1448 such that they intersect and cross over one another in the top layer 1442 (see FIG. 70). FIG. 57 illustrates the tacky layer or the embedded coextruded bonding layer 444 having the first cut 409 and the outer cut 448 disposed therethrough. The inner cut 456 is not disposed on that film layer, but is shown in the figure to show the respective location of the elements. FIG. 58 illustrates the release and reclose layer having the inner cut 448 formed therein. Though the first and outer cut are not formed in this film layer, they are shown in dashed lines here to show the respective of arrangement of the features. The release and reclose layer 443 is shown in FIG. 59 and has the inner cut 456 formed therein and the first die cut and outer cut only illustrated in dashed lines for illustrative purposes though these do not extend into the release and reclose layer 443.

Figure 68:
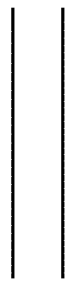
Figure 69:
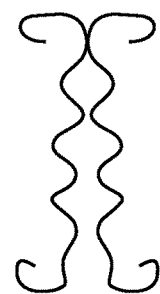

FIGS. 60-69 illustrate exemplary first cuts that may be incorporated into the packages described herein. As illustrated, curved, linear, and non-linear configurations may be incorporated therein. Further, the first cut may be a single cut or multiple cuts, such as in FIGS. 68 and 69. FIG. 68 illustrates how the first cut may have a repeating configuration.

The package 400 has a first cut 409 that is intermediate the layers of the multi-ply multilayer film 412. To that end, the multilayer film 411 is initially extruded with a first film layer 442 and a second film layer 446 around an embedded coextruded bonding layer 444. Then, the method of forming the package 400 includes forming a first cut 409 through the first film layer 442 at least to the embedded coextruded bonding layer 444. After the formation of the first cut 409, the method includes adhering a base film 437, via an adhesive lamination layer 439, to the first film layer 442 (on surface 403 thereof opposite the surface adhered to the bonding layer 444) thereby creating a multi-ply multilayer film 412 and forming a non-adhering zone 425 between portions of the base film 437 and the first film layer 442 by having interruptions in the adhesive lamination layer 439. By one approach, the adhesive lamination layer 439 is disposed in a pre-configured and repeating arrangement to thereby form the non-adhesive or non-adhering zone 425.

Once the multi-ply multilayer film 412 is formed, a series of cuts are formed therein. In one illustrative approach, the method includes forming an outer cut 448 in the base film 437 that extends through the base film 437 and at least partially through the embedded coextruded bonding layer 444 and a portion of the outer cut 448 coincides with the non-adhering zone 425 to form, in part, a pull tab 432. As suggested above, the step of forming the outer cut 448 may include forming a multi-depth outer cut 448 with a first portion 450 disposed adjacent a portion of the multi-ply multilayer film that forms the pull tab 432, the first portion 450 having a first depth that extends into the first film layer and the second portion 452 has a second depth that extends to the embedded coextruded bonding layer 444. In such a configuration, the first portion 450 of the outer cut 448 may not extend beyond the base film 437 (though the outer cut 448 can extend through the adhesive lamination layer 439, the first film layer 442, and to the bonding layer 444, if desired).

The method of making the package 400 also includes forming an inner cut 456 extending from the second film layer 446 at least to the embedded coextruded bonding layer 444. Once the film 412 is formed and the first cut 409, outer cut 448, and inner cut 456 are formed therein the multi-ply multilayer film 412 may be wrapped around package contents and sealed to form individual packages with resealable openings. As noted above, the formation of the first cut, the outer cut, and the inner cut may include at least one of die cutting or laser cutting. Further, these cuts may include a straight line, a non-linear line, and/or a curved end to inhibit tearing of the film.

To facilitate placement of the cuts and registration of the film components with one another, the first film layer 442 may have eye marks printed thereon. As noted above, this may happen before formation of the first cut 409. In addition, the base film 437 may have eye marks printed thereon, which are them matched with the eye marks of the first film layer 442 before adhering the two layers of the multi-ply multilayer film 412 together.

To permit the multi-ply multilayer film 412 to more easily be formed into a package with package seals, the second film layer of the multilayer laminate may include a heat seal layer in addition to the release and reclose layer.

As illustrated, the package 400 has a pull tab 432 on a top wall 422 of the package. By having the pull tab 432 on a top of the package 400 and the first die cut 409 forming a trailing edge of the pull tab 432, the initial open force to trigger delamination and open the package is reduced as compared to some packages having an opening at an end seal such as those requiring 4-7 lbf/in. to open. This reduction in the initial opening force required to trigger delamination and open the package is generally preferable to consumers who can more easily access the contents of the package 400.

Those skilled in the art will recognize that a wide variety of modifications, alterations, and combinations can be made with respect to the above described embodiments, and that such modifications, alterations, and combinations are to be viewed as being within the ambit of the inventive concept. For example, the configurations and concepts described herein can be applied to the construction of bags, pouches, and flow packs. More generally, the configurations and concepts described herein can be utilized on any flexible closure or package. Additionally, although some film and opening configurations as disclosed herein as described using a laminate film, skilled artisans will appreciate that these configurations can be applied to non-laminate films as appropriate. Further, although some films are described herein as being suited for heat sealing, it will be understood that any of the films described herein can also be coated with a cold seal for food package applications. Additionally, skilled artisans will appreciate that elements in the figures are illustrated for simplicity and clarity and have not necessarily been drawn to scale. For example, the dimensions and/or relative positioning of some of the elements in the figures, such as the cross-section views, may be exaggerated relative to other elements to help to improve understanding of various embodiments of the present invention.

The invention claimed is:

1. A package comprising:
a multilayer film with a first film layer and a second film layer having an embedded coextruded bonding layer therebetween, the first film layer having a first cut formed therein, the first cut extending from the first film layer at least to the embedded coextruded bonding layer and the second film layer having a heat seal layer and a release and reclose layer for resealability, the multilayer film configured such that the release and reclose layer is disposed adjacent the embedded coextruded bonding layer;
a base film adhered to the first film layer of the multilayer film via an adhesive lamination layer configured such that the multilayer film and the base film form a multi-ply multilayer film with a non-adhering zone between the base film and the multilayer film and the first cut does not extend into the base film or through the heat sealable layer;
an outer cut disposed in the base film and extending therethrough and the outer cut extending to or at least partially through the embedded coextruded bonding layer and a portion of the outer cut coincides with the non-adhering zone to form, in part, a pull tab; and
an inner cut disposed inwardly from the first cut and the outer cut, the inner cut extending from the second film layer and at least to the embedded coextruded bonding layer;
wherein the package has a resealable opening formed with a reseal margin defined, in part, by the first cut and a resealable panel defined, in part, by the outer cut and the resealable opening defined, in part, by the inner cut.

2. The package of claim 1 wherein the outer cut comprises a multi-depth outer cut with a first portion disposed adjacent a portion of the multi-ply multilayer film that forms the pull tab, the first portion having a first depth that extends into the first film layer and the second portion has a second depth that extends to the embedded coextruded bonding layer.

3. The package of claim 1 wherein the adhesive lamination layer has a pre-configured arrangement that includes a portion without adhesive to thereby form the non-adhesive zone.

4. The package of claim 1 wherein the first cut is formed prior to application of the base film to the first film layer.

5. The package of claim 1 wherein the first cut is embedded in the multilayer film prior to package opening.

6. The package of claim 1 wherein the release and reclose layer comprises a polyamide material or polyamide blends.

7. The package of claim 1 wherein embedded coextruded bonding layer comprises a polybutene-based resin, an olefinic elastomer resin, or a blend thereof.

8. The package of claim 1 wherein the first cut does not extend through the release and reclose layer and the inner cut extends through the release and reclose layer and to the embedded coextruded bonding layer.

9. The package of claim 1 wherein the first cut is formed to rupture both the first film layer and the coextruded bonding layer at least upon initial opening.

10. The package of claim 1 wherein the first cut comprises a plurality of repeating first cuts disposed a distance from one another to allow for variation in registration.

11. The package of claim 10 wherein the plurality of repeating first cuts are angularly inclined toward the inner cut.

12. The package of claim 1 wherein the outer cut is formed subsequent to formation of the first cut.

13. The package of claim 1 wherein the first cut is formed in the interior of the multi-ply multilayer film by adhering the base film to the first film layer after formation of the first cut.

14. A package comprising:
a multilayer film with a first film layer and a second film layer having an embedded coextruded bonding layer therebetween, the first film layer having a first cut formed therein, the first cut extending from the first film layer at least to the embedded coextruded bonding layer;
a base film adhered to the first film layer of the multilayer film via an adhesive lamination layer configured such that the multilayer film and the base film form a multi-ply multilayer film with a non-adhering zone between the base film and the multilayer film;
an outer cut disposed in the base film and extending therethrough and the outer cut extending to or at least partially through the embedded coextruded bonding layer and a portion of the outer cut coincides with the non-adhering zone to form, in part, a pull tab; and
an inner cut disposed inwardly from the first cut and the outer cut, the inner cut extending from the second film layer and at least to the embedded coextruded bonding layer;
wherein the package has a resealable opening formed with a reseal margin defined, in part, by the first cut and a resealable panel defined, in part, by the outer cut and the resealable opening defined, in part, by the inner cut;
and wherein the second film layer includes at least a release and reclose layer for resealability and wherein the first cut forms a rear edge of the pull tab upon package opening.

15. The package of claim 14 wherein the release and reclose layer is disposed adjacent the embedded coextruded bonding layer.

16. The package of claim 14 wherein the second film layer further includes a heat seal layer disposed such that the release and reclose layer is disposed adjacent the embedded coextruded bonding layer and wherein the first cut does not extend through the release and reclose layer.

17. A package comprising:
a multilayer film with a first film layer, a second film layer, and an embedded coextruded bonding layer disposed between the first film layer and the second film layer, the first film layer having a first cut formed therein, the first cut extending from the first film layer at least to the embedded coextruded bonding layer and the second film layer including at least a release and reclose layer;
a base film adhered to the first film layer of the multilayer film via a partial adhesive lamination layer such that the first film layer and the the first cut are embedded in a multi-ply multilayer film formed via the multilayer film and the base layer;
an outer cut disposed in the base film and extending to or at least partially through the embedded coextruded bonding layer, where a portion of the outer cut forms, in part, a pull tab; and
an inner cut disposed inwardly from the outer cut, the inner cut extending from the second film layer and at least to the embedded coextruded bonding layer;
wherein the package has a resealable opening formed with a reseal margin defined, in part, the outer cut and the inner cut being offset from one another.

18. The package of claim 17 wherein the partial adhesive lamination layer forms a non-adhering zone between the base film and the multilayer film and the non-adhering zone is disposed adjacent a portion of the outer cut that forms the pull tab.

* * * * *